United States Patent
Farag et al.

(10) Patent No.: US 12,477,568 B2
(45) Date of Patent: Nov. 18, 2025

(54) METHOD AND APPARATUS FOR INTER-UE COORDINATION SIGNALING

(71) Applicant: Samsung Electronics Co., Ltd., Suwon-si (KR)

(72) Inventors: Emad N. Farag, Flanders, NJ (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 538 days.

(21) Appl. No.: 17/933,830

(22) Filed: Sep. 20, 2022

(65) Prior Publication Data

US 2023/0107863 A1    Apr. 6, 2023

Related U.S. Application Data

(60) Provisional application No. 63/298,476, filed on Jan. 11, 2022, provisional application No. 63/296,377, (Continued)

(51) Int. Cl.
*H04W 72/566* (2023.01)
*H04W 72/1263* (2023.01)
(Continued)

(52) U.S. Cl.
CPC ..... *H04W 72/569* (2023.01); *H04W 72/1263* (2013.01); *H04W 72/52* (2023.01); *H04W 72/542* (2023.01)

(58) Field of Classification Search
CPC . H04W 72/52; H04W 72/542; H04W 72/569; H04W 72/1263
See application file for complete search history.

(56) References Cited

U.S. PATENT DOCUMENTS

2020/0187162 A1\*  6/2020  Luo ................ H04W 72/02
2020/0288286 A1   9/2020  Hwang et al.
(Continued)

FOREIGN PATENT DOCUMENTS

CN    113170473 A    7/2021
EP      4152873 A1   3/2023

OTHER PUBLICATIONS

3GPP TSG RAN WG1 #107-e, R1-210xxxx, e-Meeting, Draft Change Request, 38.213, v16.7.0, Nov. 11-19, 2021, Public Upload Date Sep. 28, 2021 (Year: 2021).*

(Continued)

*Primary Examiner* — James P Duffy

(57) ABSTRACT

Methods and apparatus for inter-UE coordination signaling in a wireless communication system. A method of operating a UE includes receiving a first SCI format 1-A from a first UE and a second SCI format 1-A from a second UE. The first SCI format 1-A includes a first priority value $p_1$ and reserves a first SL resource. The second SCI format 1-A includes a second priority value $p_2$ and reserves a second SL resource. The method further includes identifying a conflict when the first and second SL reserved resources overlap in time and frequency; determining, based on the priority values, whether to indicate conflict information to the first UE or the second UE; and transmitting a PSFCH with the conflict information. When $p_1 > p_2$, the conflict information is indicated to the first UE and, when $p_1 = p_2$, the conflict information is indicated to the first UE or the second UE.

20 Claims, 18 Drawing Sheets

Related U.S. Application Data filed on Jan. 4, 2022, provisional application No. 63/283,087, filed on Nov. 24, 2021, provisional application No. 63/278,388, filed on Nov. 11, 2021, provisional application No. 63/276,354, filed on Nov. 5, 2021, provisional application No. 63/251,408, filed on Oct. 1, 2021, provisional application No. 63/250,070, filed on Sep. 29, 2021.

(51) Int. Cl.
*H04W 72/52* (2023.01)
*H04W 72/542* (2023.01)

(56) References Cited

U.S. PATENT DOCUMENTS

| | | | |
|---|---|---|---|
| 2021/0219320 A1* | 7/2021 | Belleschi | H04W 72/20 |
| 2021/0250954 A1 | 8/2021 | Li et al. | |
| 2023/0042073 A1* | 2/2023 | Ibrahim | H04W 52/24 |
| 2024/0057121 A1* | 2/2024 | Ganesan | H04L 1/1819 |
| 2024/0155659 A1 | 5/2024 | Zhao | |
| 2024/0188115 A1* | 6/2024 | Wu | H04W 72/535 |
| 2024/0204926 A1* | 6/2024 | Guo | H04L 1/1887 |
| 2024/0237034 A1* | 7/2024 | Nguyen | H04W 72/40 |

OTHER PUBLICATIONS

"3rd Generation Partnership Project; Technical Specification Group Radio Access Network; NR; Physical channels and modulation (Release 16)", 3GPP TS 38.211 V16.6.0, Jun. 2021, 134 pages.

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

"3rd Generation Partnership Project; Technical Specification Group Radio Access Network; Evolved Universal Terrestrial Radio Access (E-UTRA); Physical layer procedures (Release 16)", 3GPP TS 36.213 V16.6.0, Jun. 2021, 577 pages.

International Search Report and Written Opinion issued Jan. 12, 2023 regarding International Application No. PCT/KR2022/014604, 7 pages.

Intel Corporation, "Design of Inter-UE Coordination Solutions for Sidelink Communication", 3GPP TSG RAN WG1 Meeting #106-e, R1-2107610, Aug. 2021, 24 pages.

Panasonic, "Inter-UE coordination for Mode 2 enhancements", 3GPP TSG RAN WG1 Meeting #106-e, R1-2107303, Aug. 2021, 8 pages.

Futurewei, "Discussion on techniques for inter-UE coordination", 3GPP TSG RAN WG1 Meeting #106-e, R1-2107092, Aug. 2021, 11 pages.

Extended European Search Report issued Jan. 2, 2025 regarding Application No. 22876869.3, 11 pages.

Lenovo et al., "Discussion on inter-UE coordination for Mode 2 enhancements", 3GPP TSG RAN WG1, #104b-e, R1-2103549, Apr. 2021, 8 pages.

Apple, "On Inter-UE Coordination", 3GPP TSG RAN WG1 #105-e, R1-2105127, May 2021, 12 pages.

\* cited by examiner

Time division multiplexed set of PSFCH resources for HARQ-ACK and conflict feedback for 3 reserved resources (N=3)

METHOD AND APPARATUS FOR INTER-UE COORDINATION SIGNALING

CROSS-REFERENCE TO RELATED APPLICATIONS AND CLAIM OF PRIORITY

The present application claims priority to:
U.S. Provisional Patent Application No. 63/250,070, filed on Sep. 29, 2021;
U.S. Provisional Patent Application No. 63/251,408, filed on Oct. 1, 2021;
U.S. Provisional Patent Application No. 63/276,354, filed on Nov. 5, 2021;
U.S. Provisional Patent Application No. 63/278,388, filed on Nov. 11, 2021;
U.S. Provisional Patent Application No. 63/283,087, filed on Nov. 24, 2021;
U.S. Provisional Patent Application No. 63/296,377, filed on Jan. 4, 2022; and
U.S. Provisional Patent Application No. 63/298,476, filed on Jan. 11, 2022. The content of the above-identified patent document is incorporated herein by reference.

TECHNICAL FIELD

The present disclosure relates generally to wireless communication systems and, more specifically, the present disclosure relates to an inter-user equipment (UE) coordination signaling in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to an inter-UE coordination signaling in a wireless communication system.

In one embodiment, a UE is provided. The UE includes a transceiver configured to receive a first sidelink (SL) control information (SCI) format 1-A from a first UE and receive a second SCI format 1-A from a second UE. The first SCI format 1-A includes a first priority value $p_1$ and reserves a first SL resource. The second SCI format 1-A includes a second priority value $p_2$ and reserves a second SL resource. The UE further includes a processor operably coupled to the transceiver. The processor configured to identify a conflict when the first SL reserved resource and the second SL reserved resource overlap in time and frequency and determine, based on the first and second priority values, whether conflict information is indicated to the first UE or the second UE. When $p_1 > p_2$, the conflict information is indicated to the first UE. When $p_1 = p_2$, the conflict information is indicated to the first UE or the second UE. The transceiver is further configured to transmit a physical SL feedback channel (PSFCH) including the conflict information.

In another embodiment, a method of operating a UE is provided. The method includes receiving a first SCI format 1-A from a first UE and receiving a second SCI format 1-A from a second UE. The first SCI format 1-A includes a first priority value $p_1$ and reserves a first SL resource. The second SCI format 1-A includes a second priority value $p_2$ and reserves a second SL resource. The method further includes identifying a conflict when the first SL reserved resource and the second SL reserved resource overlap in time and frequency; determining, based on the first and second priority values, whether a conflict information is indicated to the first UE or the second UE; and transmitting a PSFCH including the conflict information. When $p_1 > p_2$, the conflict information is indicated to the first UE and, when $p_1 = p_2$, the conflict information is indicated to the first UE or the second UE.

In yet another embodiment, a UE is provided. The UE includes a transceiver configured to transmit a SCI format 1-A and attempt to receive a PSFCH including the conflict information. The SCI format 1-A indicates reserved SL resource and includes a flag set to enable to indicate that the UE can receive conflict information. The UE further includes a processor operably coupled to the transceiver. The processor configured to, upon receipt of the conflict information, preform SL resource re-selection.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 22, discussed below, and the various embodiments used to describe the principles of the present disclosure in this patent document are by way of illustration only and should not be construed in any way to limit the scope of the present disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v.16.6.0, "Physical channels and modulation"; 3GPP TS 38.212 v.16.6.0, "Multiplexing and channel coding"; 3GPP TS 38.213 v16.6.0, "NR; Physical Layer Procedures for Control"; 3GPP TS 38.214: v.16.6.0, "Physical layer procedures for data"; 3GPP TS 38.321 v16.5.0, "NR; Medium Access Control (MAC) protocol specification"; 3GPP TS 38.331 v.16.5.0, "Radio Resource Control (RRC) protocol specification"; and 3GPP TS 36.213 v16.6.0, "Evolved Universal Terrestrial Radio Access (E-UTRA); Physical layer procedures."

Figure 1:
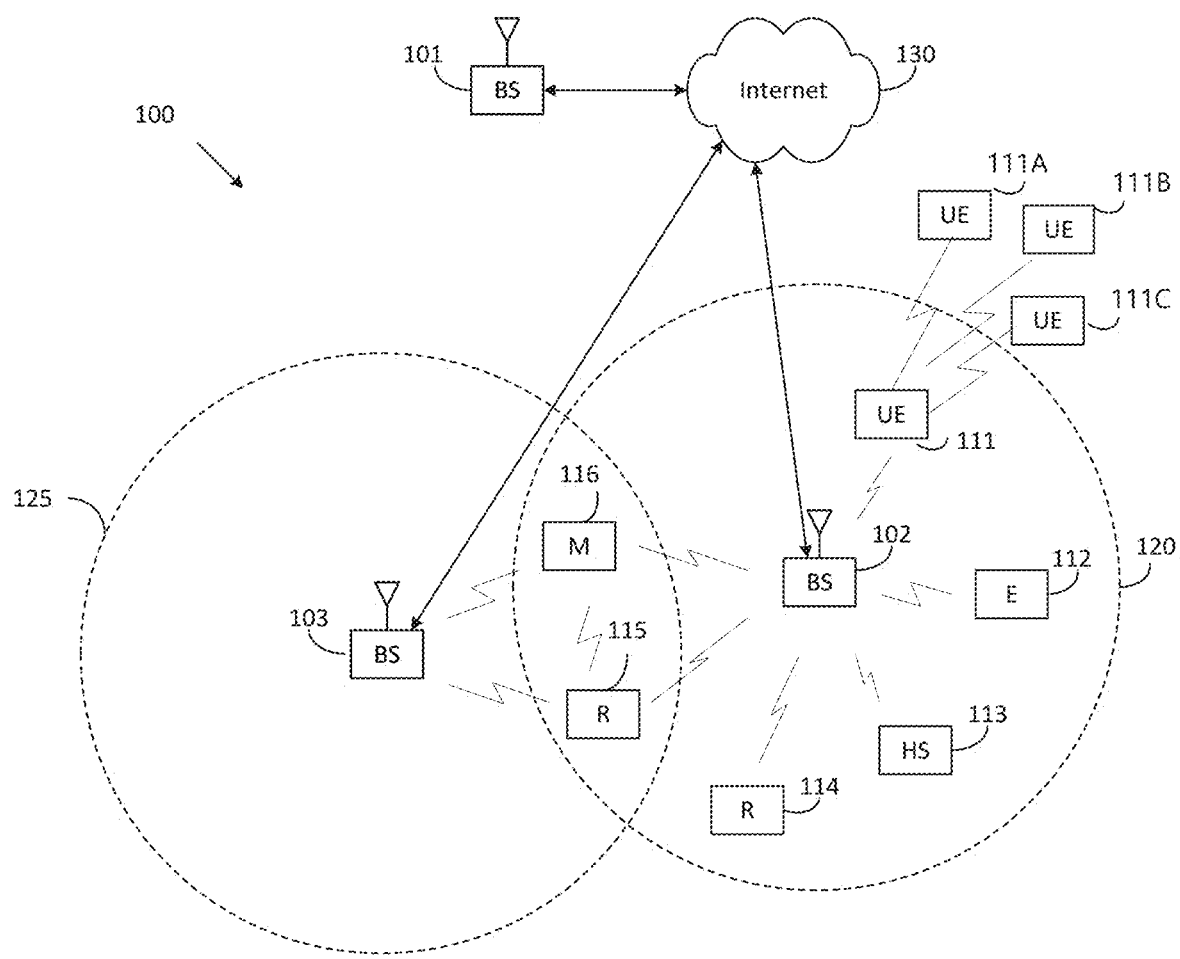
FIG. 1 illustrates an example of wireless network according to various embodiments of the present disclosure.
Figure 2:
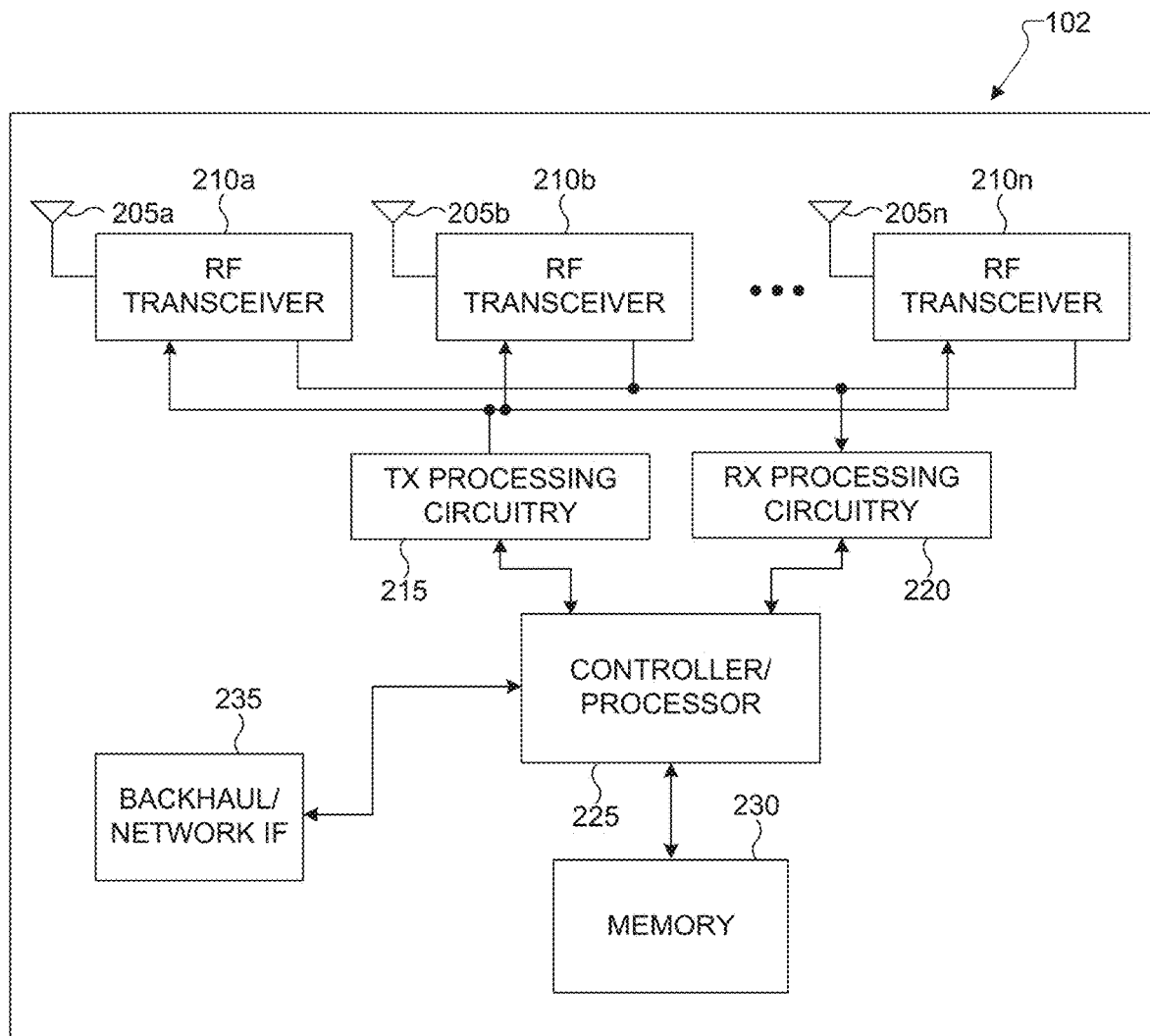
FIG. 2 illustrates an example of gNB according to various embodiments of the present disclosure.
Figure 3:
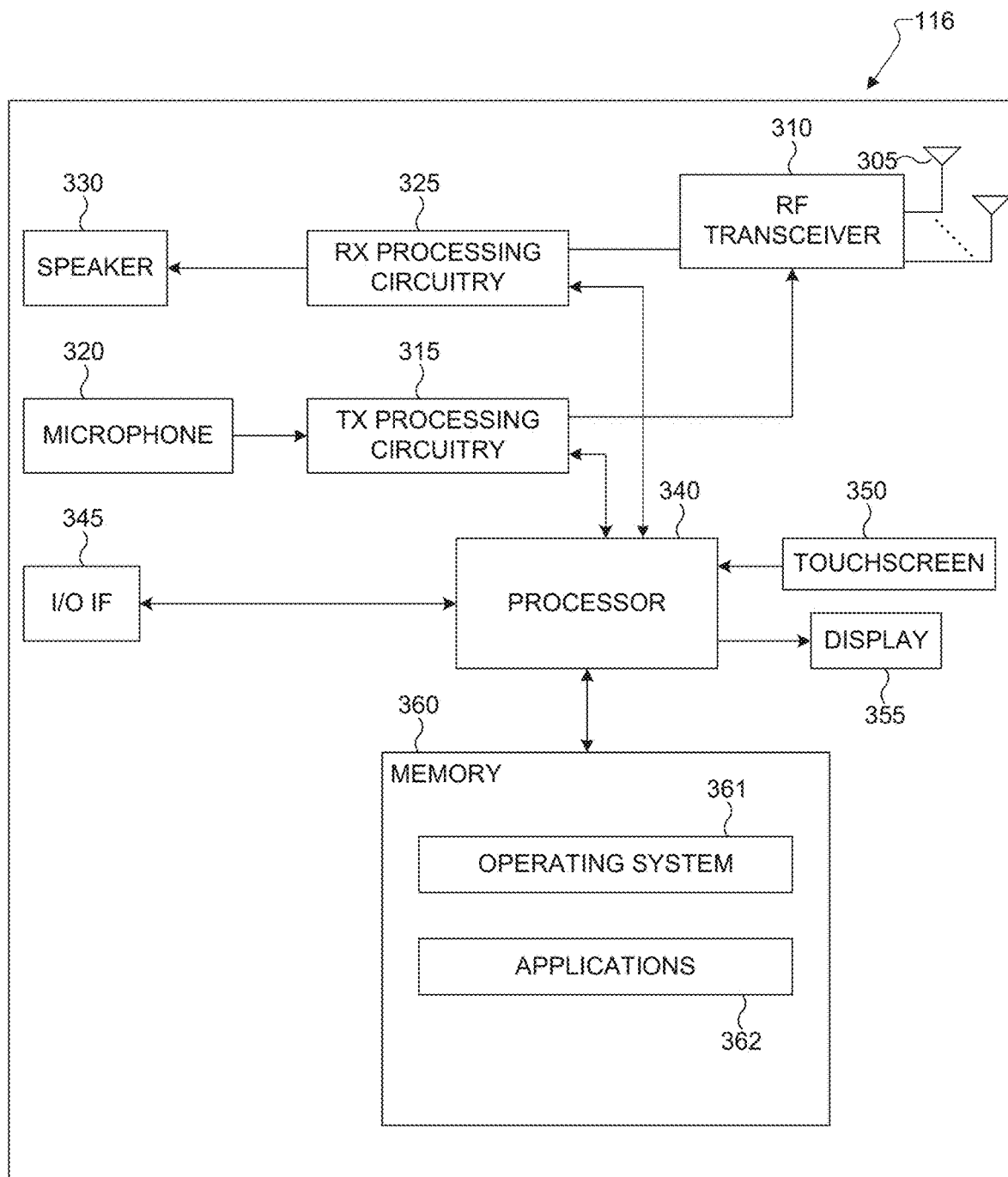
FIG. 3 illustrates an example of UE according to various embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example of wireless network according to embodiments of the present disclosure. The embodiment of the wireless network shown in FIG. 1 is for illustration only. Other embodiments of the wireless network 100 could be used without departing from the scope of this present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In various embodiments, a UE 116 may communicate with another UE 115 via a sidelink (SL). For example, both UEs 115-116 can be within network coverage (of the same or different base stations). In another example, the UE 116 may be within network coverage and the other UE may be outside network coverage (e.g., UEs 111A-111C). In yet another example, both UE are outside network coverage. In some embodiments, the UEs 111A-111C may use a device to device (D2D) interface called PC5 (e.g., also known as sidelink at the physical layer) for communication. In some embodiments, one or more of the gNBs 101-103 may communicate with each other and with the UEs 111-116 using 5G/NR, LTE, LTE-A, WiMAX, WiFi, or other wireless communication techniques. In yet another example, SBs 111A to 111C can communicate with another of the UEs 111A to 111C.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for an inter-UE coordination signaling in a wireless communication system. In certain embodiments, and one or more of the gNBs 101-103 includes circuitry, programing, or a combination thereof, for an inter-UE coordination signaling in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs (e.g., via a Uu interface or air interface, which is an interface between a UE and 5G radio access network (RAN)) and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UE 111A to 111C) that may have a SL communication with the UE 111. The UE 111 can communicate directly with the UEs 111A to 111C through a set of SLs (e.g., SL interfaces) to provide sideline communication, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication with their other UEs (such as UEs 111A to 111C as for UE 111).

FIG. 2 illustrates an example of gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support an inter-UE coordination signaling in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example of UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100 or by other UEs (e.g., one or more of UEs 111-115) on a SL channel. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of downlink and/or sidelink channels and/or signals and the transmission of uplink and/or sidelink channels and/or signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for an inter-UE coordination signaling in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points and an SL that refers to transmissions from one or more UEs to one or more UEs.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
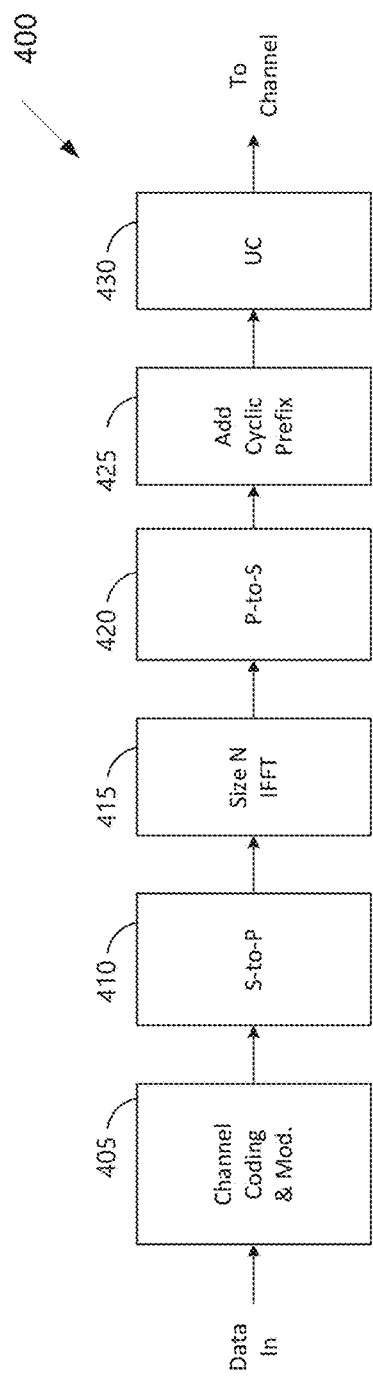
FIGS. 4 and 5 illustrate an example of wireless transmit and receive paths according to various embodiments of the present disclosure.
Figure 5:
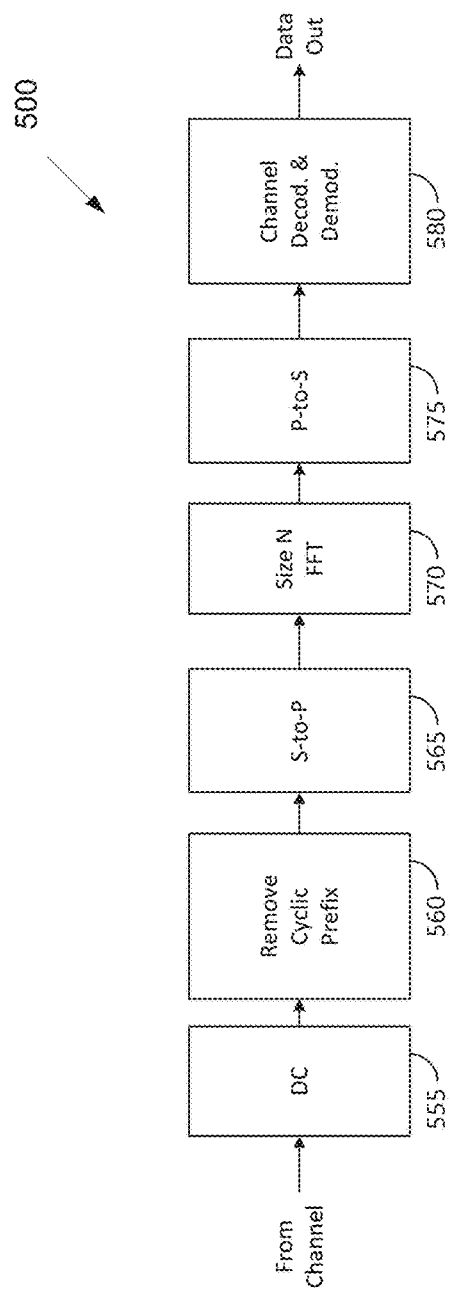

FIG. 4 and FIG. 5 illustrate examples of wireless transmit and receive paths according to this present disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications. In some embodiments, the receive path 500 is configured to support SL sensing and SL measurements in V2X communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. A transmitted RF signal from a first UE arrives at a second UE after passing through the wireless channel, and reverse operations to those at the first UE are performed at the second UE.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and/or transmitting in the sidelink to another UE and may implement the receive path 500 for receiving in the downlink from the gNBs 101-103 and/or receiving in the sidelink from another UE.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this present disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A time unit for DL signaling, for UL signaling, or for SL signaling on a cell is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 kHz. An RB in one symbol of a slot is referred to as physical RB (PRB) and includes a number of resource elements (REs). A slot can be either full DL slot, or full UL slot, or hybrid slot similar to a special subframe in time division duplex (TDD) systems. In addition, a slot can have symbols for SL communications. A UE can be configured one or more bandwidth parts (BWPs) of a system BW for transmissions or receptions of signals or channels.

SL signals and channels are transmitted and received on sub-channels within a resource pool, where a resource pool is a set of time-frequency resources used for SL transmission and reception within a SL BWP. SL channels include physical SL shared channels (PSSCHs) conveying data information and second stage/part SL control information (SCI), physical SL control channels (PSCCHs) conveying first stage/part SCI for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, and physical SL Broadcast channel (PSBCH) conveying system information to assist in SL synchronization. SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. SCI can include two parts/stages corresponding to two respective SCI formats where, for example, the first SCI format is multiplexed on a PSCCH and the second SCI format is multiplexed along with SL data on a PSSCH that is transmitted in physical resources indicated by the first SCI format.

A SL channel can operate in different cast modes. In a unicast mode, a PSCCH/PSSCH conveys SL information from one UE to only one other UE. In a groupcast mode, a PSCCH/PSSCH conveys SL information from one UE to a group of UEs within a (pre-)configured set. In a broadcast mode, a PSCCH/PSSCH conveys SL information from one UE to all surrounding UEs. In NR release 16, there are two resource allocation modes for a PSCCH/PSSCH transmission. In resource allocation mode 1, a gNB schedules a UE on the SL and conveys scheduling information to the UE transmitting on the SL through a DCI format. In resource allocation mode 2, a UE schedules a SL transmission. SL transmissions can operate within network coverage where each UE is within the communication range of a gNB, outside network coverage where all UEs have no communication with any gNB, or with partial network coverage, where only some UEs are within the communication range of a gNB.

In case of groupcast PSCCH/PSSCH transmission, a UE can be (pre-)configured one of two options for reporting of HARQ-ACK information by the UE: (1) in HARQ-ACK reporting option, a UE can attempt to decode a transport block (TB) in a PSSCH reception if, for example, the UE detects a SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB; and (2) in HARQ-ACK reporting option, a UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission.

In HARQ-ACK reporting option (1), when a UE that transmitted the PSSCH detects a NACK in a PSFCH reception, the UE can transmit another PSSCH with the TB (retransmission of the TB). In HARQ-ACK reporting option (2) when a UE that transmitted the PSSCH does not detect an ACK in a PSFCH reception, such as when the UE detects a NACK or does not detect a PSFCH reception, the UE can transmit another PSSCH with the TB.

A sidelink resource pool includes a set/pool of slots and a set/pool of RBs used for sidelink transmission and sidelink reception. A set of slots which belong to a sidelink resource pool can be denoted by $\{t'^{SL}_0, t'^{SL}_1, t'^{SL}_2, \ldots, t'^{SL}_{T'_{MAX}-1}\}$ and can be configured, for example, at least using a bitmap. Where, $T'_{MAX}$ is the number of SL slots in a resource pool. Within each slot $t'^{SL}_y$ of a sidelink resource pool, there are $N_{subCH}$ contiguous sub-channels in the frequency domain for sidelink transmission, where $N_{subCH}$ is provided by a higher-layer parameter. Subchannel m, where m is between 0 and $N_{subCH}-1$, is given by a set of $n_{subCHsize}$ contiguous PRBs, given by $n_{PRB}=n_{subCHstart}+m \cdot n_{subCHsize}+j$, where j=0, 1, ..., $n_{subCHsize}-1$, $n_{subCHstart}$ and $n_{subCHsize}$ are provided by higher layer parameters.

The slots of a SL resource pool are determined as shown below examples.

In one example, let set of slots that may belong to a resource be denoted by $\{t^{SL}_0, t^{SL}_1, t^{SL}_2, \ldots, t^{SL}_{T_{MAX}-1}\}$, where $0 \leq t^{SL}_i < 10240 \times 2^\mu$, and $0 \leq i < T_{max}$, $\mu$ is the sub-carrier spacing configuration. $\mu=0$ for a 15 kHz sub-carrier spacing. $\mu=1$ for a 30 kHz sub-carrier spacing. $\mu=2$ for a 60 kHz sub-carrier spacing. $\mu=8$ for a 120 kHz sub-carrier spacing. The slot index is relative to slot #0 of SFN #0 of the serving cell, or DFN #0. The set of slots includes all slots except: (1) $N_{S-SSB}$ slots that are configured for SL SS/PBCH Block (S-SSB); (2) $N_{nonSL}$ slots where at least one SL symbols is not not-semi-statically configured as UL symbol by higher layer parameter tdd-UL-DL-ConfigurationCommon or sl-TDD-Configuration. In a SL slot, OFDM symbols Y-th, (Y+1)-th, ..., (Y+X-1)-th are SL symbols, where Y is determined by the higher layer parameter sl-StartSymbol and X is determined by higher layer parameter sl-LengthSymbols; and (3) $N_{reserved}$ reserved slots. Reserved slots are determined such that the slots in the set $\{t^{SL}_0, t^{SL}_1, t^{SL}_2, \ldots, t^{SL}_{T_{MAX}-1}\}$ is a multiple of the bitmap length ($L_{bitmap}$), where the bitmap ($b_0, b_1, \ldots, b_{L_{bitmap}-1}$) is configured by higher layers.

In such example, the reserved slots are determined as follows: (1) let $\{l_0, l_1, \ldots, l_{2^\mu \times 10240-N_{S-SSB}31\ N_{nonSL}-1}\}$ be the set of slots in range 0 ... $2 \times 10240-1$, excluding S-SSB slots and non-SL slots. The slots are arranged in ascending order of the slot index; (2) the number of reserved slots is given by: $N_{reserved}=(2^\mu \times 10240-N_{S-SSB}-N_{nonSL}) \bmod L_{bitmap}$; and (3) the reserved slots $l_r$ are given by:

$$r = \left\lfloor \frac{m \cdot (2^\mu \times 10240 - N_{S-SSB} - N_{nonSL})}{N_{reserved}} \right\rfloor,$$

where, m=0, 1, ..., $N_{reserved}-1$; $T_{max}$ is given by: $T_{max}=2 \times 10240-N_{S-SSB}-N_{nonSL}-N_{reserved}$.

In another example, the slots are arranged in ascending order of slot index.

In yet another example, the set of slots belonging to the SL resource pool, $\{t'^{SL}_0, t'^{SL}_1, t'^{SL}_2, \ldots, t'^{SL}_{T'_{MAX}-1}\}$, are determined as follows: (1) each resource pool has a corresponding bitmap $(b_0, b_1, \ldots, b_{L_{bitmap}-1})$ of length $L_{bitmap}$; (2) a slot $t^{SL}_k$ belongs to the resource pool if $b_{k\ mod\ L_{bitmap}}=1$; and (3) the remaining slots are indexed successively staring from 0, 1, ... $T'_{MAX}-1$. Where, $T'_{MAX}$ is the number of remaining slots in the set.

Slots can be numbered (indexed) as physical slots or logical slots, wherein physical slots include all slots numbered sequential, while logical slots include only slots that belong to a sidelink resource pool as described above numbered sequentially. The conversion from a physical duration, $P_{rsvp}$, in milli-second to logical slots, $P'_{rsvp}$, is given by $$P'_{rsvp} = \left\lceil \frac{T'_{max}}{10240 \text{ ms}} \times P_{rsvp} \right\rceil.$$

For resource (re-)selection or re-evaluation in slot n, a UE can determine a set of available single-slot resources for transmission within a resource selection window $[n+T_1, n+T_2]$, such that a single-slot resource for transmission, $R_{x,y}$ is defined as a set of $L_{subCH}$ contiguous subchannels x+i, where i=0, 1, ..., $L_{subCH}-1$ in slot $t^{SL}_y$. $T_1$ is determined by the UE such that, $0 \leq T_1 \leq T^{SL}_{proc,1}$, where $T^{SL}_{proc,1}$ is a PSSCH processing time for example as defined in REF 4. $T_2$ is determined by the UE such that $T_{2min} \leq T_2 \leq $Remaining Packet Delay Budget, as long as $T_{2min}<$Remaining Packet Delay Budget, else $T_2$ is equal to the Remaining Packet Delay Budget. $T_{2min}$ is a configured by higher layers and depends on the priority of the SL transmission.

The resource (re-)selection is a two-step procedure: In step (1), the first step (e.g., performed in the physical layer) is to identify the candidate resources within a resource selection window. Candidate resources are resources that belong to a resource pool, but exclude resources (e.g., resource exclusion) that were previously reserved, or potentially reserved by other UEs. The resources excluded are based on SCIs decoded in a sensing window and for which the UE measures a SL reference signal received power (RSRP) that exceeds a threshold. The threshold depends on the priority indicated in a SCI format and on the priority of the SL transmission. Therefore, sensing within a sensing window involves decoding the first stage SCI, and measuring the corresponding SL RSRP, wherein the SL RSRP can be based on PSCCH DMRS or PSSCH DMRS. Sensing is performed over slots where the UE doesn't transmit SL. The resources excluded are based on reserved transmissions or semi-persistent transmissions that can collide with the excluded resources or any of reserved or semi-persistent transmissions; the identified candidate resources after resource exclusion are provided to higher layers and in step (2) the second step (e.g., performed in the higher layers) is to select or re-select a resource from the identified candidate resources for PSSCH/PSCCH transmission.

During the first step of the resource (re-)selection procedure, a UE can monitor slots in a sensing window $[n-T_0, n-T_{proc,0})$, where the UE monitors slots belonging to a corresponding sidelink resource pool that are not used for the UE's own transmission. To determine a candidate single-slot resource set to report to higher layers, a UE excludes (e.g., resource exclusion) following examples from the set of available single-slot resources for SL transmission within a resource pool and within a resource selection window.

In one example, single slot resource $R_{x,y}$, such that for any slot $t_m^{SL}$ not monitored within the sensing window with a hypothetical received SCI Format 1-0, with a "Resource reservation period" set to any periodicity value allowed by a higher layer parameter reseverationPeriodAllowed, and indicating all sub-channels of the resource pool in this slot, satisfies condition 2.2. below.

In another example, single slot resource $R_{x,y}$, such that for any received SCI within the sensing window: (1) the associated L1-RSRP measurement is above a (pre-)configured SL-RSRP threshold, where the SL-RSRP threshold depends on the priority indicated in the received SCI and that of the SL transmission for which resources are being selected; and (2) (Condition 2.2) The received SCI in slot $t_m^{SL}$, or if "Resource reservation field" is present in the received SCI the same SCI is assumed to be received in slot $t_{m+q \times P'_{rsvp\_Rx}}^{SL}$, indicates a set of resource blocks that overlaps $R_{x,y+j \times P'_{rsvp\_TX}}$. Where, q=1, 2, ..., Q, where, if $$P_{rsvp\_RX} \le T_{scal} \text{ and } n' - m < P'_{rsvp\_Rx} \Rightarrow Q = \left\lceil \frac{T_{scal}}{P_{rsvp\_RX}} \right\rceil.$$

$T_{scal}$ is $T_2$ in units of milli-seconds; else Q=1. If n belongs to $(t_0^{SL}, t_1^{SL}, \ldots, t_{T_{max}})$, n'=n, else n' is the first slot after slot n belonging to set $(t_0^{SL}, t_1^{SL}, \ldots, t_{T_{max}})$. Where j=0, 1, ..., $C_{resel}$−1, $P_{rsvp\_RX}$ is the indicated resource reservation period in the received SCI in physical slots, and $P'_{rsvp\_RX}$ is that value converted to logical slots, and $P'_{rsvp\_TX}$ is the resource reservation period of the SL transmissions for which resources are being reserved in logical slots.

In yet another example, if the candidate resources are less than a (pre-)configured percentage, such as 20%, of the total available resources within the resource selection window, the (pre-)configured SL-RSRP thresholds are increased by a predetermined amount, such as 3 dB.

A NR sidelink introduced two new procedures for mode 2 resource allocation; re-evaluation and pre-emption.

Re-evaluation check occurs when a UE checks the availability of pre-selected SL resources before the resources are first signaled in an SCI Format, and if needed re-selects new SL resources. For a pre-selected resource to be first-time signaled in slot m, the UE performs a re-evaluation check at least in slot m−$T_3$.

The re-evaluation check includes: (1) performing the first step of the SL resource selection procedure as described in 3GPP standard specification 38.214 (i.e., clause 8.1.4 of TS 38.214), which involves identifying a candidate (available) sidelink resource set in a resource selection window as previously described; (2) if the pre-selected resource is available in the candidate sidelink resource set, the resource is used/signaled for sidelink transmission; and (3) else, the pre-selected resource is not available in the candidate sidelink resource set, a new sidelink resource is re-selected from the candidate sidelink resource set.

A pre-emption check occurs when a UE checks the availability of pre-selected SL resources that have been previously signaled and reserved in an SCI Format, and if needed re-selects new SL resources. For a pre-selected and reserved resource to be signaled in slot m, the UE performs a pre-emption check at least in slot m−$T_3$.

When pre-emption check is enabled by higher layers, pre-emption check includes: (1) performing the first step of the SL resource selection procedure as described in 3GPP standard specification (i.e., clause 8.1.4 of TS 38.214), which involves identifying candidate (available) sidelink resource set in a resource selection window as previously described; (2) if the pre-selected and reserved resource is available in the candidate sidelink resource set, the resource is used/signaled for sidelink transmission; and (3) else, the pre-selected and reserved resource is NOT available in the candidate sidelink resource set. The resource is excluded from the candidate resource set due to an SCI, associated with a priority value $p_{RX}$, having an RSRP exceeding a threshold. Let the priority value of the sidelink resource being checked for pre-emption be $p_{TX}$.

If the priority value $p_{RX}$ is less than a higher-layer configured threshold and the priority value $p_{RX}$ is less than the priority value $p_{TX}$. The pre-selected and reserved sidelink resource is pre-empted. A new sidelink resource is re-selected from the candidate sidelink resource set. Note that, a lower priority value indicates traffic of higher priority. Else, the resource is used/signaled for sidelink transmission.

3GPP Release 16 is the first NR release to include sidelink through work item "5G V2X with NR sidelink", the mechanisms introduced focused mainly on vehicle-to-everything (V2X), and can be used for public safety when the service requirement can be met. Release 17 extends sidelink support to more use cases through work item "NR Sidelink enhancement." One of the motivations for the sidelink enhancement in Release 17, as mentioned in the work item description is power savings:

Power saving enables UEs with battery constraint to perform sidelink operations in a power efficient manner. Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized.

One of the objectives of the Release 17 sidelink enhancement work item, as described in the work item of 3GPP standard specification, is to specify resource allocation enhancements that reduce power consumption, taking the principle of the release 14 LTE sidelink random resource selection and partial sensing as baseline with potential enhancements:

For resource allocation enhancement, resource allocation is specified to reduce power consumption of the UEs: (1) baseline is to introduce the principle of Rel-14 LTE sidelink random resource selection and partial sensing to Rel-16 NR sidelink resource allocation mode 2; and (2) taking Rel-14 as the baseline does not preclude introducing a new solution to reduce power consumption for the cases where the baseline cannot work properly.

Another motivation for the sidelink enhancement in Release 17, as mentioned in the work item of 3GPP standard specification, is to enhance reliability and reduced latency.

Enhanced reliability and reduced latency allow the support of URLLC-type sidelink use cases in wider operation scenarios. The system level reliability and latency performance of sidelink is affected by the communication conditions such as the wireless channel status and the offered load, and Rel-16 NR sidelink is expected to have limitation in achieving high reliability and low latency in some conditions, e.g., when the channel is relatively busy. Solutions that can enhance reliability and reduce latency are required in order to keep providing the use cases requiring low latency and high reliability under such communication conditions.

Another objective of the Release 17 sidelink enhancement work item, as described in the work item of 3GPP standard specification, is to study the feasibility and benefits of enhancements to resource allocation mode 2, wherein a set of resources can be determined at a UE-A and sent to a UE-B, and the UE-B takes into account this set for its own transmission.

For the feasibility and benefit of the enhancement(s) in mode 2 for enhanced reliability and reduced latency in consideration of both PRR and PIR defined in 3GPP standard specification, and specifying the identified solution if deemed feasible and beneficial, inter-UE coordination is provided for a set of resources that is determined at the UE-A. This set is sent to a UE-B in mode 2, and the UE-B takes this into account in the resource selection for its own transmission.

In some instances, the UE transmitting sidelink information (e.g., UE-B) is not aware of the sidelink environment at the UE receiving the sidelink information (UE-A), without receiving sidelink resource selection assistance information (i.e., inter-UE co-ordination information) from THE UE-A. For example, the hidden node problem is when a third UE or node is causing interference or is attempting to transmit to the UE-A at the same time that the UE-B is attempting to transmit to the UE-A, but is not discerned by the UE-B. When the UE-A provides resource selection assistance information to the UE-B, the UE-A can assist the UE-B in making resource allocation decisions that avoid the hidden node problem when transmitting to the UE-A.

In another example, the exposed node problem is when a sidelink resource is being sensed as occupied at the UE-B, i.e., the UE transmitting the sidelink information, but is not being sensed as occupied at the UE-A, i.e., the UE receiving the sidelink information. If the UE-B were to only use its sensing information the UE-B would not transmit on the resource to the UE-A. However, if the UE-B gets resource selection assistance information from the UE-A, the UE-B can allocate the resource for sidelink transmission to the UE-A. Resource selection assistance information, for example, can be when a resource that is reserved by the UE-B is indicated that it has (or has not) a potential or expected conflict from the UE-A.

In some instances, the UE transmitting sidelink information (e.g., UE-B) is not aware whether the intended receiver (intended recipient) UE of the sidelink information is receiving or transmitting at the time of transmission from the UE-B without receiving sidelink resource selection assistance information (i.e., inter-UE co-ordination information) from the UE-A. For example, the half-duplex problem occurs when a first UE is transmitting information on a sidelink to a second UE at a time (i.e., in a slot and/or a symbol), when the second UE is transmitting and the second UE is unable to receive the SL transmission of the first UE. Resource selection assistance information, for example, can be whether a reserved SL resource has (or has not) a potential or expected conflict, and can at least be determined partially on whether a SL resource can be received by the UE-A.

As described in the U.S. patent application Ser. No. 17/139,908 as incorporated by reference herein in its entirety, a first UE(s) can transmit a pre-indication of its intention to transmit or resource reservation on a SL resource to a second UE(s). The second UE(s) can grant or trigger the SL transmission of the first UE(s). In this disclosure will look at the signaling aspects of the pre-indication or resource reservation from a first UE(s) (e.g., UE-B(s)) to a second UE(s) (e.g., UE-A(s)). In the present disclosure, the signaling aspects of the grant or triggering from the second UE(s) (e.g., UE-A(s)) to the first UE(s) (e.g., UE-B(s)) is also provided, wherein the grant or trigger can indicate preferred or non-preferred SL resources.

3GPP Release 16 is the first NR release to include sidelink through work item "5G V2X with NR sidelink," the mechanisms introduced focused mainly on vehicle-to-everything (V2X), and can be used for public safety when the service requirement can be met. Release 17 extends sidelink support to more use cases through work item "NR Sidelink enhancement." One of the motivations for the sidelink enhancement in Release 17 is to enhance reliability and reduced latency. One of the objectives of the Release 17 sidelink enhancement work item is to study the feasibility and benefit of inter-UE coordination by having a set of resources determined at the UE-A indicated to a UE-B, and the UE-B takes into account this information for its SL transmission.

One example scheme is for the UE-B to reserve future resources and indicate the reserved resources to the UE-A. The UE-A then determines if the indicated resources have a potential or expected conflict for example due to collision with a SL resource of another SL user. The UE-A indicates the potential or expected resource conflict to the UE-B using a container. In this disclosure, the design of the container for indicating potential or expected resource conflicts is provided.

The present disclosure relates to a 5G/NR communication system. The present disclosure introduces signaling and methods for the indication of a potential or expected resource conflict from the UE-A, i.e., the UE that detects the potential or expected resource conflict and a UE-B, the UE that reserved a resource with the expected or potential resource conflict.

In the present disclosure, a SL UE transmitting SL information on a SL resource is referred to as a UE-B. The network can include one or more UE-B. The UE-A can be a SL UE that is the intended receiver (intended recipient) of a SL transmission from a UE-B or the UE-A can be any other SL UE in the network.

In the present discourse, a UE-B reserves SL resources for a future transmission using a PSCCH channel. For example, this can follow the Rel-16 mechanism where SCI Format 1-A can reserve up to two future SL resources in addition to the SL resource of the current slot. Let the number of SL resources UE-B can indicate as reserved be N. In one example, N=1, in another example N=2. In one example, the value of N can be (pre-)configured.

The UE-A can be the intended receiver (intended recipient) of the transmission of the UE-B. The UE-A can determine if the reserved SL resource(s) by the UE-B collide or are in conflict with the SL resources of any other SL transmission, e.g., from another UE. In case that the UE-A determines a conflict between the UE-B and at least one other UE, the UE-A determines whether to indicate that the reserved SL resource(s) have conflict to the UE-B or to other UE(s) or to both UE-B and the other UE(s), or to neither of them.

In another example, the UE-A is not the intended receiver of the transmission of the UE-B. However, the UE-A is the intended receiver (intended recipient) of a third UE, and the SL resource(s) reserved by the third UE are in conflict with the SL resources reserved by the UE-B. In this case, the UE-A determines whether to indicate that the reserved SL resource(s) have conflict to the UE-B or to third UE(s) or to both UE-B and third UE, or to neither of them.

For signaling a potential or expected conflict on SL resource, the UE-A can use a PSFCH, or PSFCH-like channel. A PSFCH-like channel is a physical channel with same structure as that of PSFCH (as described in 38.211), i.e., the Physical channel includes 12 orthogonal sequences (e.g., cyclic shifts) multiplexed into one PRB. Each one or two sequences (e.g., cyclic shifts) is used to convey one bit of information. The PSFCH has a duration of two symbols, the first symbol is a repetition of the second symbol. Expected or potential conflict feedback is a type of inter-UE co-ordination information from the UE-A to the UE-B. Expected or potential conflict feedback is a type of resource selection assistance information (RSAI) from the UE-A to the UE-B. In this disclosure, conflict feedback, conflict indication or conflict information refer to the conflict information provided from the UE-A to the UE-B. This information can include "conflict" only and can be sent when there is conflict detected due to a reserved resource in SCI Format 1-A of the UE-B, "no conflict" is implied by the absence of conflict information. Alternatively, this information can include "conflict" or "no conflict" for a reserved resource in SCI Format 1-A of the UE-B. In this disclosure, HARQ-ACK feedback, HARQ-ACK indication or HARQ-ACK information refer to the HARQ-ACK information.

In Rel-16, PSFCH resources used for HARQ-ACK are determined by: (1) in a time domain, a UE can be provided, by sl-PSFCH-Period a number of slots in a resource pool for a period of PSFCH. If the number is zero, PSFCH transmissions from the UE are disabled for HARQ-ACK feedback. A UE expects that a slot $t'^{SL}_k$, wherein $0 \le k < T'_{max}$ has a PSFCH transmission occasion for HARQ-ACK feedback if k mod $N^{PSFCH}_{PSSCH} = 0$, wherein; $t'^{SL}_k$ is a logical slot in the resource pool; $T'_{max}$ is the maximum number of logical slots in the resource pool in 1024 frames; and $N^{PSFCH}_{PSSCH}$ is provided by sl-PSFCH-Period; (2) in a frequency domain, a UE can be provided by higher layer parameter sl-PSFCH-Set a set of $M^{PSFCH}_{PRB,set}$ PRBs in a resource pool for PSFCH transmission in a PRB of the resource pool. For a number of $N_{subch}$ sub-channels for resource pool, provided by higher layer parameter sl-NumSubchannel, the UE allocates $[(i+j \cdot N^{PSFCH}_{PSSCH}) \cdot M^{PSFCH}_{subch,slot}, (i+1+j \cdot N^{PSFCH}_{PSSCH}) \cdot M^{PSFCH}_{subch,slot} - 1]$ PRBs from the $M^{PSFCH}_{PRB,set}$ PRBs, to slot i among the SL slots associated with the PSFCH for HARQ-ACK feedback and sub-channel j, where $M^{PSFCH}_{subch,slot} = M^{PSFCH}_{PRB,set} / (N_{subch} \cdot N^{PSFCH}_{PSSCH})$, $0 \le i < N^{PSFCH}_{PSSCH}$, $0 \le j < N_{subch}$ and the allocation starts in an ascending order of i and continues in an ascending order of j. The UE expects that $M^{PSFCH}_{PRB,set}$ is a multiple of $N_{subch} \cdot N^{PSFCH}_{PSSCH}$; and (3) in a code domain (cyclic-shift domain), the UE can be allocated from 1 to 6 cyclic shift pairs, per PRB, through higher layer parameter sl-NumMuxCS-Pair. It should be noted that there are 12 cyclic shifts (i.e., 6 cyclic shift pairs per PRB).

Figure 6:
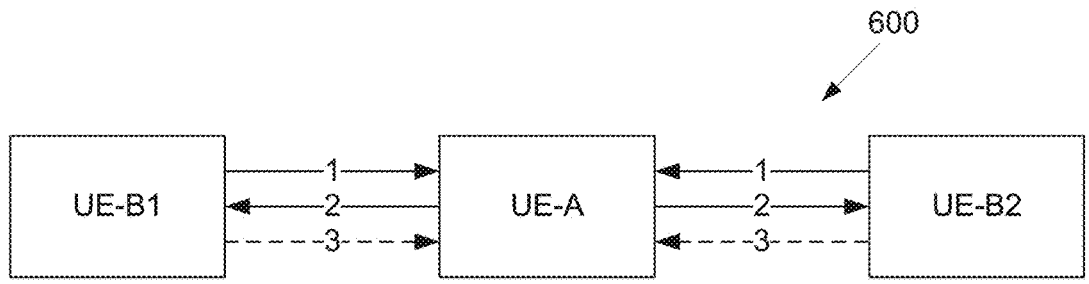
FIG. 6 illustrates an example of UE-B's indication to transmit on SL resource according to various embodiments of the present disclosure.

FIG. 6 illustrates an example of UE-B's indication to transmit on SL resource 600 according to various embodiments of the present disclosure. An embodiment of the UE-B's indication to transmit on SL resource 600 shown in FIG. 6 is for illustration only.

FIG. 6 is an example of a SL network that includes 3 SL UEs, there can be additional SL UEs in the network. In this example, a SL UE is capable of receiving and transmitting on the SL air interface. There are two UE-Bs, i.e., the UE-B1 and the UE-B2 with data to transmit on the SL interface, and there is one UE-A, wherein the UE-A can be the intended receiver (intended recipient) of the UE-B1 and the UE-B2 transmissions, or just the intended receiver (intended recipient) of the UE-B1 or the UE-B2 transmissions, or any other SL UE in the network.

In step 1, according to FIG. 6, a UE-B indicates its intention to transmit on a future SL resource.

In another example, a UE-B indicates its intention to transmit on a future SL resource or reserves a future SL resource using a PSCCH transmission, this can be aperiodic or periodic resource reservation. For example, the PSCCH can include resource indication for a current sub-frame as well as reserved resources for a future sub-frame, wherein the reserved resource(s) can be for a retransmission of the current transmission (if needed or if applicable) and/or the reserved resource(s) can be for a new transmission. In another example, the PSCCH transmission, can be a PSCCH transmission with no PSSCH transmission in the current subframe, and only includes resources reserved in future subframe.

In one example, a UE-B indicates its intention to transmit on a future SL resource or reserves a future SL resource using a PSFCH-like transmission.

In another example, a UE-B indicates its intention to transmit on future SL resource or reserves a future SL resource using a newly defined physical channel.

In another example, a UE-B indicates its intention to transmit on future SL resource or reserves a future SL resource using second stage/part SCI on PSSCH.

In another example, a UE-B indicates its intention to transmit on future SL resource or reserves a future SL resource using SL shared channel on PSSCH.

In another example, a UE-B indicates its intention to transmit on future SL resource or reserves a future SL resource using SL MAC CE.

In step 2, according to FIG. 6, a UE-A after receiving pre-indication or resource reservation of a future SL transmission from one or more UE-B(s), determines if an overlap (full overlap or partial overall) or a potential or expected collision can occur on a future SL resource, and consequently, indicate a conflict or indicate a no conflict to the UE-B. The "no conflict" indication can be implicit, for example there is no transmission of a conflict indication (information). The collision or overlap in time and frequency domains of a pre-indicated or reserved SL resource can be with another pre-indicated or reserved SL resource at the UE-A. Additionally or alternatively, the collision or overlap in time and frequency domains of a pre-indicated or reserved SL resource can be with a SL resource based on the sensing at the UE-A. Additionally or alternatively, the collision or overlap of a pre-indicated or reserved SL resource can be with SL resource used by the UE-A for its SL transmission, the overlap in this case can be in time domain.

In one example, a UE-A indicates conflict or no conflict using a PSFCH-like transmission.

In step 3, after a UE-B receives a grant or trigger signal, indicating a conflict or no conflict from the UE-A, the UE-B can determine whether or not to proceed with a SL transmission on a pre-indicated or reserved SL resource. If the reserved resource is indicated to have a conflict, the UE-B performs resource re-selection to select a new resource for SL transmission.

Figure 7:
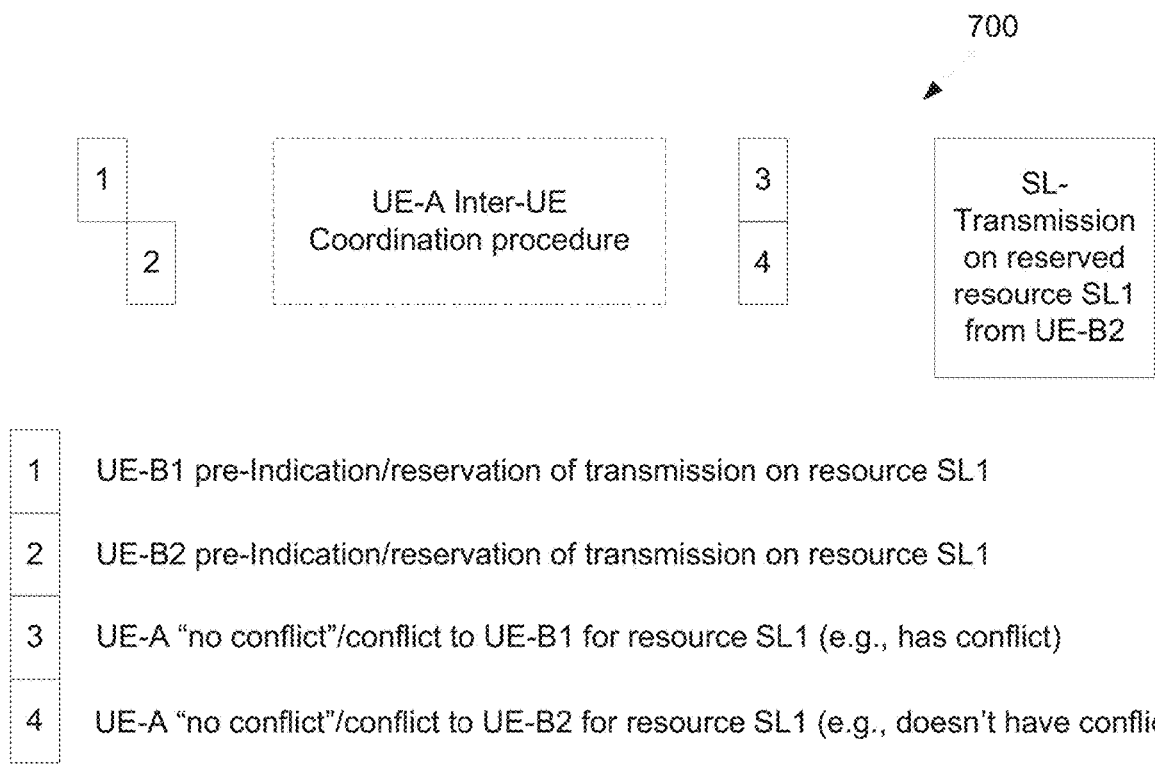
FIG. 7 illustrates an example of timeline for pre-indication/reservation and conflict/no conflict indication for a SL according to various embodiments of the present disclosure.

FIG. 7 illustrates an example of timeline for pre-indication/reservation and conflict/no conflict indication for a SL 700 according to various embodiments of the present disclosure. An embodiment of the timeline for pre-indication/reservation and conflict/no conflict indication for a SL 700 shown in FIG. 7 is for illustration only.

Figure 8:
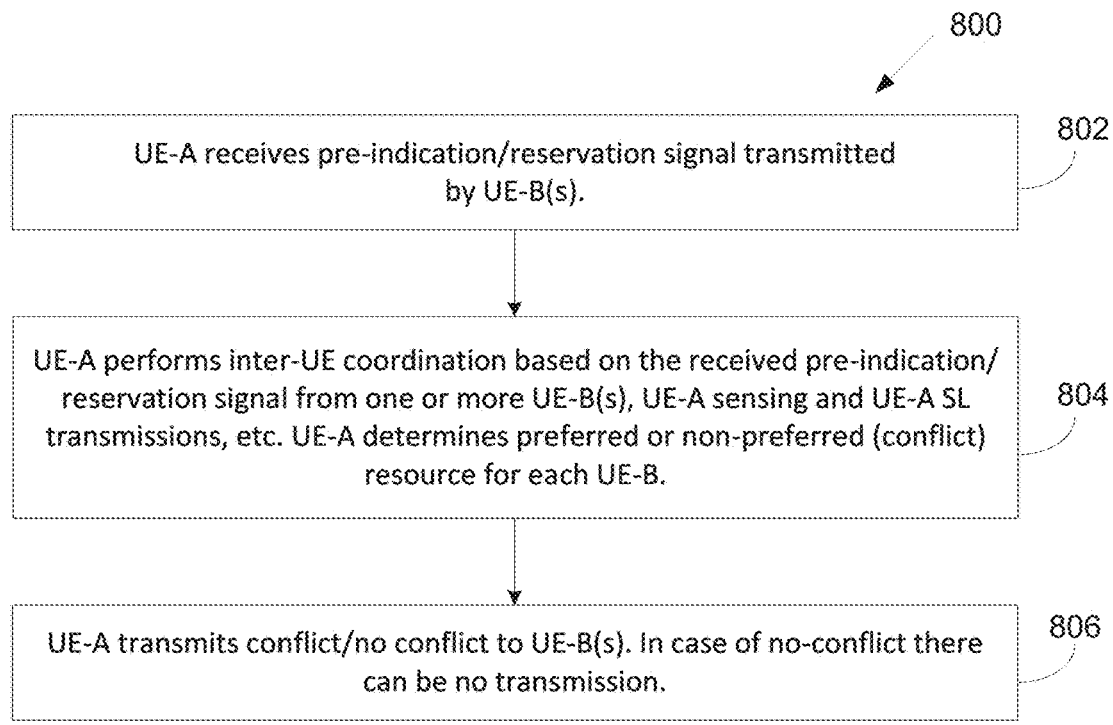
FIG. 8 illustrates a flow chart of a UE-A procedure according to various embodiments of the present disclosure.
Figure 9:
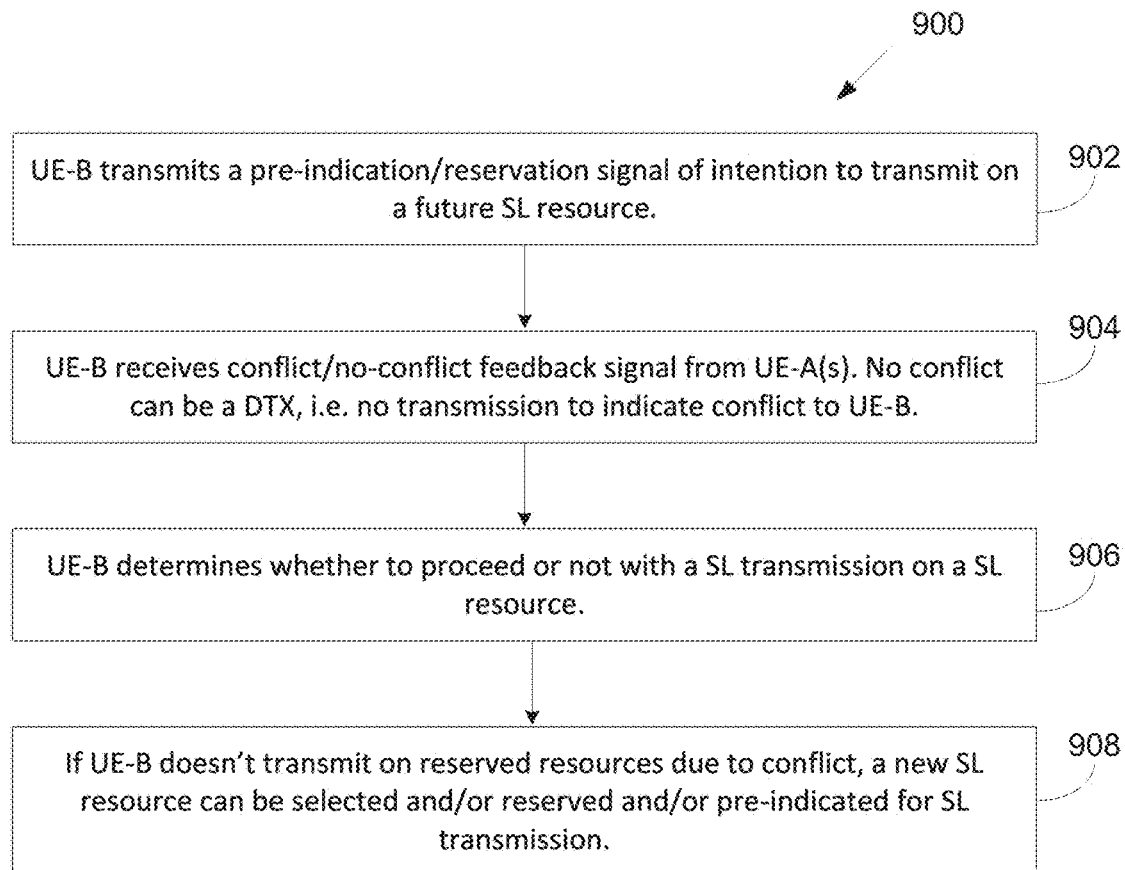
FIG. 9 illustrates a flow chart of a UE-B procedure according to various embodiments of the present disclosure.

FIG. 7 illustrates the timeline for pre-indication/reservation and conflict/no conflict indication for a SL transmission on a future SL resource. FIG. 8 illustrates the procedure for UE-A(s). FIG. 9 illustrates the procedure for UE-B(s).

FIG. 8 illustrates a flow chart of a UE-A procedure 800 according to various embodiments of the present disclosure. The UE-A procedure 800 as may be UE-A procedure 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As illustrated in FIG. 8, in step 802, the UE-A receives pre-indication/reservation signal transmitted from the UE-B(s). Subsequently, in step 804, the UE-A performs inter-UE coordination based on the received pre-indication/reservation signal from one or more UE-B(s), UE-A sensing and UE-A SL transmissions, etc. The UE-A determines preferred or non-preferred (conflict) resource for each UE-B. Finally, in step 806, the UE-A transmits conflict/no conflict to the UE-B(s). In case of no-conflict, there can be no transmission from the UE-A, i.e., UE-A does not transmit conflict information to a UE-B when that UE's reserved transmission does not have a conflict and can proceed.

FIG. 9 illustrates a flow chart of a UE-B procedure 900 according to various embodiments of the present disclosure. The UE-B procedure 900 as may be performed by a UE (e.g., 111-116 as illustrated in FIG. 1). An embodiment of the UE-B procedure 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, in step 902, the UE-B transmits a pre-indication/reservation signal of intention to transmit on a future SL resource. Subsequently, in step 904, the UE-B receives conflict/no-conflict feedback signal from UE-A(s). No conflict can be a DTX, i.e., no transmission to indicate conflict to UE-B (UE-B can proceed with a transmission on its reserved resource). Next, in step 906, the UE-B determines whether to proceed or not with a SL transmission on a SL resource by taking into account the received (or not received) conflict information. Finally, in step 908, if the UE-B does not transmit on reserved resources due to conflict, a new SL resource can be selected and/or reserved and/or pre-indicated for SL transmission.

In step 1, the UE-B(s) select resources available for SL transmission, for example this can be based on sensing performed at the UE-B(s) and/or based on earlier inter-UE co-ordination information received at the UE-B(s). The UE-B(s) (e.g., UE-B1 and UE-B2) transmit a pre-indication/reservation signal of intention to transmit on a future SL resource (e.g., resource SL1). This signal can include N resources.

In one example, the pre-indication/reservation signal is similar to release 16 SL transmission, wherein a SL transmission includes a PSCCH+PSSCH with $1^{st}$ stage/part SCI in PSCCH, $2^{nd}$ stage part/SCI and SL shared channel in PSSCH. The $1^{st}$ stage/part includes resources for the current transmission and up to 2 reserved resources for SL HARQ re-transmissions (e.g., N=1 or N=2)) in addition to indication for periodic reservation.

In another example, the pre-indication/reservation signal is similar to release 16 SL transmission, wherein a SL transmission includes a PSCCH+PSSCH with $1^{st}$ stage/part SCI in PSCCH, $2^{nd}$ stage part/SCI and SL shared channel in PSSCH. The $1^{st}$ stage/part includes resources for the current transmission and up to N reserved resources for SL transmissions. Wherein, the SL transmission can be a re-transmission of the same SL TB, or a transmission of new SL TB. In one example, N=2. In another example, N is larger than 2 and specified in the system specification and/or pre-configured and/or configured or updated by RRC signaling and/or MAC CE signaling and/or L1 control signaling.

In another example, the pre-indication/reservation signal can be: (1) standalone first stage/part SCI, i.e., PSCCH without PSSCH; (2) included in a second (or first) part/stage SCI with or without SL shared channel in the PSSCH, i.e., $1^{st}$ stage/part SCI+$2^{nd}$ stage/part with SL shared channel, or $1^{st}$ stage/part SCI+$2^{nd}$ stage/part with SL shared channel, and the pre-indication/reservation signal is included in $1^{st}$ stage/part SCI or $2^{nd}$ stage/part; (3) PSFCH like signal; (4) SL MAC CE; (5) PC5 RRC; and (6) the pre-indication/reservation signal can include N reserved resources.

The UE-A(s) receive the pre-indication/reservation signal transmitted by the UE-B(s).

In step 2, step 2 is preformed after UE-A(s) performs inter-UE coordination based on the received pre-indication/reservation signal from one or multiple UE-B(s), wherein the received signal from a UE-B can include N pre-indicated/reserved SL resources. N can be the same or different for each UE-B. UE-A(s) determines expected conflict or potential conflict out of the N resources for each UE-B. potential or expected conflict resources are resources that have a collision or conflict with another SL or UL transmission.

For example, this can be based on a determination of overlap of a first pre-indicated or reserved SL resource with a second SL resource, wherein; the second SL resource can be a pre-indicated or reserved resource of another UE, wherein overlap can be in the time and frequency, and/or The second SL resource can be based on sensing performed at the UE-A, wherein overlap can be in time and frequency, and/or The second SL resource can be a SL resource used for transmission from the UE-A, in this case overlap can be in time domain.

The second SL resource can be a SL resource that overlaps with an UL transmission such as: (1) PRACH preamble for Type 1 and Type 2 Random access procedure; (2) PUSCH for Type 2 Random access procedure; (3) message 3 RACH resources; (4) PUCCH transmissions including UCI for the Uu interface and/or SL HARQ-ACK feedback to network; (5) dynamically scheduled PUSCH transmission; (6) configured grant Type 1 or Type 2 PUSCH transmission; (7) SRS transmissions (periodic, semi-persistent and aperiodic); and (8) the conflict (i.e., whether the resource is non-preferred or not) can be further determined based on the priority of the UL transmission and the priority of the SL transmission.

The second SL resource can be an NR SL resources that overlaps with an LTE SL transmission or reception. The conflict (i.e., whether the resource is non-preferred or not) can be further determined based on the priority of the LTE SL transmission or reception and the priority of the NR SL transmission.

The UE-A can determine a preferred SL transmission on an overlapped or collided SL resource based on prioritization. Additionally, the UE-A determines a preferred or non-preferred (a non-preferred SL resource is a SL resource with a potential or expected conflict) SL resource based on the SL-RSRP, wherein the SL-RSRP can be measured using the PSCCH DMRS or the PSSCH DMRS.

If a SL resource pre-indicate/reserved by the UE-B overlaps or partially overlaps, in time and frequency domains, with a SL resource detected at the UE-A (e.g., based on sensing at the UE-A) and if: (1) measured SL RSRP of the resource causing conflict is larger than (or larger than or equal to) the SL RSRP threshold. The SL resource pre-indicated/reserved by the UE-B is in conflict; and (2) measured SL RSRP of the resource causing conflict is less than or equal to (or less than) the SL RSRP threshold. The SL resource pre-indicated/reserved by the UE-B is not in conflict.

The SL RSRP threshold can depend on one or more of: (1) priority of UE-B's transmission; and (2) priority of the overlapping SL resource at the UE-A.

UE-A(s) transmits a signal indicating conflict or no-conflict resources to the UE-B(s) (e.g., UE-B1 and UE-B2). For example, the conflict/no conflict resources (resources with a conflict) can be for the set of N pre-indicated/reserved resources from the UE-B.

the UE-B(s) (e.g., UE-B1 and UE-B2) receive an indication of which pre-indicated/reserved resources have a conflict, i.e., non-preferred, or which pre-indicated/reserved resources do not have a conflict, i.e., preferred. In one example, the absence of a signal indicating resources with conflict from UE-A at the UE-B, indicates to the UE-B that there is no conflict in the set of pre-indicated/reserved resources.

In step 3: the UE-B(s) (e.g., UE-B1 and UE-B2) determine whether to proceed or not with a SL transmission on a SL resource. For example, if a pre-indicated/reserved resource is indicated as not being in conflict (e.g., preferred or available), SL transmission can proceed on such resource).

If the UE-B(s) (e.g., UE-B1 and UE-B2) do not transmit on pre-indicated resources a new SL resource can be selected and/or reserved and/or pre-indicated for SL transmission by performing SL resource (re-) selection based on sensing performed at the UE-B(s) and/or based on earlier inter-UE co-ordination information received at the UE-B(s), e.g., resources that have been indicated to UE-B(s) as being in conflict are excluded.

In the present disclosure, the SL RSRP is measured according to 3GPP standard specification.

In one example, higher layer can configure a UE (or the UE is pre-configured) whether to indicate or not indicate the presence of potential or expected conflicts. For example, a higher configuration and/or pre-configuration can configure a UE whether or not to be the UE-A for the purpose of conflict indication to a UE-B for reserved resources.

In one example, higher layer can configure a UE (or the UE is pre-configured): (1) whether to request or not request a potential or expect conflict indication (conflict information) for reserved resources from another UE, and/or (2) whether to receive and respond to or not receive an indication about the presence of potential or expected conflicts for reserved resources.

For example, a higher layer configuration and/or pre-configuration can configure a UE whether or not to be the UE-B for the purpose: (1) requesting a conflict indication from another UE (e.g., UE-A) for reserved resources, and/or (2) responding to a conflict indication from another UE (e.g., UE-A) for reserved resources.

In one example, a resource pool can be configured (or pre-configured) whether to support or not support the indication or non-indication of the presence of expected or potential conflicts.

In one example, a UE (e.g., UE-A) can be indicated by an SCI format (e.g., first stage/part SCI or second stage/part SCI) to transmit a channel (e.g., PSFCH or PSFCH-like) channel with conflict information, in response to the reception of the SCI and corresponding physical channels (PSCCH or PSSCH). The UE provides conflict information that includes: (1) conflict or no-conflict for the reserved SL resource(s); and (2) only conflict for the reserved SL resource(s).

In one example, the higher layer parameter "sl-NumReservedBits" is set to at least "2," with one reserved bit in SCI Format 1-A for indicating that a UE (e.g., UE-B) can receive conflict feedback. In one example, this bit is set to 1 when a UE (e.g., UE-B) can receive conflict feedback, otherwise this bit is set to 0. A Rel-16 UE that does not support this feature sets reserved bits to 0 when transmitting. A Rel-16 UE that does not support this feature ignores reserved bits when receiving.

In one example, the higher layer parameter "sl-NumReservedBits" is set to at least "1," with one reserved bit in SCI Format 1-A for indicating that a UE (e.g., UE-B) can receive conflict feedback. In one example, this bit is set to 1 when a UE (e.g., UE-B) can receive conflict feedback, otherwise this bit is set to 0. A Rel-16 UE that does not support this feature sets reserved bits to 0 when transmitting. A Rel-16 UE that does not support this feature ignores reserved bits when receiving.

In one example, the higher layer parameter "sl-NumReservedBits" is set to at least "2," with one reserved bit in SCI Format 1-A for indicating that a UE (e.g., UE-B) can receive conflict or no-conflict feedback. In one example, this bit is set to 1 when a UE (e.g., UE-B) can receive conflict feedback, otherwise this bit is set to 0. A Rel-16 UE that does not support this feature sets reserved bits to 0 when transmitting. A Rel-16 UE that does not support this feature ignores reserved bits when receiving.

In one example, the higher layer parameter "sl-NumReservedBits" is set to at least "1," with one reserved bit in SCI Format 1-A for indicating that a UE (e.g., UE-B) can receive conflict or no-conflict feedback. In one example, this bit is set to 1 when a UE (e.g., UE-B) can receive conflict feedback, otherwise this bit is set to 0. A Rel-16 UE that does not support this feature sets reserved bits to 0 when transmitting. A Rel-16 UE that does not support this feature ignores reserved bits when receiving.

In one example, a first UE (e.g., UE-B) can indicate by an SCI format (e.g., first stage/part SCI or second stage/part SCI) to a second UE (e.g., UE-A) to transmit a channel (e.g., PSFCH or PSFCH-like) channel with conflict information, in response to the reception of the SCI and corresponding physical channels (PSCCH or PSSCH) transmitted by the first UE. The first UE can receive conflict information that includes: (1) conflict or no-conflict or the reserved SL resource(s); and (2) only conflict on the reserved SL resource(s).

The SCI can include indication to transmit a conflict indication and reserved resources to the first UE (e.g., UE-B), e.g., UE-B can receive conflict information. Alternatively, the SCI includes just reserved resources and the UE is (pre-)configured to transmit or not transmit a conflict indication for the reserved resources.

In one example, the higher layer parameter "sl-NumReservedBits" is set to at least "2," with one reserved bit in SCI Format 1-A for indicating that a UE (e.g., UE-B) can receive conflict feedback. In one example, this bit is set to 1 when a UE (e.g., UE-B) can receive conflict feedback, otherwise this bit is set to 0. A Rel-16 UE that does not support this feature sets reserved bits to 0 when transmitting. A Rel-16 UE that does not support this feature ignores reserved bits when receiving.

In one example, the higher layer parameter "sl-NumReservedBits" is set to at least "1," with one reserved bit in SCI Format 1-A for indicating that a UE (e.g., UE-B) can receive conflict feedback. In one example, this bit is set to 1 when a UE (e.g., UE-B) can receive conflict feedback, otherwise this bit is set to 0. A Rel-16 UE that does not support this feature sets reserved bits to 0 when transmitting. A Rel-16 UE that does not support this feature ignores reserved bits when receiving.

In one example, the higher layer parameter "sl-NumReservedBits" is set to at least "2", with one reserved bit in SCI Format 1-A for indicating that a UE (e.g., UE-B) can receive conflict or no-conflict feedback. In one example, this bit is set to 1 when a UE (e.g., UE-B) can receive conflict feedback, otherwise this bit is set to 0. A Rel-16 UE that does not support this feature sets reserved bits to 0 when transmitting. A Rel-16 UE that does not support this feature ignores reserved bits when receiving.

In one example, the higher layer parameter "sl-NumReservedBits" is set to at least "1," with one reserved bit in SCI Format 1-A for indicating that a UE (e.g., UE-B) can receive conflict or no-conflict feedback. In one example, this bit is set to 1 when a UE (e.g., UE-B) can receive conflict feedback, otherwise this bit is set to 0. A Rel-16 UE that does not support this feature sets reserved bits to 0 when transmitting. A Rel-16 UE that does not support this feature ignores reserved bits when receiving.

To allocate PSFCH or PSFCH-like resources for conflict feedback, a multiplexing PSFCH or PSFCH-like resources for conflict feedback with the PSFCH resources for HARQ-ACK feedback is provided. The multiplexing can be done in the time domain, or the frequency domain or cyclic shift domain.

In a time domain, when $N_{PSSCH}^{PSFCH}$ is greater than 1 (i.e., 2 or 4), the PSFCH-like resources can use one or more of the slots unused for PSFCH for HARQ-ACK feedback. However, if the resource pool is being used by Rel-16 UEs, Rel-16 UEs would be unaware of the presence of PSFCH in these slots, which could cause interference.

In a frequency domain. In this case, the PSFCH slots for HARQ-ACK feedback and for conflict feedback are the same. However, different PRB are allocated to the PSFCH for HARQ-ACK feedback (these are provided by higher layer parameter sl-PSFCH-RB-Set) and PSFCH-like resources for conflict feedback, which can be provided by a new higher layer parameter e.g., sl-PSFCH-Conflict-RB-Set.

In a code domain (cyclic shift domain). In this case, the PSFCH slots and PRBs for HARQ-ACK feedback and for conflict feedback are the same, but different cyclic shifts can be used for HARQ-ACK feedback and conflict feedback. For example, if the number of cyclic shift pairs in a PRB is 3. For HARQ-ACK feedback, cyclic shift pairs (0, 6), (2, 8) and (4, 10) are used. The unused cyclic shift pairs can be used for conflict feedback, in this case, the cyclic shift pairs used for conflict feedback are (1, 7), (3, 9) and (5, 11). In this case, the conflict feedback and HARQ-ACK Feedback are multiplexed in the same PRB. Please refer to FIGS. 13A and 13B and FIGS. 14A and 14B as an example.

For example, when multiplexing PSFCH or PSFCH-like format for conflict feedback with PSFCH format for HARQ-ACK feedback, the following options can be considered: (1) in option 1, multiplexing conflict feedback and HARQ-ACK feedback in PSFCH is not allowed in the same PRB. Different PRBs are used for conflict feedback and HARQ-ACK feedback (e.g., frequency division multiplexing); and (2) in option 2, multiplexing conflict feedback and HARQ-ACK feedback in PSFCH is allowed in the same PRB. Different cyclic shift pairs are used conflict feedback and HARQ-ACK feedback (e.g., code (cyclic shift) division multiplexing).

In one example, the UE uses PSFCH or PSFCH-like resources for conflict indication.

In example, slots for PSFCH or PSFCH-like resources for conflict indication is provided.

In one example, a UE can be provided, by sl-PSFCH-Period (same parameter for PSFCH resources for HARQ-ACK) a number of slots in a resource pool for a period of PSFCH or PSFCH-like transmission for conflict indication. If the number is zero, PSFCH transmissions from the UE are disabled for HARQ-ACK feedback and for conflict feedback. A UE expects that a slot $t'^{SL}_k$, wherein $0 \leq k < T'_{max}$ has a PSFCH transmission occasion for HARQ-ACK feedback and for conflict feedback if k mod $N_{PSSCH}^{PSFCH}=0$, wherein; $t'^{SL}_k$ is a logical slot in the resource pool, $T'_{max}$ is the maximum number of logical slots in the resource pool in 1024 frames, and $N_{PSSCH}^{PSFCH}$ is provided by sl-PSFCH-Period.

In this example, a UE can be (pre-)configured to disable HARQ-ACK feedback and allow conflict feedback in the resources that would have been used by HARQ-ACK feedback.

Alternatively, in this example, the HARQ-ACK feedback and the conflict feedback are frequency division multiplexed in different PRBs.

Alternatively, in this example, the HARQ-ACK feedback and the conflict feedback are code division multiplexed (e.g., using different cyclic shifts) in the same PRB.

In one example, a UE can be provided, by sl-PSFCH-Period (same parameter for PSFCH resources for HARQ-ACK) a number of slots in a resource pool for a period of PSFCH or PSFCH-like transmission for conflict indication. If the number is zero, PSFCH transmissions from the UE are disabled for HARQ-ACK feedback and for conflict feedback. A UE expects that a slot $t'^{SL}_k$, wherein $0 \leq k < T'_{max}$ has a PSFCH transmission occasion for conflict feedback if k mod $N_{PSSCH}^{PSFCH}=M$, wherein, $t'^{SL}_k$ is a logical slot in the resource pool, $T'_{max}$ is the maximum number of logical slots in the resource pool in 1024 frames, $N_{PSSCH}^{PSFCH}$ is provided by sl-PSFCH-Period, and M is a parameter provided by higher layers, pre-configured or specified in the system specifications, such that $0 \leq M < N_{PSSCH}^{PSFCH}$. If $M \neq 0$, the slots for PSFCH used for HARQ-ACK feedback are different from the slots used for conflict feedback.

In one example, a UE can be provided, by a new higher layer parameter (e.g., sl-PSFCH-Conflict-Period) a number of slots in a resource pool for a period of PSFCH or PSFCH-like transmission for conflict feedback indication. If the number is zero, PSFCH transmissions from the UE are disabled for conflict feedback. A UE expects that a slot $t'^{SL}_k$, wherein $0 < k < T'_{max}$ has a PSFCH transmission occasion for conflict feedback if k mod $N_{PSSCH}^{PSFCH-Conflict}=M$, wherein; $t'^{SL}_k$ is a logical slot in the resource pool, $T'_{max}$ is the maximum number of logical slots in the resource pool in 1024 frames, $N_{PSSCH}^{PSFCH-Conflict}$ is provided by sl-PSFCH-Conflict-Period, and M is a parameter provided by higher layers, pre-configured or specified in the system specifications, such that $0 \leq M < N_{PSSCH}^{PSFCH}$. In one example M=0.

In example, PRBs for PSFCH or PSFCH-like resources for conflict feedback indication are provided.

In one example, a UE can be provided by a new higher layer parameter (e.g., sl-PSFCH-Conflict-RB-Set) a set of $M_{PRB,set}^{PSFCH-Conflict}$ PRBs in a resource pool for PSFCH or PSFCH-like transmission for conflict feedback in a PRB of a resource pool. For a number of $N_{subch}$ sub-channels for resource pool, provided by higher layer parameter sl-NumSubchannel, and a number of SL slots associated with a PSFCH slot for conflict feedback that is less than or equal to $N_{PSSCH}^{PSFCH}$ or $N_{PSSCH}^{PSFCH-Conflict}$, the UE allocates: $[(i+j \cdot N_{PSSCH}^{PSFCH}) \cdot M_{subch,slot}^{PSFCH-Conflict}(i+1+j \cdot N_{PSSCH}^{PSFCH}) \cdot M_{subch,slot}^{PSFCH-Conflict}-1]$ PRBs from the $M_{PRB,set}^{PSFCH-Conflict}$ PRBs, or $[(i+j \cdot N_{PSSCH}^{PSFCH-Conflict}) \cdot M_{subch,slot}^{PSFCH-Conflict}, (i+1+j \cdot N_{PSSCH}^{PSFCH-Conflict}) \cdot M_{subch,slot}^{PSFCH-Conflict}-1]$ PRBs from the $M_{PRB,set}^{PSFCH-Conflict}$ PRBs to slot i among the SL slots associated with the PSFCH or PSFCH-like slot for conflict indication and sub-channel j, where, in one example i is the slot of PSCCH and j is the sub-channel of the PSCCH that reserves the conflict resource (the PSFCH for conflict indication is transmitted after slot i), in another example i is the slot of PSSCH reserved resource with conflict and j is the starting sub-channel of the PSSCH reserved resource with conflict (the PSFCH for conflict indication is transmitted before slot i), and $M_{subch,slot}^{PSFCH-Conflict} = M_{PRB,set}^{PSFCH-Conflict}/N_{subch} \cdot N_{PSSCH}^{PSFCH}$, $0 \le i < N_{PSSCH}^{PSFCH}$, $0 \le j < N_{subch}$, or $M_{subch,slot}^{PSFCH-Conflict} = M_{PRB,set}^{PSFCH-Conflict}/(N_{subch} \cdot N_{PSSCH}^{PSFCH-Conflict})$, $0 \le i < N_{PSSCH}^{PSFCH-Conflict}$, $0 \le j < N_{subch}$ and the allocation starts in an ascending order of i and continues in an ascending order of j. The UE expects that $M_{PRB,set}^{PSFCH-Conflict}$ is a multiple of $N_{subch} \cdot N_{PSSCH}^{PSFCH}$ or $N_{subch} \cdot N_{PSSCH}^{PSFCH-Conflict}$.

In one example, a UE can be provided by higher layer parameter sl-PSFCH-RB-Set (same parameter as used for PSFCH resources for HARQ-ACK) a set of $M_{PRB,set}^{PSFCH}$ PRBs in a resource pool for PSFCH or PSFCH-like transmission for conflict feedback in a PRB of a resource pool same as those for HARQ-ACK feedback. For a number of $N_{subch}$ sub-channels for resource pool, provided by higher layer parameter sl-NumSubchannel, and a number of SL slots associated with a PSFCH slot for conflict feedback that is less than or equal to $N_{PSSCH}^{PSFCH}$ or $N_{PSSCH}^{PSFCH-Conflict}$, the UE allocates: $[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH}-1]$ PRBs from the $M_{PRB,set}^{PSFCH}$ PRBs, or $[(i+j \cdot N_{PSSCH}^{PSFCH-Conflict}) \cdot M_{subch,slot}^{PSFCH-Conflict}, (i+1+j \cdot N_{PSSCH}^{PSFCH-Conflict}) \cdot M_{subch,slot}^{PSFCH-Conflict}-1]$ PRBs from the $M_{PRB,set}^{PSFCH}$ PRBs to slot i among the SL slots associated with the PSFCH or PSFCH-like slot for conflict indication and sub-channel j, where: in one example i is the slot of PSCCH and j is the sub-channel of the PSCCH that reserves the conflict resource (the PSFCH for conflict indication is transmitted after slot i), and in another example i is the slot of PSSCH reserved resource with conflict and j is the starting sub-channel of the PSSCH reserved resource with conflict (the PSFCH for conflict indication is transmitted before slot i), and $M_{subch,slot}^{PSFCH} = M_{PRB,set}^{PSFCH}/(N_{subch} \cdot N_{PSSCH}^{PSFCH})$, $0 \le i < N_{PSSCH}^{PSFCH}$, $0 \le j < N_{subch}$, or $M_{subch,slot}^{PSFCH-Conflict} = M_{PRB,set}^{PSFCH}/(N_{subch} \cdot N_{PSSCH}^{PSFCH-Conflict})$, $0 \le i < N_{PSSCH}^{PSFCH-Conflict}$, $0 \le j < N_{subch}$ and the allocation starts in an ascending order of i and continues in an ascending order of j. The UE expects that $M_{PRB,set}^{PSFCH}$ is a multiple of $N_{subch} \cdot N_{PSSCH}^{PSFCH}$ or $N_{subch} \cdot N_{PSSCH}^{PSFCH-Conflict}$.

In example, PSFCH or PSFCH-like resources available for conflict indication is provided. The UE determines the number of PSFCH or PSFCH-like resources available for multiplexing conflict feedback information in a PSFCH or PSFCH-like resource as $R_{PRB,CS}^{PSFCH-Conflict} = N_{type}^{PSFCH-Conflict} \cdot M_{subch,slot}^{PSFCH-Conflict} \cdot N_{CS}^{PSFCH-Conflict}$.

In one example, $N_{type}^{PSFCH-Conflict}=1$, the $M_{subch,slot}^{PSFCH-Conflict}$ PRBs are associated with the sub-channel used for resource reservation (e.g., the sub-channel containing the PSCCH that signals the reserved resources).

In another example, $N_{type}^{PSFCH-Conflict}$ depends on higher layer parameter sl-PSFCH-CandidateResourceType (same parameter as used for PSFCH resources for HARQ-ACK).

If sl-PSFCH-CandidateResourceType is configured as startSubCH, $N_{type}^{PSFCH-Conflict}=$type 1, the $M_{subch,slot}^{PSFCH-Conflict}$ PRBs are associated with the sub-channel used for resource reservation (e.g., the sub-channel containing the PSCCH that signals the reserved resources).

If sl-PSFCH-CandidateResourceType is configured as allocSubCH, $N_{type}^{PSFCH-Conflict}=N_{subch}^{PSSCH}$, the $N_{subch}^{PSSCH} \cdot M_{subch,slot}^{PSFCH-Conflict}$ PRBs are associated with the $N_{subch}^{PSSCH}$ sub-channel(s). $N_{subch}^{PSSCH}$ are the sub-channels of the PSSCH scheduled by the reservation signal (e.g., the sub-channel containing the PSCCH that signals the reserved resources can also schedule a PSSCH with $N_{subch}^{PSSCH}$ sub-channels). If the reservation signal/channel does not schedule a PSSCH, $N_{subch}^{PSSCH}=1$, and the sub-channel is that of the reservation signal.

In another example, $N_{type}^{PSFCH-Conflict}$ depends on a new higher layer parameter (e.g., sl-PSFCH-Conflict-CandidateResourceType) (different parameter from that used for PSFCH resources for HARQ-ACK). If sl-PSFCH-Conflict-CandidateResourceType is configured as startSubCH, $N_{type}^{PSFCH-Conflict}=1$, the $M_{subch,slot}^{PSFCH-Conflict}$ PRBs are associated with the sub-channel used for resource reservation (e.g., the sub-channel containing the PSCCH that signals the reserved resources).

If sl-PSFCH-Conflict-CandidateResourceType is configured as allocSubCH, $N_{type}^{PSFCH-Conflict}=N_{subch}^{PSSCH}$, the $N_{subch}^{PSSCH} \cdot M_{subch,slot}^{PSFCH-Conflict}$ PRBs are associated with the $N_{subch}^{PSSCH}$ sub-channel(s). $N_{subch}^{PSSCH}$ are the sub-channels of the PSSCH scheduled by the reservation signal (e.g., the sub-channel containing the PSCCH that signals the reserved resources can also schedule a PSSCH with $N_{subch}^{PSSCH}$ sub-channels). If the reservation signal/channel does not schedule a PSSCH, $N_{subch}^{PSSCH}=1$, and the sub-channel is that of the reservation signal.

In one example, $M_{subch,slot}^{PSFCH-Conflict}$ is as discussed above.

In another example, $M_{subch,slot}^{PSSCH-Conflict}$ can equal $M_{subch,slot}^{PSSCH}$, when the slots for PSFCH or PSFCH-like resources for conflict feedback and PRBs for PSFCH or PSFCH-like resources for conflict feedback are the same as those PSFCH resources for HARQ-ACK feedback.

In one example, $N_{CS}^{PSSCH-Conflict}$ is the number of cyclic shift or cyclic shift pairs configured for PSFCH resource in a resource pool as provided by higher layer parameter sl-NumMuxCS-Pair (same parameter as used for PSFCH resources for HARQ-ACK), i.e., $N_{CS}^{PSSCH-Conflict}=N_{CS}^{PSSCH}$, wherein $N_{CS}^{PSSCH}$ is the corresponding parameter for HARQ-ACK feedback on PSFCH.

In one example, $N_{CS}^{PSSCH-Conflict}$ is the number of cyclic shift or cyclic shift pairs configured for PSFCH resource in a resource pool as provided by a new higher layer parameter (e.g., sl-NumMuxCS-Conflict-Pair) (different parameter from that used for PSFCH resources for HARQ-ACK).

In example, gap between slot with indication of reserved resources and slot with PSFCH or PSFCH-like resource for conflict feedback is provided.

In one example, in response to an indication of reserved resource in slot (e.g., reserved resources are indicated in PSCCH), and when conflict indication feedback for potential or expected conflicts is enabled (e.g., as described herein) the UE transmits PSFCH or PSFCH-like resource for conflict feedback in a first slot that includes the PSFCH or PSFCH-like resources for conflict feedback and is at least a number of slots provided by higher layer parameter sl-MinTimeGapPSFCH (same parameter as used for HARQ-ACK feedback) after the slot of reception of the resource reservation.

In one example, in response to an indication of reserved resource in slot (e.g., reserved resources are indicated in PSCCH), and when conflict indication feedback for potential or expected conflicts is enabled (e.g., as described herein) the UE transmits PSFCH or PSFCH-like resource for conflict feedback in a first slot that includes the PSFCH or PSFCH-like resources for conflict feedback and is at least a number of slots provided by an new higher layer parameter sl-MinTimeGapPSFCHConflict (different parameter from that used for HARQ-ACK feedback) after the slot of reception of the resource reservation.

In one example, common PSFCH or PSFCH-like resources for conflict feedback for all UE-Bs is provided.

In this example, the PSFCH or PSFCH-like resource for conflict feedback depends on the UE-B indicating reserved resources as well as on sub-channel channel and slot used by the UE-B to signal the reserved resource (e.g., signaling the reserved resource in PSCCH in a sub-channel and a slot). If the PSCCH of the UE-B is received by multiple UE-A that provide conflict feedback to the UE-B, the PSFCH or PSFCH-like resource for conflict feedback is the same for all UE-A's to the UE-B.

In one example, if the UE-A finds a conflict on a reserved resource of the UE-B, the UE-A indicates a conflict on the PSFCH or PSFCH-like resource for conflict feedback. If there is no conflict detected by the UE-A, there is no transmission on the PSFCH or PSFCH-like resource for conflict feedback. In this example, if the UE-B receives PSFCH or PSFCH-like with a cyclic shift indicating a conflict, it would be an indication to the UE-B that at least one UE-A has detected a conflict. Otherwise, if there is no detection of the PSFCH or PSFCH-like at the UE-B, it would be an indication to the UE-B that no UE-A has detected a conflict.

In another example, if the UE-A finds a conflict on a reserved resource of the UE-B, the UE-A indicates a conflict on the PSFCH or PSFCH-like resource for conflict feedback. If there is no conflict detected by the UE-A and the UE-A is the target of the UE-B's transmission, the UE-A indicates no conflict on the PSFCH or PSFCH-like resource for conflict feedback. In this example, if the UE-B receives PSFCH or PSFCH-like with a cyclic shift indicating a conflict, it would be an indication to the UE-B that at least one UE-A has detected a conflict. If the UE-B receives PSFCH or PSFCH-like with a cyclic shift indicating no conflict, it would be an indication to the UE-B that at least one UE-A has not detected a conflict. If the UE-B receives PSFCH or PSFCH-like with a cyclic shift indicating a conflict and a cyclic shift indicating no conflict, it would be an indication to the UE-B that at least one UE-A has detected a conflict and at least one UE-A has detected no conflict. Otherwise, if there is no detection of the PSFCH or PSFCH-like at the UE-B, it would be an indication to the UE-B that no UE-A has received the reservation signal to provide feedback.

Figure 10:
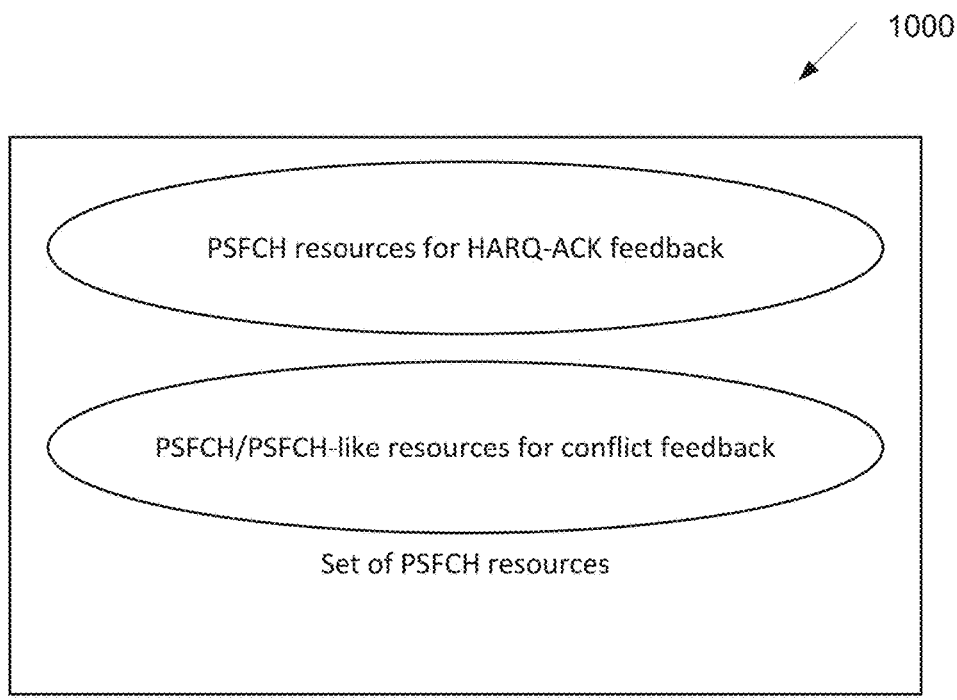
FIG. 10 illustrates an example of PSFCH resources for HARQ-ACK feedback and the PSFCH or PSFCH-like resources for conflict feedback according to various embodiments of the present disclosure.

In this example, the PSFCH resources for HARQ-ACK feedback and the PSFCH or PSFCH-like resources for conflict feedback are different as indicated in FIG. 10.

FIG. 10 illustrates an example of PSFCH resources for HARQ-ACK feedback and the PSFCH or PSFCH-like resources for conflict feedback 1000 according to various embodiments of the present disclosure. An embodiment of the PSFCH resources for HARQ-ACK feedback and the PSFCH or PSFCH-like resources for conflict feedback 1000 shown in FIG. 10 is for illustration only.

In one example, the PSFCH resources for HARQ-ACK feedback and the PSFCH or PSFCH-like resources for conflict feedback are in different slots. The PRBs for PSFCH or PSFCH-like resources for conflict feedback can be the same or different from the PRBs for PSFCH resources for HARQ-ACK feedback.

In another example, the PSFCH resources for HARQ-ACK feedback and the PSFCH or PSFCH-like resources for conflict feedback are in the same slots. The PRBs for PSFCH or PSFCH-like resources for conflict feedback and the PRBs for PSFCH resources for HARQ-ACK feedback are different.

In one example, the PSFCH resources for HARQ-ACK feedback and the PSFCH or PSFCH-like resources for conflict feedback are in the same slots. The PRBs for PSFCH or PSFCH-like resources for conflict feedback can be the same as the PRBs for PSFCH resources for HARQ-ACK feedback. Different cyclic shifts are used for PSFCH resources for HARQ-ACK feedback and PSFCH or PSFCH-like resources for conflict feedback.

The UE-A determines the set of resources, i.e., $R_{PRB,CS}^{PSFCH-conflict}$ for conflict feedback as described herein. A UE determines an index of the PSFCH or PSFCH-like resource for conflict feedback in response to a reservation indication e.g., in a PSCCH as shown in following examples.

In one example: $(P_{ID}) \bmod R_{PRB,CS}^{PSFCH-conflict}$, i.e., $M_{ID}=0$, where $P_{ID}$ is a physical layer source ID provided by SCI format 2-A or 2-B. In this case there is a single reserved resource (per UE-B) for indication of conflict feedback (whether the reservation is for one or more resources).

In a second example: $(N \cdot P_{ID}+n) \bmod R_{PRB,CS}^{PSFCH-conflict}$ where $P_{ID}$ is a physical layer source ID provided by SCI format 2-A or 2-B. Wherein, N is the number of reserved resource that can be signaled in a reservation signal/channel (e.g., PSCCH), N can be configured by higher layers or specified in the system specification. n is the index of the reservation, starting from 0 to N−1, i.e., there are N PSFCH/PSFCH-like resources for conflict indication for the N reserved resource, i.e., one PSFCH/PSFCH-like resource for each reserved resource.

In a third example: $(N1 \cdot P_{ID}+n) \bmod R_{PRB,CS}^{PSFCH-conflict}$ where $P_{ID}$ is a physical layer source ID provided by SCI format 2-A or 2-B. Wherein, N1≤N, wherein N is the number of reserved resource that can be signaled in a reservation signal/channel (e.g., PSCCH), N can be configured by higher layers or specified in the system specification. N1 is the number of PSFCH resources for feedback to a UE-B, N1 can be configured by higher layers or specified in the system specification. n is the index of the PSFCH/PSFCH-like resource for conflict feedback, starting from 0 to N1−1, i.e., there are N1 PSFCH/PSFCH-like resources for conflict indication for the N reserved resource. One example of mapping is that conflict feedback is provide for only the first N1 reserved resources.

In various examples, one set of resources for the UE-Bs that have a transmission targeting the UE-A and a second set of resource for the UE-Bs that do not have a transmission targeting UE-B is provided.

Figure 11:
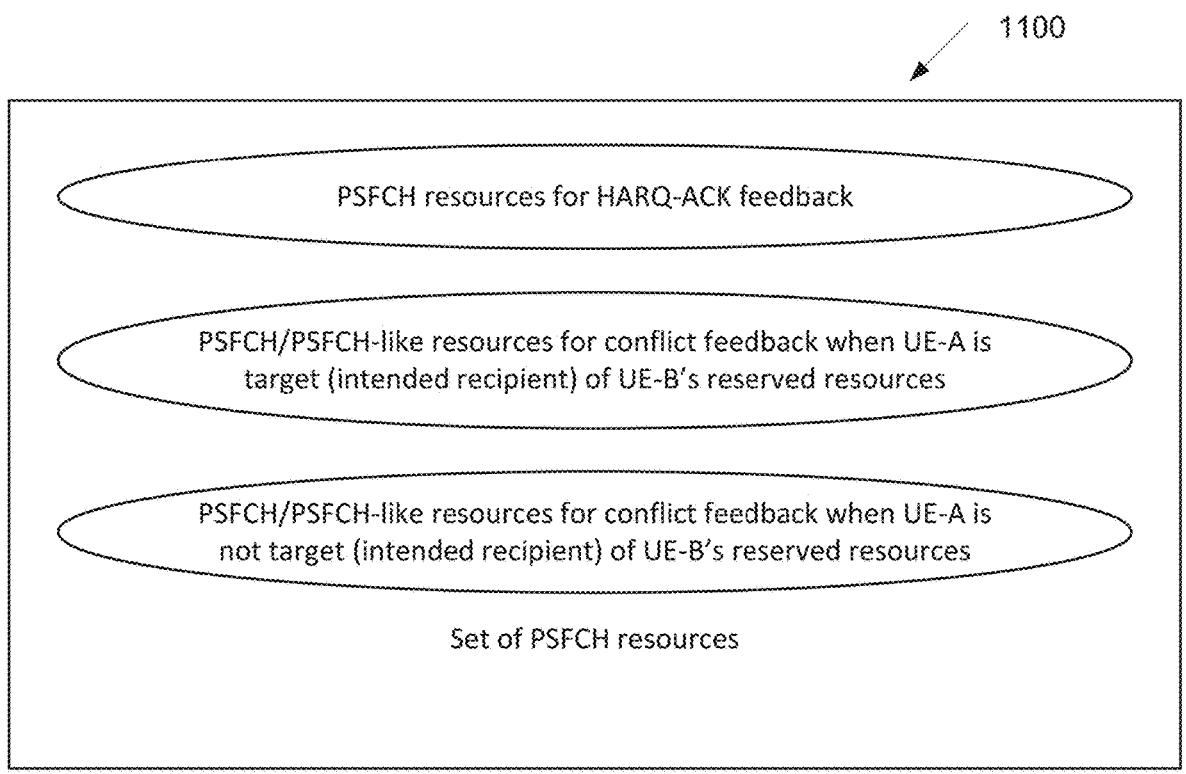
FIG. 11 illustrates another example of PSFCH resources for HARQ-ACK feedback and the PSFCH or PSFCH-like resources for conflict feedback according to various embodiments of the present disclosure.

FIG. 11 illustrates another example of PSFCH resources for HARQ-ACK feedback and the PSFCH or PSFCH-like resources for conflict feedback 1100 according to various embodiments of the present disclosure. An embodiment of the PSFCH resources for HARQ-ACK feedback and the PSFCH or PSFCH-like resources for conflict feedback 1100 shown in FIG. 11 is for illustration only.

In this example, there are two sets of resources conflict indication as indicated in FIG. 11. The first set of resources is used for the UE-B's that have a UE-A providing conflict feedback as a target UE. The second set of resources is used for the UE-B's that do not have UE-A providing conflict feedback has a target UE, in some examples those UE-B's are causing conflict to the reserved resources of other UE-B's that have the UE-A as a target UE.

In this example, the PSFCH or PSFCH-like resource for conflict feedback in each set depends on the UE-B indicating reserved resources as well as on sub-channel channel and slot used by the UE-B to signal the reserved resource (e.g., signaling the reserved resource in PSCCH in a sub-channel and a slot). If the PSCCH of the UE-B is received by multiple UE-A that provide conflict feedback to the UE-B, the PSFCH or PSFCH-like resource for conflict feedback is the same for all UE-A's within each set to that UE-B. The determination of which set to use is based on whether the UE-B has TB for the conflicting resource targeting UE-A or not.

In one example, if the UE-A finds a conflict on a reserved resource of the UE-B, the UE-A indicates a conflict on the PSFCH or PSFCH-like resource for conflict feedback. The set of resources used by the UE-A to indicate a conflict depends on whether the UE-A is the target of the UE-B's transmission on the conflicted resource or not. If there is no conflict detected by the UE-A, there is no transmission on the PSFCH or PSFCH-like resource for conflict feedback. In this example, if the UE-B receives PSFCH or PSFCH-like with a cyclic shift indicating a conflict, it would be an indication to the UE-B that at least one UE-A has detected a conflict. Otherwise, if there is no detection of the PSFCH or PSFCH-like at the UE-B, it would be an indication to the UE-B that no UE-A has detected a conflict. The UE-B checks conflict on two resources, the first resource corresponds to a conflict on a resource from the UE-A that is the target of UE-B's transmission on the reserved resource. The second resource corresponds to a conflict to a resource from the UE-A that is not the target of UE-B's transmission on the reserved resource.

In another example, if the UE-A finds a conflict on a reserved resource of UE-B, the UE-A indicates a conflict on the PSFCH or PSFCH-like resource for conflict feedback. The set of resources used by the UE-A to indicate a conflict depends on whether the UE-A is the target of the UE-B's transmission on the conflicted resource or not. If there is no conflict detected by the UE-A and the UE-A is the target of UE-B's transmission, the UE-A indicates no conflict on the PSFCH or PSFCH-like resource for conflict feedback. In this example, if the UE-B receives PSFCH or PSFCH-like with a cyclic shift indicating a conflict, it would be an indication to the UE-B that at least one UE-A has detected a conflict. If the UE-B receives PSFCH or PSFCH-like with a cyclic shift indicating no conflict, it would be an indication to the UE-B that at least one UE-A has not detected a conflict. If the UE-B receives PSFCH or PSFCH-like with a cyclic shift indicating a conflict and a cyclic shift indicating no conflict, it would be an indication to the UE-B that at least one UE-A has detected a conflict and at least one UE-A has detected no conflict. Otherwise, if there is no detection of the PSFCH or PSFCH-like at the UE-B, it would be an indication to the UE-B that no UE-A has received the reservation signal to provide feedback. The UE-B checks conflict on two resources, the first resource corresponds to a conflict on a resource from the UE-A that is the target of UE-B's transmission on the reserved resource. The second resource corresponds to a conflict to a resource from the UE-A that is not the target of UE-B's transmission on the reserved resource. The UE-B checks no conflict on a resource from the UE-A that is the target of UE-B's transmission on the reserved resource.

The UE-A determines the available resources for conflict feedback. There are two sets of resources for conflict feedback, this is an adaptation of examples herein where two sets of resources are determined with corresponding higher layer parameters: (1) first set of resources if the UE-A is the target of UE-B on the conflicting resource: $R_{PRB,CS}^{PSFCH-conflict1} = N_{type}^{PSFCH-conflict1} \cdot M_{subch,slot}^{PSFCH-conflict1} \cdot N_{CS}^{PSFCH-conflict1}$ and second set of resources if the UE-A is not the target of UE-B on the conflicting resource: $R_{PRB,CS}^{PSFCH-conflict2} = N_{type}^{PSFCH-conflict2} \cdot M_{subch,slot}^{PSFCH-conflict2} \cdot N_{CS}^{PSFCH-conflict2}$.

In this example, the PSFCH resources for HARQ-ACK feedback and the PSFCH or PSFCH-like resources for conflict feedback are different as illustrated in FIG. 11.

In one example, the PSFCH resources for HARQ-ACK feedback and the PSFCH or PSFCH-like resources for conflict feedback are in different slots. To differentiate PSFCH or PSFCH-like resource for conflict feedback with the UE-A as a target of the UE-B on the conflicting resource or the UE-A is not a target of UE-B on the conflicting resource, different sets of PRBs can be used for example: (1) if the UE-A is the target of UE-B on the conflicting resource, the set of PRBs for conflict feedback is given by a first higher layer parameter (e.g., sl-PSFCH-RB-Conflict-First-Set); and (2) if the UE-A is not the target of UE-B on the conflicting resource, the set of PRBs for conflict feedback is given by a second higher layer parameter (e.g., sl-PSFCH-Conflict-Second-RB-Set).

In another example, the PSFCH resources for HARQ-ACK feedback and the PSFCH or PSFCH-like resources for conflict feedback are in the same slots. The PRBs for PSFCH or PSFCH-like resources for conflict feedback and the PRBs for PSFCH resources for HARQ-ACK feedback are different. Furthermore, to differentiate PSFCH or PSFCH-like resource for conflict feedback with the UE-A as a target of the UE-B on the conflicting resource or the UE-A is not a target of UE-B on the conflicting resource, different sets of PRBs can be used for example: (1) if the UE-A is the target of UE-B on the conflicting resource, the set of PRBs for conflict feedback is given by a first higher layer parameter (e.g., sl-PSFCH-Conflict-First-RB-Set); and (2) if the UE-A is not the target of UE-B on the conflicting resource, the set of PRBs for conflict feedback is given by a second higher layer parameter (e.g., sl-PSFCH-Conflict-Second-RB-Set).

In one example, the PSFCH resources for HARQ-ACK feedback and the PSFCH or PSFCH-like resources for conflict feedback for resources that has the UE-A as its target UE are in the same slots. The PRBs for PSFCH or PSFCH-like resources for conflict feedback for resources that has the UE-A as its target UE can be the same as the PRBs for PSFCH resources for HARQ-ACK feedback. Different cyclic shifts are used PSFCH resources for HARQ-ACK feedback and PSFCH or PSFCH-like resources for conflict feedback. PSFCH or PSFCH-like resources for conflict feedback for resources that has the UE-A not as its target UE use different PSFCH resources that can be in different slots and/or in different PRBs. This is illustrated pictorially in FIG. 12.

Figure 12:
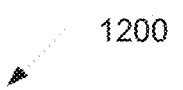
FIG. 12 illustrates an example of cyclic shift resources according to various embodiments of the present disclosure.

FIG. 12 illustrates an example of cyclic shift resources 1200 according to various embodiments of the present disclosure. An embodiment of the cyclic shift resources 1200 shown in FIG. 12 is for illustration only.

In examples, resources for the UE-Bs that have a transmission targeting UE-A are determined by source UE (UE-B) only.

In this example, the UE-A determines if the UE-A is the target of UE-B's transmission on the conflicting resource.

If the UE-A is the target of UE-B on the conflicting resource the UE-A uses a resource from the first set of resources, i.e., $R_{PRB,CS}^{PSFCH-conflict1}$. A UE determines an index of the PSFCH or PSFCH-like resource for conflict feedback in response to a reservation indication e.g., in a PSCCH as: (1) in one example: $(P_{ID})\bmod R_{PRB,CS}^{PSFCH-conflict1}$ where $P_{ID}$ is a physical layer source ID provided by SCI format 2-A or 2-B. In this case there is a single reserved resource (per UE-B) for indication of conflict feedback (whether the reservation is for one or more resources); (2) in a second example: $(N \cdot P_{ID}+n)\bmod R_{PRB,CS}^{PSFCH-conflict1}$ where $P_{ID}$ is a physical layer source ID provided by SCI format 2-A or 2-B. Wherein, N is the number of reserved resource that can be signaled in a reservation signal/channel (e.g., PSCCH), N can be configured by higher layers or specified in the system specification. n is the index of the reservation, starting from 0 to N−1, i.e., there are N PSFCH/PSFCH-like resources for conflict indication for the N reserved resource, i.e., one PSFCH/PSFCH-like resource for each reserved resource; and (3) in a third example: $(N1 \cdot P_{ID}+n)\bmod R_{PRB,CS}^{PSFCH-conflict1}$ where $P_{ID}$ is a physical layer source ID provided by SCI format 2-A or 2-B. Wherein, N1<N, wherein N is the number of reserved resource that can be signaled in a reservation signal/channel (e.g., PSCCH), N can be configured by higher layers or specified in the system specification. N1 is the number of PSFCH resources for feedback to a UE-B, N1 can be configured by higher layers or specified in the system specification. n is the index of the PSFCH/PSFCH-like resource for conflict feedback, starting from 0 to N1−1, i.e., there are N1 PSFCH/PSFCH-like resources for conflict indication for the N reserved resource. One example of mapping is that conflict feedback is provide for only the first N1 reserved resources.

If the UE-A is not the target of UE-B on the conflicting resource the UE-A uses a resource from the second set of resources, i.e., $R_{PRB,CS}^{PSFCH-conflict2}$. A UE determines an index of the PSFCH or PSFCH-like resource for conflict feedback in response to a reservation indication e.g., in a PSCCH as: (1) in one example: $(P_{ID})\bmod R_{PRB,CS}^{PSFCH-conflict2}$ where $P_{ID}$ is a physical layer source ID provided by SCI format 2-A or 2-B. In this case there is a single reserved resource for indication of conflict feedback (whether the reservation is for one or more resources); (2) in a second example: $(N \cdot P_{ID}+n)\bmod R_{PRB,CS}^{PSFCH-conflict2}$ where $P_{ID}$ is a physical layer source ID provided by SCI format 2-A or 2-B. Wherein, N is the number of reserved resource that can be signaled in a reservation signal/channel (e.g., PSCCH), N can be configured by higher layers or specified in the system specification. n is the index of the reservation, starting from 0 to N−1, i.e., there are N PSFCH/PSFCH-like resources for conflict indication for the N reserved resource, i.e., one PSFCH/PSFCH-like resource for each reserved resource; and (3) in a third example: $(N1 \cdot P_{ID}+n)\bmod R_{PRB,CS}^{PSFCH-conflict2}$ where $P_{ID}$ is a physical layer source ID provided by SCI format 2-A or 2-B. Wherein, N1≤N, wherein N is the number of reserved resource that can be signaled in a reservation signal/channel (e.g., PSCCH), N can be configured by higher layers or specified in the system specification. N1 is the number of PSFCH resources for feedback to a UE-B, N1 can be configured by higher layers or specified in the system specification. n is the index of the PSFCH/PSFCH-like resource for conflict feedback, starting from 0 to N1−1, i.e., there are N1 PSFCH/PSFCH-like resources for conflict indication for the N reserved resource. One example of mapping is that conflict feedback is provide for only the first N1 reserved resources.

In examples, resources for UE-Bs that have a transmission targeting UE-A are determined by both source UE (UE-B) and target UE (UE-A).

In this example, the UE-A determines if the UE-A is the target of UE-B's transmission on the conflicting resource.

If the UE-A is the target of UE-B on the conflicting resource the UE-A uses a resource from the first set of resources, i.e., $R_{PRB,CS}^{PSFCH-conflict1}$. A UE determines an index of the PSFCH or PSFCH-like resource for conflict feedback in response to a reservation indication e.g., in a PSCCH as: (1) in one example: $(P_{ID}+M_{ID})\bmod R_{PRB,CS}^{PSFCH-conflict1}$ where $P_{ID}$ is a physical layer source ID provided by SCI format 2-A or 2-B. $M_{ID}$ is the identity of the UE receiving the PSSCH as indicated by higher layers. In this case there is a single reserved resource (per UE-A and UE-B) for indication of conflict feedback (whether the reservation is for one or more resources); (2) in a second example: $(N \cdot (P_{ID}+M_{ID})+n)\bmod R_{PRB,CS}^{PSFCH-conflict1}$ where $P_{ID}$ is a physical layer source ID provided by SCI format 2-A or 2-B. $M_{ID}$ is the identity of the UE receiving the PSSCH as indicated by higher layers. Wherein, N is the number of reserved resource that can be signaled in a reservation signal/channel (e.g., PSCCH), N can be configured by higher layers or specified in the system specification. n is the index of the reservation, starting from 0 to N−1, i.e., there are N PSFCH/PSFCH-like resources for conflict indication for the N reserved resource, i.e., one PSFCH/PSFCH-like resource for each reserved resource; and (3) in a third example: $(N1 \cdot (P_{ID}+M_{ID})+n)\bmod R_{PRB,CS}^{PSFCH-conflict1}$ where $P_{ID}$ is a physical layer source ID provided by SCI format 2-A or 2-B. $M_{ID}$ is the identity of the UE receiving the PSSCH as indicated by higher layers. Wherein, N1<N, wherein N is the number of reserved resource that can be signaled in a reservation signal/channel (e.g., PSCCH), N can be configured by higher layers or specified in the system specification. N1 is the number of PSFCH resources for feedback to a UE-B, N1 can be configured by higher layers or specified in the system specification. n is the index of the PSFCH/PSFCH-like resource for conflict feedback, starting from 0 to N1−1, i.e., there are N1 PSFCH/PSFCH-like resources for conflict indication for the N reserved resource. One example of mapping is that conflict feedback is provide for only the first N1 reserved resources.

If the UE-A is not the target of UE-B on the conflicting resource the UE-A uses a resource from the second set of resources, i.e., $R_{PRB,CS}^{PSFCH-conflict2}$.

In one example, if there are two UE's UE-1 and UE-2 reserving a future resource(s) that are partially or fully overlapped, the UE-A detects the SCIs reserving the overlapping resources. The following scenarios are possible.

In one example, the reserved resources for the UE-1 and the UE-2 do not have UE-A as the destination UE-A. The UE-A does not provide any feedback to the UE-1 and the UE-2

In another example, the reserve resource of the UE-1 has the UE-A as its destination UE. The reserved resource of the UE-2 does not have UE-A as the destination UE.

For the UE-1, the UE-A checks the conflict caused by the UE-2 by measuring the SL RSRP of UE-2's transmission.

If the SL RSRP is greater than a threshold (that depends on the priorities of the UE-1 and the UE-2), the UE-A sends a conflict indication to the UE-1 (e.g., as described herein regarding determining conflict feedback). Otherwise, the UE-A sends a conflict indication to the UE-2

The reserved resources for the UE-1 and the UE-2 have the UE-A as the destination UE-A.

In this case, the UE with the lower priority (e.g., higher priority value) is the UE in conflict, and a conflict indication is sent to that UE. In one example, if the priority of the two UEs with conflicting reserved resources are equal, it is up to the UE-A to decide which UE has conflicting resources, e.g., the UE-A selects one UE randomly as the UE with a reserved resource in conflict.

In one example, there are two UE's UE-1 and UE-2 reserving a future resource(s) that are partially or fully overlapped. The UE-A detects the SCIs reserving the overlapping resources. The following scenarios are possible.

In one example, the reserved resources for the UE-1 and the UE-2 do not have the UE-A as the destination UE-A. Let the UE-1, be the UE with highest priority (lowest priority value) as determined by the SL transmission of the corresponding SCI. In one example, if the priority of the two UEs with conflicting reserved resources are equal, it is up to the UE-A to decide which UE is the UE-1, e.g., the UE-A selects one UE randomly as the UE-1. For the UE-1, the UE-A checks the conflict caused by the UE-2 by measuring the SL RSRP of UE-2's transmission. If the SL RSRP is greater than a threshold (that depends on the priorities of the UE-1 and the UE-2), the UE-A sends a conflict indication to the UE-1 (e.g., as described herein). Otherwise, the UE-A sends a conflict indication to the UE-2.

In another example, the reserve resource of the UE-1 has the UE-A as its destination UE. The reserved resource of the UE-2 does not have the UE-A as the destination UE. For the UE-1, the UE-A checks the conflict caused by the UE-2 by measuring the SL RSRP of UE-2's transmission. If the SL RSRP is greater than a threshold (that depends on the priorities of the UE-1 and the UE-2), the UE-A sends a conflict indication to the UE-1 (e.g., as described herein). Otherwise, the UE-A sends a conflict indication to the UE-2.

In yet another example, the reserved resources for the UE-1 and the UE-2 have the UE-A as the destination UE-A.

In this case, the UE with the lower priority (e.g., higher priority value) is the UE in conflict, and a conflict indication is sent to that UE. In one example, if the priority of the two UEs with conflicting reserved resources are equal, it is up to the UE-A to decide which UE has conflicting resources, e.g., the UE-A selects one UE randomly as the UE with a reserved resource in conflict.

In one example, there are two UE's UE-1 and UE-2 reserving a future resource(s) that are partially or fully overlapped. The UE-A detects the SCIs reserving the overlapping resources. The following scenarios are possible.

In one example, the reserved resources for the UE-1 and the UE-2 do not have the UE-A as the destination UE-A. Let the UE-1, be the UE with highest SL RSRP as determined by the SL transmission of the corresponding SCI. In one example, if the SL RSRP of the two UEs with conflicting reserved resources are equal, it is up to the UE-A to decide which UE is the UE-1, e.g., the UE-A selects one UE randomly as the UE-1. For the UE-1, the UE-A checks the conflict caused by the UE-2 by measuring the SL RSRP of UE-2's transmission. If the SL RSRP is greater than a threshold (that depends on the priorities of the UE-1 and the UE-2), the UE-A sends a conflict indication to the UE-1 (e.g., as described herein). Otherwise, the UE-A sends a conflict indication to the UE-2.

The reserve resource of the UE-1 has the UE-A as its destination UE. The reserved resource of the UE-2 does not have the UE-A as the destination UE. For the UE-1, the UE-A checks the conflict caused by the UE-2 by measuring the SL RSRP of UE-2's transmission. If the SL RSRP is greater than a threshold (that depends on the priorities of the UE-1 and the UE-2), the UE-A sends a conflict indication to the UE-1 (e.g., as described herein). Otherwise, the UE-A sends a conflict indication to the UE-2.

The reserved resources for the UE-1 and the UE-2 have the UE-A as the destination UE-A. In this case, the UE with the lower priority (e.g., higher priority value) is the UE in conflict, and a conflict indication is sent to that UE. In one example, if the priority of the two UEs with conflicting reserved resources are equal, it is up to the UE-A to decide which UE has conflicting resources, e.g., the UE-A selects one UE randomly as the UE with a reserved resource in conflict.

According to 3GPP standard specification, the sequence $x(x)$ of a PSFCH channel, which is confined to one PRB, is in general according to: $x(n) = r_{u,v}^{\alpha\delta}(n)$, $n = 0, 1, \ldots, NB-1$, where $r_{u,v}^{(\alpha\delta)}(n)$ is given by 3GPP standard specification TS 38.211 with the following exceptions: (1) $m_{cs}$ is given by 3GPP TS 38.213; (2) $m_0$ is given by 3GPP TS 38.213; (3) l is the OFDM symbol number in the PSFCH transmission where l=0 corresponds to the first OFDM symbol of the PSFCH transmission; (4) l' is the index of the OFDM symbol in the slot that corresponds to the first OFDM symbol of the PSFCH transmission in the slot given by 3GPP TS 38.213; (5) $u = n_{ID} \bmod 30$ and $v = 0$ with $n_{ID}$ given by the higher-layer parameter sl-PSFCH-HopID if configured; otherwise, $u = 0$; and (6) $c_{init} = n_{ID}$ with $n_{ID}$ given by the higher-layer parameter sl-PSFCH-HopID if configured; otherwise, $c_{init} = 0$.

The cyclic shift of the PSFCH/PSFCH-like resource to use for conflict feedback is determined by $m_{cs}$ and $m_0$. In this component, a method for determining both these parameters for conflict indication is provided. It should be noted that each PSFCH PRB has 12 cyclic shifts, the cyclic shifts can be number from 0 to 11. The cyclic shift is denoted by $\alpha$.

In one embodiment, the $m_0$ component of $\alpha$ is provided.

In one example, the $m_0$ of $\alpha$ for conflict feedback follows the same rule as $m_0$ of $\alpha$ for HARQ-ACK feedback as indicated in TABLE 1. This can be used when different time/frequency resources are used for PSFCH/PSFCH-like resource for conflict feedback and PSFCH resource for HARQ-ACK Feedback. This for example can apply if sl-PSFCH-RB-Set for PSFCH for HARQ-ACK feedback, is different from the corresponding parameter for PSFCH for conflict feedback.

TABLE 1

One example of determination of $m_0$. $m_0$ can be for one cyclic shift or for a pair of cyclic shifts.

| $N_{CS}^{PSFCH-Confl}$ | Cyclic Shift Index 0 | Cyclic Shift Index 1 | Cyclic Shift Index 2 | Cyclic Shift Index 3 | Cyclic Shift Index 4 | Cyclic Shift Index 5 |
|---|---|---|---|---|---|---|
| 1 | 0 | — | — | — | — | — |
| 2 | 0 | 3 | — | — | — | — |

TABLE 1-continued

One example of determination of $m_0$. $m_0$ can be for one cyclic shift or for a pair of cyclic shifts.

| | | | | | | |
|---|---|---|---|---|---|---|
| 3 | 0 | 2 | 4 | — | — | — |
| 6 | 0 | 1 | 2 | 3 | 4 | 5 |
| 12* | 0 | 1 | 2 | 3 | 4 | 5 |

| $N_{CS}^{PSFCH-Conflict}$ | Cyclic Shift Index 6 | Cyclic Shift Index 7 | Cyclic Shift Index 8 | Cyclic Shift Index 9 | Cyclic Shift Index 10 | Cyclic Shift Index 11 |
|---|---|---|---|---|---|---|
| 1 | — | — | — | — | — | — |
| 2 | — | — | — | — | — | — |
| 3 | — | — | — | — | — | — |
| 6 | — | — | — | — | — | — |
| 12* | 6 | 7 | 8 | 9 | 10 | 11 |

For $N_{CS}^{PSFCH-Conflict}=12$ only a single cyclic shift can be allocated rather than a pair of cyclic shifts. This can be used when only conflict is signaled on a PSFCH/PSFCH-like resource. In case of no-conflict, there is no transmission.

In another example, the $m_0$ of a for conflict feedback follows a different rule from $m_0$ of a for HARQ-ACK feedback as indicated in TABLE 2A and TABLE 2B. This can be used when HARQ-ACK feedback and conflict feedback share a PSFCH on the same time/frequency resource but with different cyclic shifts.

TABLE 2A

Another example of determination of $m_0$. $m_0$ can be for one cyclic shift or for a pair of cyclic shifts.

| $N_{CS}^{PSFCH-Confl}$ | Cyclic Shift Index 0 | Cyclic Shift Index 1 | Cyclic Shift Index 2 | Cyclic Shift Index 3 | Cyclic Shift Index 4 | Cyclic Shift Index 5 |
|---|---|---|---|---|---|---|
| 1 | 1 or 2 or 3 or 4 or 5 | — | — | — | — | — |
| 2 | 1 or 2 | 4 or 5 | — | — | — | — |
| 3 | 1 | 3 | 5 | — | — | — |

TABLE 2B

Another example of determination of $m_0$. $m_0$ can be for one cyclic shift or for a pair of cyclic shifts.

| $N_{CS}^{PSFCH-Confl}$ | Cyclic Shift Index 0 | Cyclic Shift Index 1 | Cyclic Shift Index 2 | Cyclic Shift Index 3 | Cyclic Shift Index 4 | Cyclic Shift Index 5 |
|---|---|---|---|---|---|---|
| 1 | 1 or 2 or 3 or 4 or 5 | — | — | — | — | — |
| 2 | 4 or 5 | 1 or 2 | — | — | — | — |
| 3 | 3 | 5 | 1 | — | — | — |

In another example, the $m_0$ of α for conflict feedback follows a different rule from $m_0$ of a for HARQ-ACK feedback as indicated in TABLE 2A and TABLE 2B. This can be used when HARQ-ACK feedback and conflict feedback share a PSFCH on the same time/frequency resource but with different cyclic shifts. In this example, a single cyclic shift can be used for HARQ-ACK feedback (e.g., NACK), and a single cyclic shift can be used for conflict feedback (e.g., to indicate the presence of a conflict). In this example only a single cyclic shift can be allocated rather than a pair of cyclic shifts.

TABLE 3

Another example of determination of $m_0$

| $N_{CS}^{PSFCH-Confl}$ | Cyclic Shift Index 0 | Cyclic Shift Index 1 | Cyclic Shift Index 2 | Cyclic Shift Index 3 | Cyclic Shift Index 4 | Cyclic Shift Index 5 |
|---|---|---|---|---|---|---|
| 1 | 6 | — | — | — | — | — |
| 2 | 6 | 9 | — | — | — | — |
| 3 | 6 | 8 | 10 | — | — | — |
| 6 | 6 | 7 | 8 | 9 | 10 | 11 |

When providing conflict feedback, the UE-A can transmit a logical 0 in case of conflict and logical 1 in case of no conflict. Or the UE-A can just transmit logical 0 in case of conflict and no transmission in case of no conflict (the corresponding cyclic shift is unused or there is no corresponding cyclic shift allocated). For example, logical 0 can correspond to a zero cyclic shift offset from $m_0$, e.g., $m_{cs}=0$, and logical 1 can correspond to a 6 cyclic shift offset from $m_0$, e.g., $m_{cs}=6$. Alternatively, logical 0 can correspond to a 6 cyclic shift offset from m, e.g., $m_{cs}=6$, and logical 1 can correspond to a zero cyclic shift offset from m, e.g., $m_{cs}=0$.

In one example, a UE determines $m_{cs}$ of a for conflict feedback as shown in TABLE 4. When a UE detects a conflict, $m_{cs}=0$, when a UE detects no conflict $m_{cs}=6$.

TABLE 4

One example of determination of $m_{cs}$

| Conflict Condition | Expected/potential conflict present | No expected/potential conflict present |
|---|---|---|
| $m_{cs}$ | 0 | 6 |

In another example, a UE determines $m_{cs}$ of a for conflict feedback as shown in TABLE 5. When a UE detects a conflict, $m_{cs}=6$, when a UE detects no conflict $m_{cs}=0$.

TABLE 5

Another example of determination of $m_{cs}$

| Conflict Condition | Expected/potential conflict present | No expected/potential conflict present |
|---|---|---|
| $m_{cs}$ | 6 | 0 |

In another example, a UE determines $m_{cs}$ of a for conflict feedback as shown in TABLE 6. When a UE detects a conflict, $m_{cs}=0$, when a UE detects no conflict there is no transmission of PSFCH/PSFCH-like resource.

TABLE 6

Another example of determination of $m_{cs}$

| Conflict Condition | Expected/potential conflict present | No expected/potential conflict present |
|---|---|---|
| $m_{cs}$ | 0 | No transmission of PSFCH/PSFCH-like resource |

As an example to illustrate how a single PSFCH PRB can be shared between HARQ-ACK feedback and conflict feedback the following two examples are given.

Figure 13A:
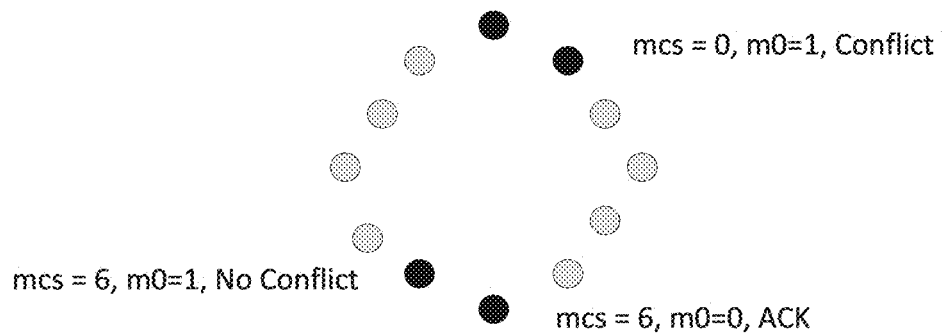
FIG. 13A illustrates an example of cyclic shift according to various embodiments of the present disclosure.

In one example, following TABLE 2A, $N_{CS}^{PSFCH-Conflict}=3$, cyclic shift index 0 is used for HARQ-ACK feedback using $m_0=0$, and cyclic shift index 0 is used for conflict feedback using $m_0=1$. The cyclic shifts used in this example, are as shown in FIG. 13A. In another example, only conflict is indicated and in case of no conflict there is no transmission. This is shown in FIG. 13B, where there is only one cyclic shift used for conflict feedback to indicate conflict, with $m_0=1$ and $m_{cs}=0$.

FIG. 13A illustrates an example of cyclic shift 1300 according to various embodiments of the present disclosure. An embodiment of the cyclic shift 1300 shown in FIG. 13A is for illustration only.

Figure 13B:
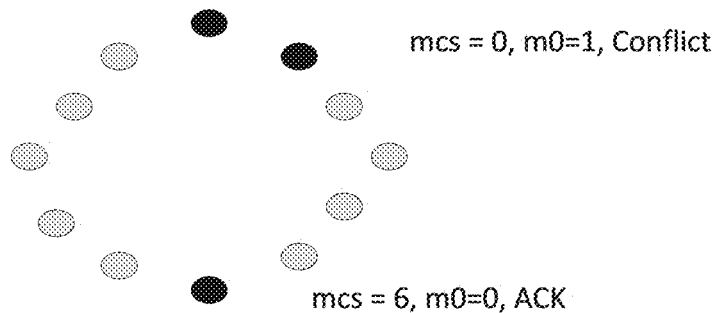
FIG. 13B illustrates another example of cyclic shift according to various embodiments of the present disclosure.

FIG. 13B illustrates another example of cyclic shift 1350 according to various embodiments of the present disclosure. An embodiment of the cyclic shift 1350 shown in FIG. 13B is for illustration only.

Figure 14A:
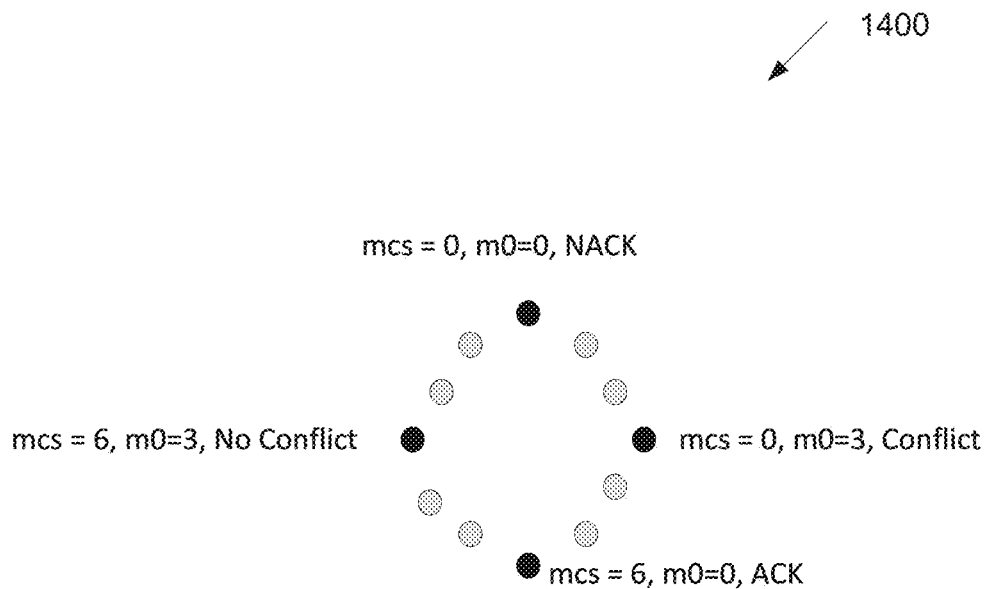
FIG. 14A illustrates another example of cyclic shift according to various embodiments of the present disclosure.

Following example (TABLE 2B), $N_{CS}^{PSFCH-Conflict}=3$, cyclic shift index 0 is used for HARQ-ACK feedback using $m_0=0$, and cyclic shift index 0 is used for conflict feedback using $m_0=1$. The cyclic shifts used in this example, are as shown in FIG. 14A. In another example, only conflict is indicated and in case of no conflict there is no transmission. This is shown in FIG. 14B, where there is only one cyclic shift used for conflict feedback to indicate conflict, with $m_0=3$ and $m_{cs}=0$.

FIG. 14A illustrates another example of cyclic shift 1400 according to various embodiments of the present disclosure. An embodiment of the cyclic shift 1400 shown in FIG. 14A is for illustration only.

Figure 14B:
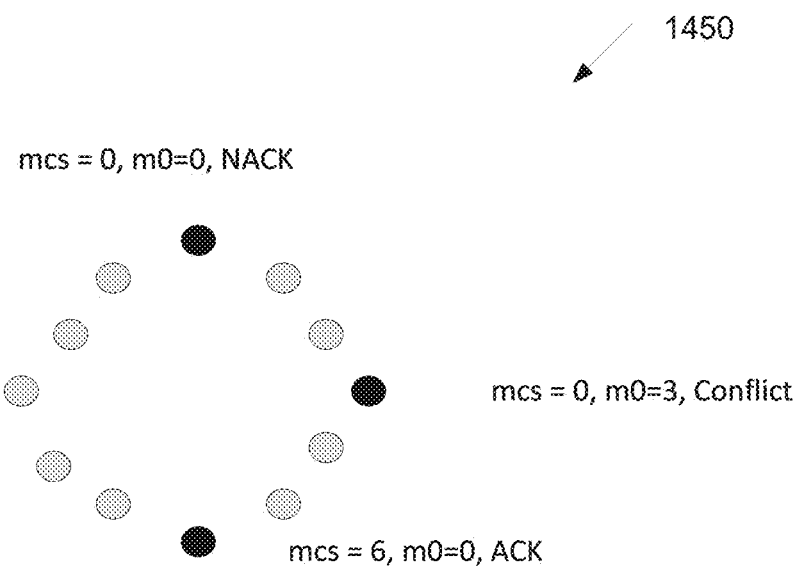
FIG. 14B illustrates yet another example of cyclic shift according to various embodiments of the present disclosure.

FIG. 14B illustrates yet another example of cyclic shift 1450 according to various embodiments of the present disclosure. An embodiment of the of cyclic shift 1450 shown in FIG. 14B is for illustration only.

In one example, following the example illustrated in TABLE 3, $N_{CS}^{PSFCH-Conflict}=1$, cyclic shift index 0 is used for HARQ-ACK feedback (only NACK is sent) using $m_0=0$, and cyclic shift index 0 is used for conflict feedback (only conflict indication is sent) using $m_0=6$ and $m_{cs}=0$. The cyclic shifts used in this example, are as shown in FIG. 15.

Figure 15:
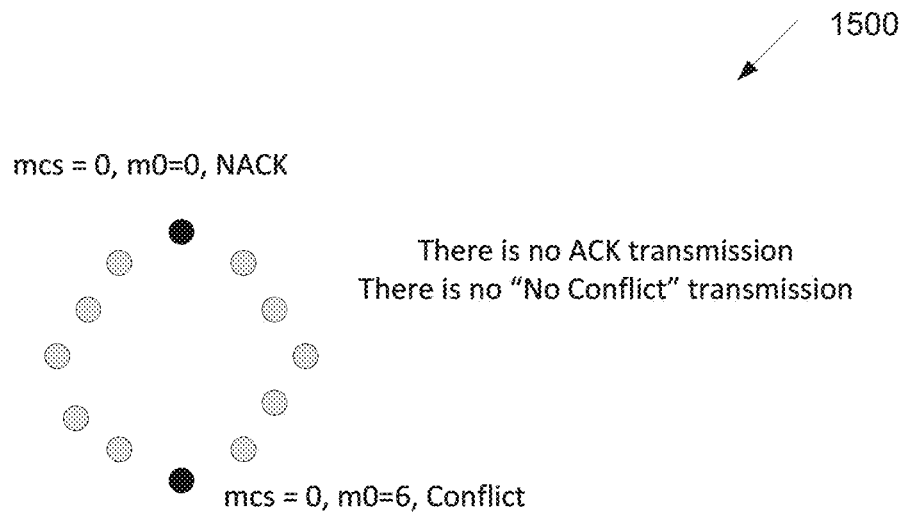
FIG. 15 illustrates yet another example of cyclic shift according to various embodiments of the present disclosure.

FIG. 15 illustrates yet another example of cyclic shift 1500 according to various embodiments of the present disclosure. An embodiment of the cyclic shift 1500 shown in FIG. 15 is for illustration only.

In one example, with one reserved resource, the $m_{cs}$ can be determined as follows: (1) in case of time-domain conflict (i.e., UE-B can transmit in the time resource of the reserved resource, e.g., due to half duplex issue) $m_{cs}=6$; (2) in case of time/frequency-domain conflict (i.e., UE-B can transmit in the time/frequency resource of the reserved resource, e.g., expected collision of another UE partially or overlapping in the reserved resource) $m_{cs}=0$; (3) the values of MCS in the above two examples can be switched; and (4) in case of no conflict there is no PSFCH transmission for conflict indication.

In one example, a conflict in time domain for the UE-B occurs if the priority value of a reserved resource from the UE-B is higher (or higher than or equal to) the priority value of the transmission from the UE-A in the same slot as the reserved resource. Otherwise, the UE-B has a reserved resource with a priority value lower than or equal to (or lower than) the priority value of the transmission from the UE-A in the same slot as the reserved resource, there is no conflict for the UE-B due to the UE-A's would be transmission, in this case that the UE-A can re-select a different slot for its transmission. A lower priority value indicates a higher priority.

There are N reserved resources indicated in a resource reservation signaling (e.g., a PSCCH transmission). There are N1 PSFCH resources available for conflict indication/feedback.

In one example, N=N1. There is a one-to-one mapping between each reserved resource a corresponding PSFCH/PSFCH-like resource for conflict indication/feedback.

In another example, N1=1. The first in-time reserved resource determines the status of the conflict indication/feedback on the PSFCH/PSFCH-like resource for conflict indication/feedback.

In another example, N1=1. If the UE-A determines that any reserved resource is in conflict, conflict is indicated from the UE-A to the UE-B, else there are no reserved resources in conflict and no conflict is indicated to the UE-B (this could include no transmission on the PSFCH/PSFCH-like resource for no conflict indication).

In another example, N1=1. If the UE-A determines that all reserved resources are in conflict, conflict is indicated from the UE-A to the UE-B, else there is at least one reserved resource not in conflict and no conflict is indicated to the UE-B (this could include no transmission on the PSFCH/PSFCH-like resource for no conflict indication).

In another example, N1<N. The first N1 in-time reserved resource determine the status of the conflict indication/feedback on the N1 PSFCH/PSFCH-like resource for conflict indication/feedback, with a one-one-mapping.

In another example, N1<N. The first N1-1 in-time reserved resource determine the status of the conflict indication/feedback on N1-1 PSFCH/PSFCH-like resource for conflict indication/feedback, with a one-one-mapping. The last PSFCH/PSFCH-like resource for conflict indication/feedback indicates the conflict status of the remaining reserved resources. If the UE-A determines that any remaining reserved resource is in conflict, conflict is indicated from the UE-A to the UE-B on the last PSFCH/PSFCH-like resource for conflict indication/feedback, else there are no remaining reserved resources in conflict and no conflict is indicated to the UE-B (this could include no transmission on the PSFCH/PSFCH-like resource for no conflict indication) on the last PSFCH/PSFCH-like resource for conflict indication/feedback.

In another example, N1<N. The first N1-1 in-time reserved resource determine the status of the conflict indication/feedback on N1-1 PSFCH/PSFCH-like resource for conflict indication/feedback, with a one-one-mapping. The last PSFCH/PSFCH-like resource for conflict indication/feedback indicates the conflict status of the remaining reserved resources. If the UE-A determines that all the remaining reserved resources are in conflict, conflict is indicated from the UE-A to the UE-B on the last PSFCH/PSFCH-like resource for conflict indication/feedback, else there is at least one of the remaining reserved resources not in conflict and no conflict is indicated to the UE-B (this could include no transmission on the PSFCH/PSFCH-like resource for no conflict indication) on the last PSFCH/PSFCH-like resource for conflict indication/feedback.

In one example, one set of PSFCH/PSFCH-like resources for conflict feedback is determined for all N1 PSFCH/PSFCH-like resources for conflict feedback from the UE-A to the UE-B. This is similar to examples discussed herein.

In another example, two set of PSFCH/PSFCH-like resources for conflict feedback is determined for all N1 PSFCH/PSFCH-like resources for conflict feedback from the UE-A to the UE-B. The first set is used when the UE-A is the target UE of reserved resource for all N1 PSFCH/PSFCH-like resources for conflict feedback. The second set is used when the UE-A is not the target UE of reserved resource for all N1 PSFCH/PSFCH-like resources for conflict feedback. This is similar to example.

Figure 16:
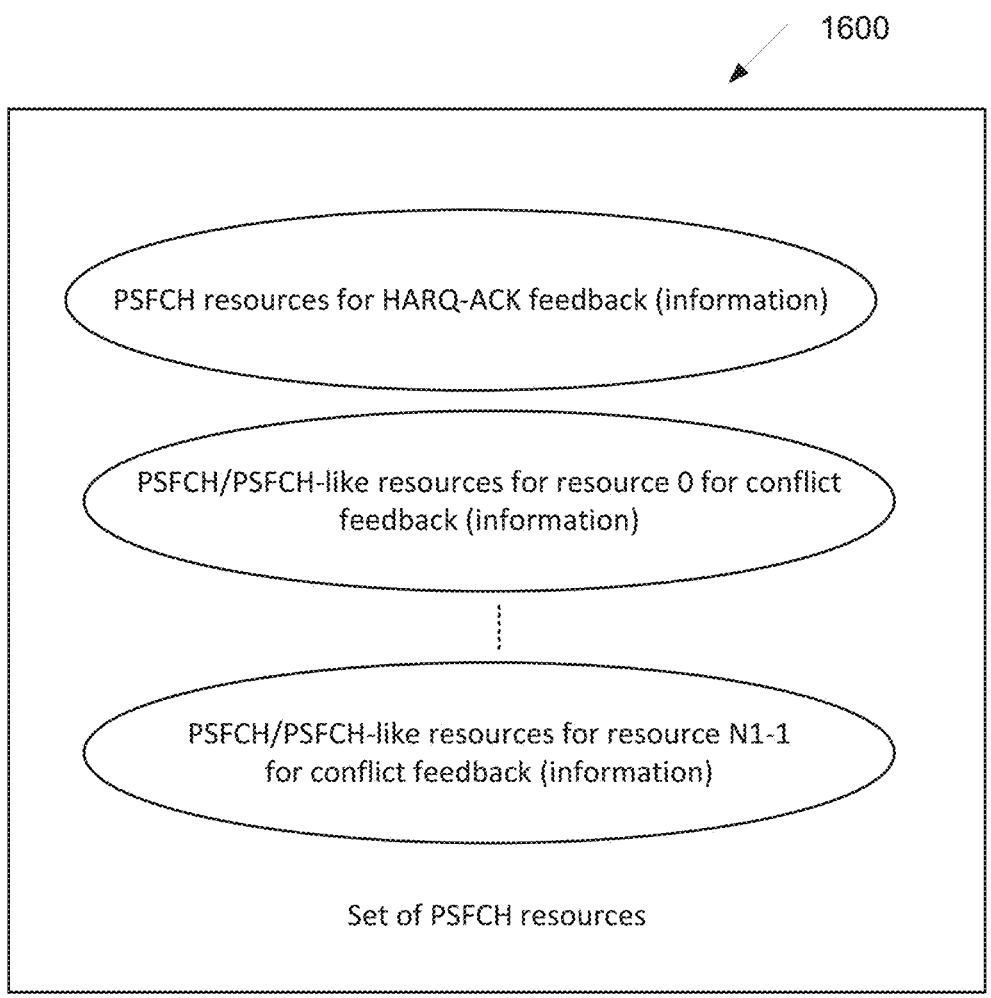
FIG. 16 illustrates an example of a set of PSFCH resources according to various embodiments of the present disclosure.

FIG. 16 illustrates an example of a set of PSFCH resources 1600 according to various embodiments of the present disclosure. An embodiment of the a set of PSFCH resources 1600 shown in FIG. 16 is for illustration only.

In another example, there are N1 sets of PSFCH/PSFCH-like resources for conflict feedback one for each of the N1 PSFCH/PSFCH-like resources for conflict feedback from the UE-A to the UE-B. This is illustrated by way of example in FIG. 16. In a variant of FIG. 16, the HARQ-ACK feedback is disabled and there is no PSFCH resource for HARQ-ACK feedback. A PSFCH/PSFCH-like resource can be a time/frequency resource, e.g., be a time/frequency resource, e.g., a PRB in a slot that includes one or more cyclic shifts.

Figure 17:
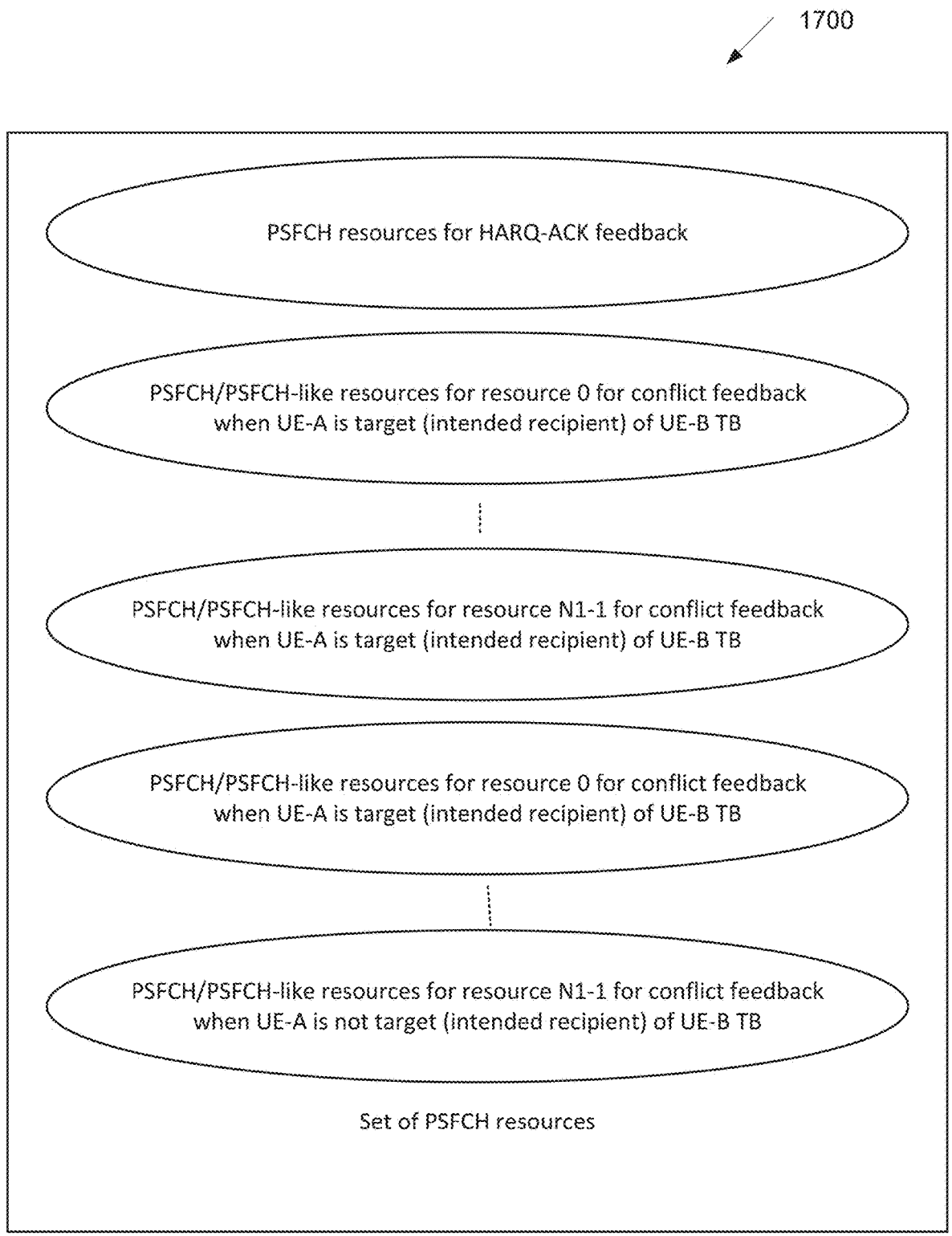
FIG. 17 illustrates another example of a set of PSFCH resources according to various embodiments of the present disclosure.

FIG. 17 illustrates another example of a set of PSFCH resources 1700 according to various embodiments of the present disclosure. An embodiment of the set of PSFCH resources 1700 shown in FIG. 17 is for illustration only.

In another example, there are 2×N1 sets of PSFCH/PSFCH-like resources for conflict feedback two for each of the N1 PSFCH/PSFCH-like resources for conflict feedback from the UE-A to the UE-B. The first is used when the UE-A is the target UE of reserved resource. The second is used when the UE-A is not the target UE of reserved resource. This is illustrated by way of example in FIG. 17. In a variant of FIG. 17, the HARQ-ACK feedback is disabled and there is no PSFCH resource for HARQ-ACK feedback. A PSFCH/PSFCH-like resource can be a time/frequency resource, e.g., a PRB in a slot that includes one or more cyclic shifts.

Figures 18, 19:
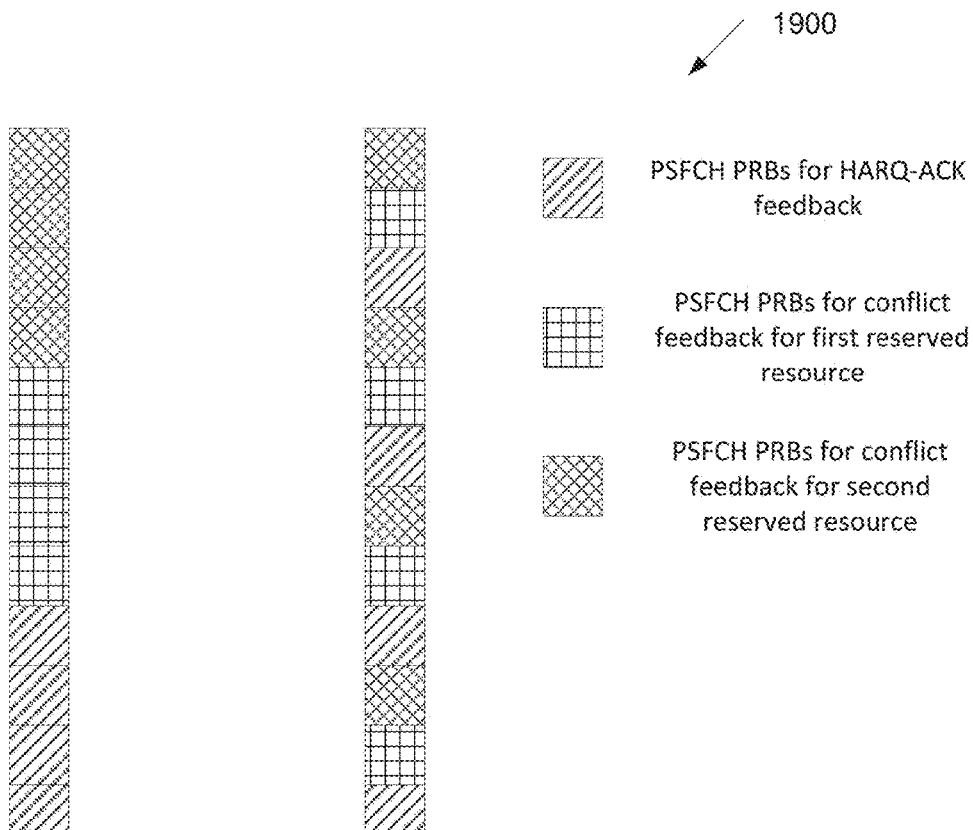
FIG. 18 illustrates an example of time division multiplexed set of PSFCH resources according to various embodiments of the present disclosure.
FIG. 19 illustrates an example of PRB allocation according to various embodiments of the present disclosure.

In one example, different slots are used for conveying HARQ-ACK feedback and conflict feedback for each reserved resource (for a total of N reserved resources) (as illustrated in FIG. 18 for N=3): (1) first set of slots for PSFCH format conveying HARQ-ACK feedback; (2) second set of slots for PSFCH or PSFCH-like format conveying the conflict feedback for first reserved resource; (3) third set of slots for PSFCH or PSFCH-like format conveying the conflict feedback for second reserved resource . . . . (4) Nth set of slots for PSFCH or PSFCH-like format conveying the conflict feedback for N-1 reserved resource.

FIG. 18 illustrates an example of time division multiplexed set of PSFCH resources 1800 according to various embodiments of the present disclosure. An embodiment of the time division multiplexed set of PSFCH resources 1800 shown in FIG. 18 is for illustration only.

In one example, different PRBs are used for conveying HARQ-ACK feedback and conflict feedback for each reserved resource (for a total of N reserved resources) (as illustrated in FIG. 19 for N=3): (1) first set of PRBs for PSFCH format conveying HARQ-ACK feedback; (2) second set of PRBs for PSFCH or PSFCH-like format conveying the conflict feedback for first reserved resource; (3) third set of PRBs for PSFCH or PSFCH-like format conveying the conflict feedback for second reserved resource . . . . (4) Nth set of PRBs for PSFCH or PSFCH-like format conveying the conflict feedback for N-1 reserved resource.

FIG. 19 illustrates an example of PRB allocation 1900 according to various embodiments of the present disclosure. An embodiment of the PRB allocation 1900 shown in FIG. 19 is for illustration only.

In one example, different cyclic shifts or cyclic shift pairs are used for conveying HARQ-ACK feedback and conflict feedback for each reserved resource (for a total of N reserved resources) (as illustrated in FIGS. 20A, 20B, 21A, and 21B for N=2, and 5, respectively, and FIG. 22 for N=4): (1) first set of cyclic shift or cyclic shift pairs for PSFCH format conveying HARQ-ACK feedback; (2) second set of cyclic shift or cyclic shift pairs for PSFCH or PSFCH-like format conveying the conflict feedback for first reserved resource; (3) third set of cyclic shift or cyclic shift pairs for PSFCH or PSFCH-like format conveying the conflict feedback for second reserved resource . . . . (4) Nth set of cyclic shift or cyclic shift pairs for PSFCH or PSFCH-like format conveying the conflict feedback for N-1 reserved resource.

Figure 20A:
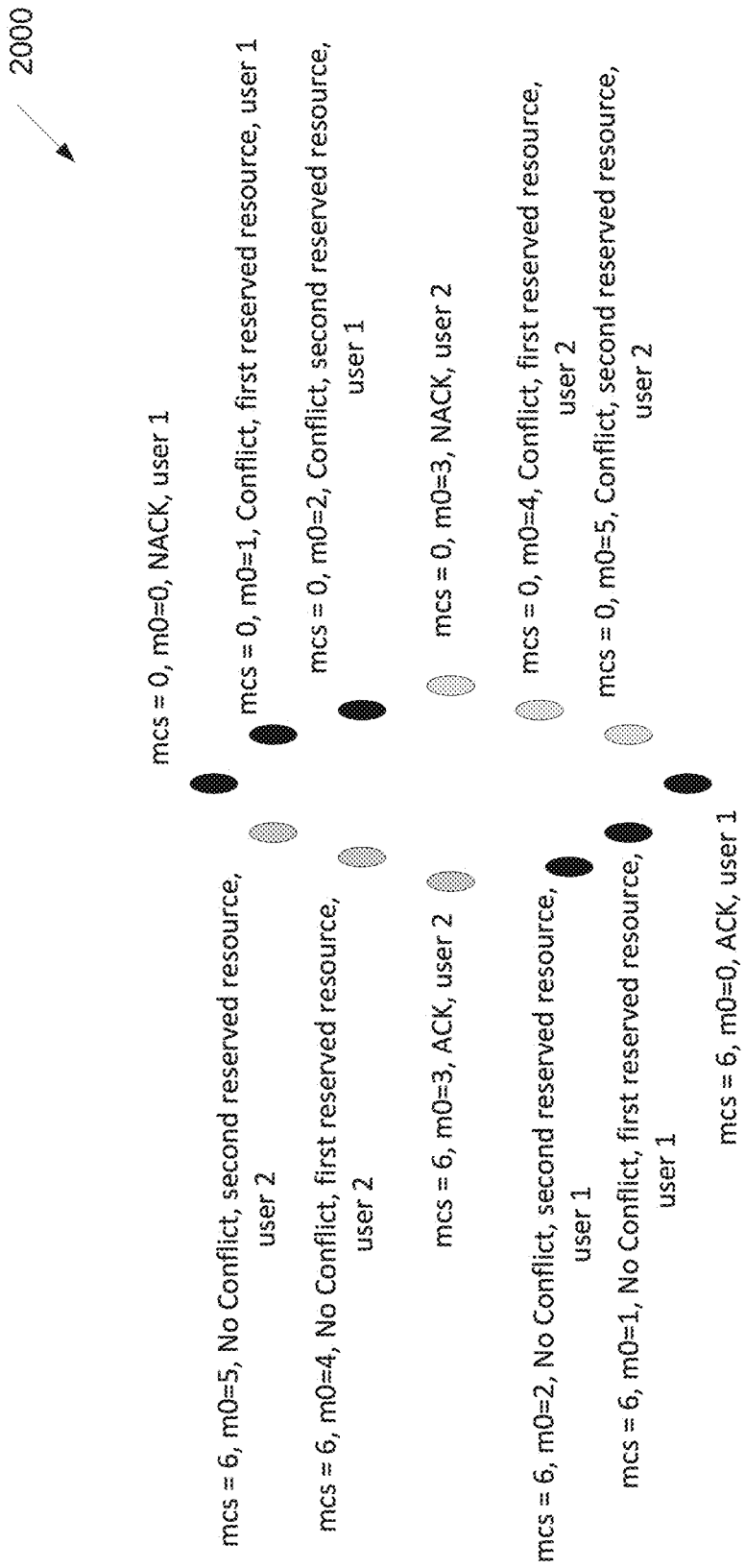
FIG. 20A illustrates an example of cyclic shift according to various embodiments of the present disclosure.

FIG. 20A illustrates an example of cyclic shift 2000 according to various embodiments of the present disclosure. An embodiment of the cyclic shift 2000 shown in FIG. 20A is for illustration only.

Figure 20B:
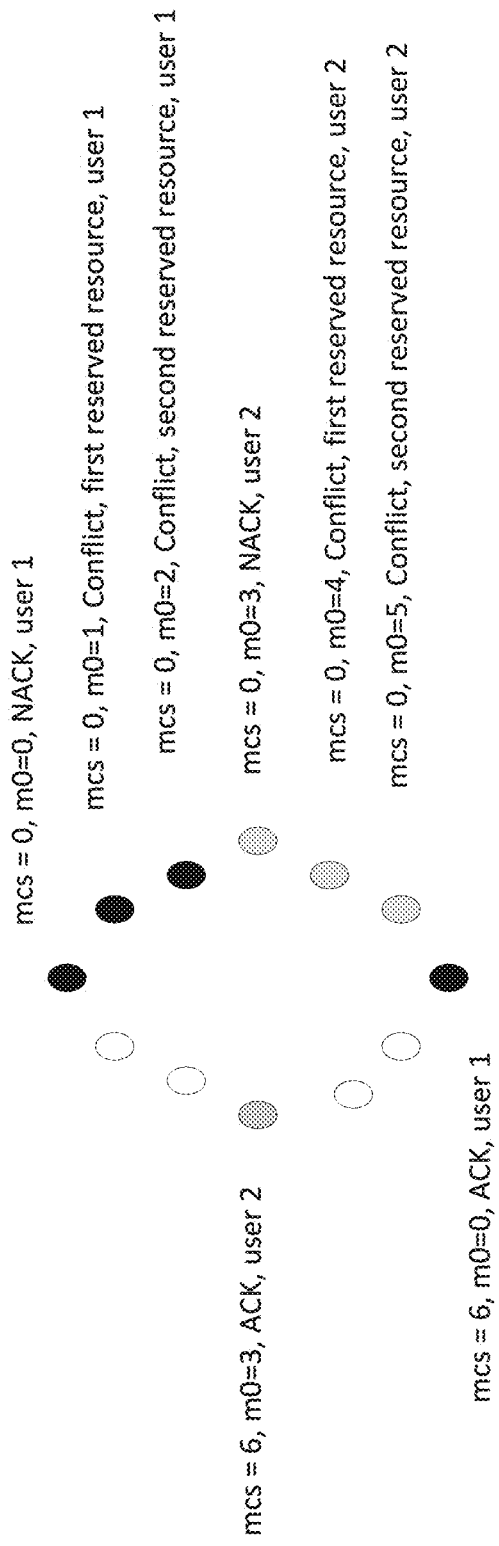
FIG. 20B illustrates another example of cyclic shift according to various embodiments of the present disclosure.

FIG. 20B illustrates another example of cyclic shift 2050 according to various embodiments of the present disclosure. An embodiment of the cyclic shift 2050 shown in FIG. 20B is for illustration only.

FIG. 20A is an example with $N_{CS}^{PSFCH-Conflict}=2$, i.e., two PSFCH format users can be multiplexed in the same PRB. These are user 1 and user 2. In this case, up to two cyclic shift pairs for conflict feedback per user can be multiplexed in the same PRB (i.e., conflict feedback for two reserved resources).

User 1 is allocated: (1) cyclic shift pair (0, 6) for HARQ-ACK feedback; (2) cyclic shift pair (1, 7) for conflict feedback of the first reserved resource. Or in case of conflict only feedback (FIG. 20B), one cyclic shift, e.g., cyclic shift 1 is used for conflict feedback of the first reserved resource; and (3) cyclic shift pair (2, 8) for the conflict feedback of the second reserved resource. Or in case of conflict only feedback (FIG. 20B), one cyclic shift, e.g., cyclic shift 2 is used for conflict feedback of the second reserved resource.

User 2 is allocated: (1) cyclic shift pair (3, 9) for HARQ-ACK feedback; (2) cyclic shift pair (4, 10) for conflict feedback of the first reserved resource. Or in case of conflict only feedback (FIG. 20B), one cyclic shift, e.g., cyclic shift 4 is used for conflict feedback of the first reserved resource; and (3) cyclic shift pair (5, 11) for the conflict feedback of the second reserved resource. Or in case of conflict only feedback (FIG. 20B), one cyclic shift, e.g., cyclic shift 5 is used for conflict feedback of the second reserved resource.

Figure 21A:
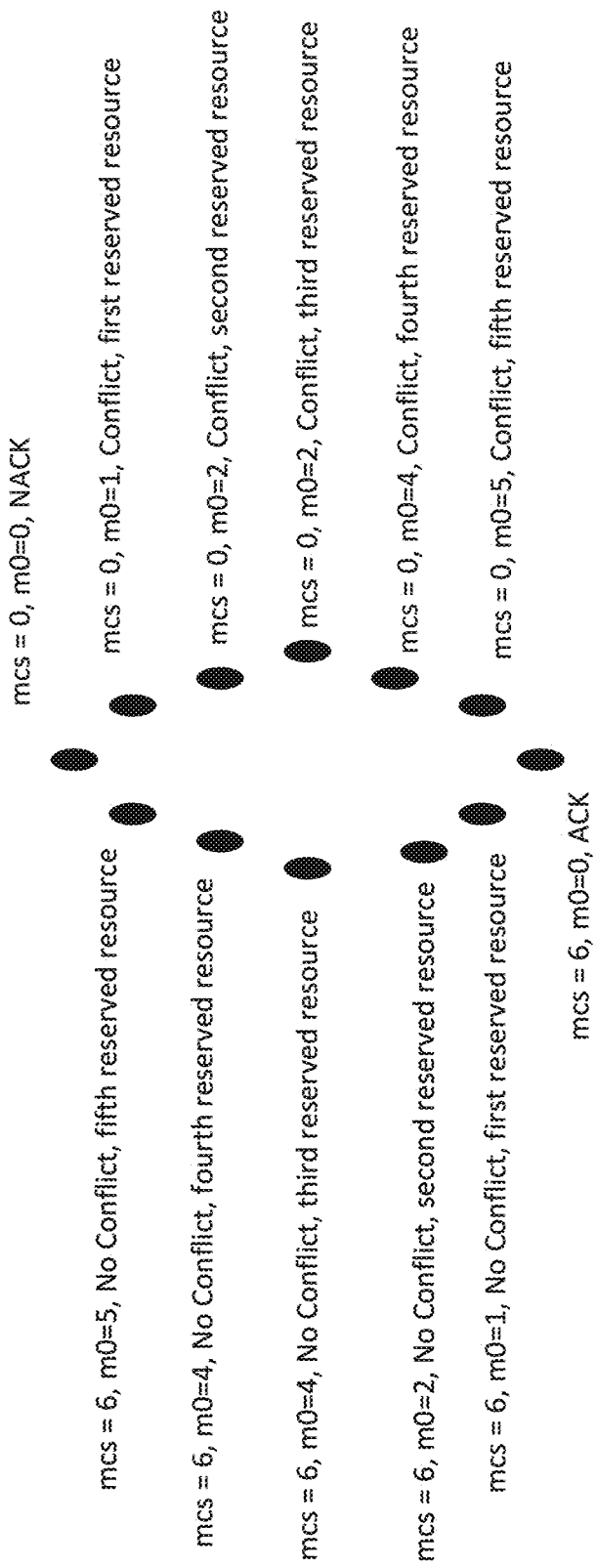
FIG. 21A illustrates yet another example of cyclic shift according to various embodiments of the present disclosure.

FIG. 21A illustrates yet another example of cyclic shift 2100 according to various embodiments of the present disclosure. An embodiment of the cyclic shift 2100 shown in FIG. 21A is for illustration only.

Figure 21B:
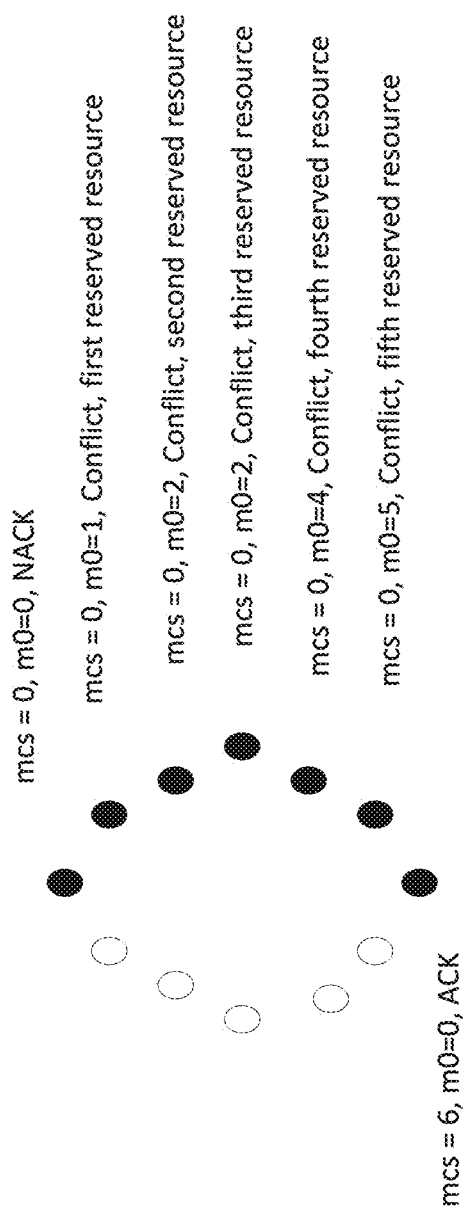
FIG. 21B illustrates yet another example of cyclic shift according to various embodiments of the present disclosure.

FIG. 21B illustrates yet another example of cyclic shift 2150 according to various embodiments of the present disclosure. An embodiment of the cyclic shift 2150 shown in FIG. 21B is for illustration only.

FIG. 21A, is an example with $N_{CS}^{PSFCH-Conflict}=1$, i.e., only one PSFCH format user is transmitted in one PRB1. In this case, up to five cyclic shift pairs for conflict feedback per user can be multiplexed in the same PRB (i.e., conflict feedback for five reserved resources).

Cyclic shift pairs can be allocated as follows: (1) cyclic shift pair (0, 6) for HARQ-ACK feedback; (2) cyclic shift pair (1, 7) for conflict feedback of the first reserved resource. Or in case of conflict only feedback (FIG. 21B), one cyclic shift, e.g., cyclic shift 1 is used for conflict feedback of the first reserved resource; (3) cyclic shift pair (2, 8) for the conflict feedback of the second reserved resource. Or in case of conflict only feedback (FIG. 21B), one cyclic shift, e.g., cyclic shift 2 is used for conflict feedback of the second reserved resource; (4) cyclic shift pair (3, 9) for the conflict feedback of the third reserved resource. Or in case of conflict only feedback (FIG. 21B), one cyclic shift, e.g., cyclic shift 3 is used for conflict feedback of the third reserved resource; (5) cyclic shift pair (4, 10) for the conflict feedback of the fourth reserved resource. Or in case of conflict only feedback (FIG. 21B), one cyclic shift, e.g., cyclic shift 4 is used for conflict feedback of the fourth reserved resource; and (6) cyclic shift pair (5, 11) for the conflict feedback of the fifth reserved resource. Or in case of conflict only feedback (FIG. 21B), one cyclic shift, e.g., cyclic shift 5 is used for conflict feedback of the fifth reserved resource.

Figure 22:
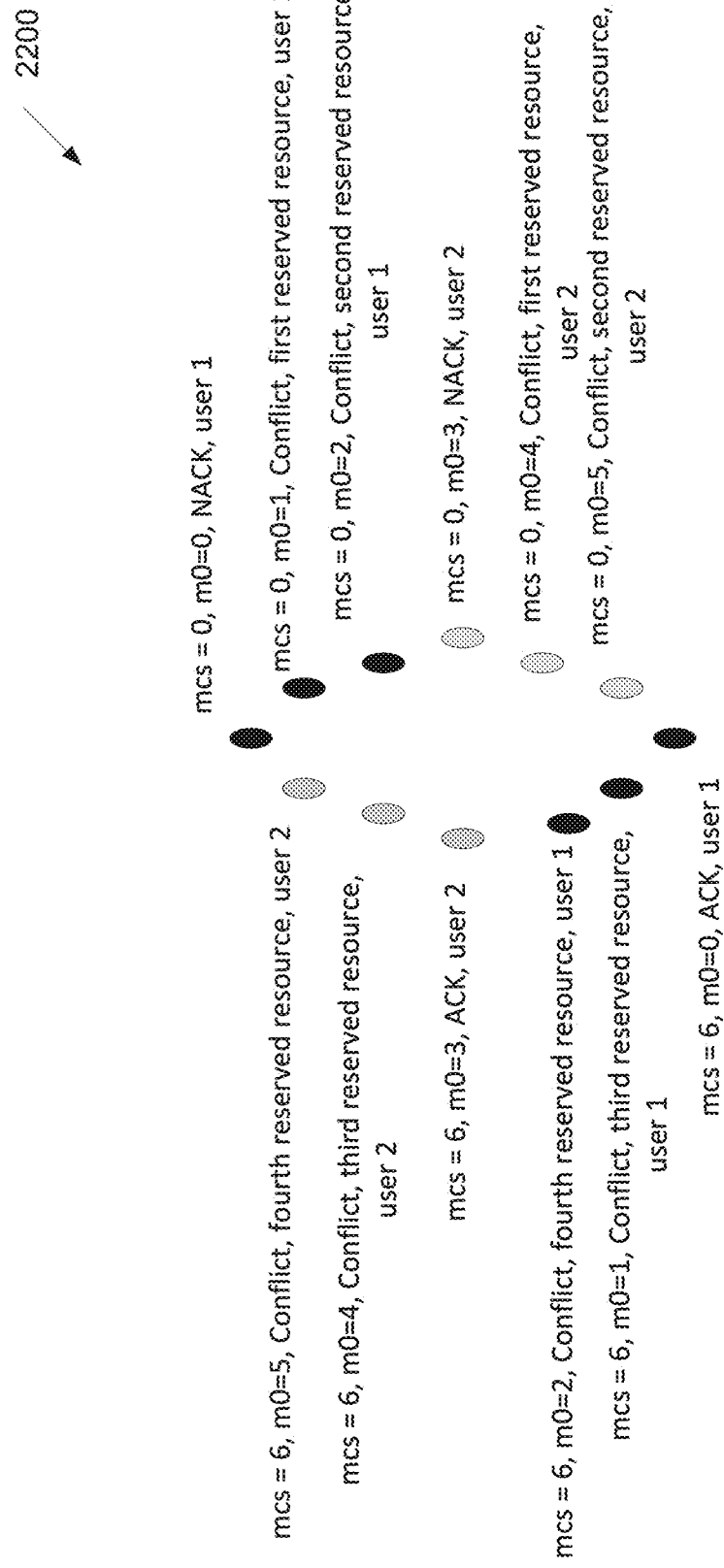
FIG. 22 illustrates yet another example of cyclic shift according to various embodiments of the present disclosure.

FIG. 22 illustrates yet another example of cyclic shift 2200 according to various embodiments of the present disclosure. An embodiment of the cyclic shift 2200 shown in FIG. 22 is for illustration only.

FIG. 22 is an example with $N_{CS}^{PSFCH-Conflict}=2$, i.e., two PSFCH format users can be multiplexed in the same PRB. These are user 1 and user 2. Only conflict feedback is provided, as well HARQ-ACK feedback. In this case, up to two cyclic shift pairs for conflict feedback per user can be multiplexed in the same PRB. The two cyclic shift pairs for conflict feedback can be allocated to 4 reserved resources.

User 1 is allocated: (1) cyclic shift pair (0, 6) for HARQ-ACK feedback; (2) cyclic shift 1 for conflict feedback of the first reserved resource; (3) cyclic shift 2 for the conflict feedback of the second reserved resource; (4) cyclic shift 7 for conflict feedback of the third reserved resource; and (5) cyclic shift 8 for the conflict feedback of the fourth reserved resource.

User 2 is allocated: (1) cyclic shift pair (3, 9) for HARQ-ACK feedback; (2) cyclic shift 4 for conflict feedback of the first reserved resource; (3) cyclic shift 5 for the conflict feedback of the second reserved resource; (4) cyclic shift 10 for conflict feedback of the third reserved resource; and (5) cyclic shift 11 for the conflict feedback of the fourth reserved resource.

In one example, For cyclic shift determination for HARQ-ACK feedback and conflict feedback, the cyclic shift α can be determined as the sum of three components: $\alpha=m_0+m_{cs}+m_1$. Wherein, $m_0$ and $m_{cs}$ are determined following the Rel-16 rules for determining these parameters for PSFCH.

$m_1$ is a new parameter related to the reserved resource: (1) for HARQ-ACK feedback $m_1=0$; and (2) for N reserved resources indicated from the UE-B to the UE-A (or N2 reserved resources from the UE-B to the UE-A, wherein N2≥N), for which the UE-A would provide feedback in N PSFCH resources, the reserved resources or the PSFCH resources are arranged in order 0, 1, . . . , N−1, wherein n is the reserved resource index or the PSFCH resource index 0≤n<N.

In one example, a cyclic shift pair is allocated for indication of conflict feedback. There are a total of M−1 PUSCH resources for conflict indication in one PRB. $m_1=n+1$.

In another example, a cyclic shift is allocated for indication of conflict feedback. There are a total of M cyclic shift pairs that can be allocated to the UE in the PRB. There are a total of 2(M−1) PUSCH resources for conflict indication in one PRB: (1) if n<M−1, $m_1=n+1$; and (2) else, $m_1=n+7−(M−1)$.

In one example, For cyclic shift determination for conflict feedback, when HARQ-ACK feedback is disabled, the cyclic shift α can be determined as the sum of three components: $\alpha=m_0+m_{cs}+m_1$.

Wherein, $m_0$ and $m_{cs}$ are determined following the Rel-16 rules for determining these parameters for PSFCH.

$m_1$ is a new parameter related to the reserved resource: for N reserved resources indicated from the UE-B to the UE-A (or N2 reserved resources from the UE-B to the UE-A, wherein N2≥N), for which the UE-A would provide feedback in N PSFCH resources, the reserved resources or the PSFCH resources are arranged in order 0, 1, . . . , N−1, wherein n is the reserved resource index or the PSFCH resource index 0≤n<N.

In one example, a cyclic shift pair is allocated for indication of conflict feedback. There are a total of M PUSCH resources for conflict indication in one PRB. $m_1=n$.

In another example, a cyclic shift is allocated for indication of conflict feedback. There are a total of M cyclic shift pairs that can be allocated to the UE in the PRB. There are a total of 2M PUSCH resources for conflict indication in one PRB: (1) if n<M, $m_1=n$; and (2) else, $m_1=n+6−M$.

In a variant of examples described herein, if the UE does not transmit HARQ-ACK feedback, the first set in each example is not present. For example, higher layers can configure or pre-configure the disabling of HARQ-ACK feedback. In this case, there are only N sets of PSFCH resources for conflict feedback.

In a variant of examples described herein, two sets of resources are configured for each reserved resource, e.g., a first set when the UE-A is target UE of the reserved resource, and a second set when the UE-A is not the target UE of the reserved resource. In this case, each set for conflict feedback of a reserved resource is replaced by two sets. Hence the total number of sets is 2N+1.

In a variant of examples described herein, two sets of resources are configured for each reserved resource, e.g., a first set when the UE-A is target UE of the reserved resource, and a second set when the UE-A is not the target UE of the reserved resource. In this case, each set for conflict feedback of a reserved resource is replaced by two sets. In addition, if the UE does not transmit HARQ-ACK feedback, the first set in each example is not present. For example, higher layers can configure or pre-configure the disabling of HARQ-ACK feedback. Hence the total number of sets is 2N.

Various examples can be combined, for example: (1) the sets use a mixture of time and frequency multiplexing; (2) the sets use a mixture of time and code (cyclic shift) multiplexing; (3) the sets use a mixture of frequency and code (cyclic shift) multiplexing; and (4) the sets use a mixture of time, frequency and code (cyclic shift) multiplexing.

In one example, there are two reserved resources N=2 in an SCI sent from the UE-A to the UE-B.

In one sub-example, the HARQ-ACK feedback and conflict feedback are in different PRBs and/or different slots.

In one sub-sub-example, PSFCH for the conflict feedback of the first reserved resource and PSFCH for the conflict feedback of the second reserved resource are in different PRBs and/or different slots as described herein. The cyclic shift for PSFCH of the conflict feedback can be, for $m_0$ e.g., as given by TABLE 1, and for $m_{cs}$ e.g., as given by (TABLE 4), (TABLE 5), or (TABLE 6).

In another sub-sub-example, PSFCH for the conflict feedback of the first reserved resource and PSFCH for the conflict feedback of the second reserved resource are in the same PRB/slot. Different cyclic shifts are used to distinguish the PSFCH of the conflict feedback of the first reserved resource and the PSFCH of the conflict feedback of the second reserved resource.

In one example A, different $m_0$ values are assigned to the PSFCH of the conflict feedback of the first reserved resource (e.g., TABLE 7) and the PSFCH of the conflict feedback of the second reserved resource (e.g., TABLE 8).

TABLE 7

$m_0$ of the PSFCH of the conflict feedback of the first reserved resource, $m_0$ can be for one cyclic shift or for a pair of cyclic shifts.

| | $m_0$ | | | | | |
|---|---|---|---|---|---|---|
| $N_{CS}^{PSFCH}$ | Cyclic Shift Index 0 | Cyclic Shift Index 1 | Cyclic Shift Index 2 | Cyclic Shift Index 3 | Cyclic Shift Index 4 | Cyclic Shift Index 5 |
| 1 | 0 | — | — | — | — | — |
| 2 | 0 | 3 | — | — | — | — |
| 3 | 0 | 2 | 4 | — | — | — |

TABLE 8

$m_0$ of the PSFCH of the conflict feedback of the second reserved resource, $m_0$ can be for one cyclic shift or for a pair of cyclic shifts.

| | $m_0$ | | | | | |
|---|---|---|---|---|---|---|
| $N_{CS}^{PSFCH}$ | Cyclic Shift Index 0 | Cyclic Shift Index 1 | Cyclic Shift Index 2 | Cyclic Shift Index 3 | Cyclic Shift Index 4 | Cyclic Shift Index 5 |
| 1 | 1 or 2 or 3 or 4 or 5 | — | — | — | — | — |
| 2 | 1 or 2 | 4 or 5 | — | — | — | — |
| 3 | 1 | 3 | 5 | — | — | — |

The $m_{cs}$ values are, e.g., as given by (TABLE 4), (TABLE 5), or (TABLE 6).

In one example, same $m_0$ values are assigned to the PSFCH of the conflict feedback of the first reserved resource and to the PSFCH of the conflict feedback of the second reserved resource, e.g., as shown in TABLE 1 (without last row). Different $m_{cs}$ values are assigned to the PSFCH of the conflict feedback of the first reserved resource and to the PSFCH of the conflict feedback of the second reserved resource, e.g., as illustrated in TABLE 9 or TABLE 10. In this example, there is no indication in case of no conflict.

TABLE 9

One example of determination of $m_{cs}$ for the PSFCH resources used for conflict indication of first and second reserved resources.

| Conflict Condition | Expected/potential conflict present in first resource | Expected/potential conflict present in second resource |
|---|---|---|
| $m_{cs}$ | 0 | 6 |

TABLE 10

One example of determination of $m_{cs}$ for the PSFCH resources used for conflict indication of first and second reserved resources.

| Conflict Condition | Expected/potential conflict present in second resource | Expected/potential conflict present in first resource |
|---|---|---|
| $m_{cs}$ | 0 | 6 |

In one example C, different $m_0$ values are assigned to the PSFCH resource for conflict feedback of the first reserved resource (e.g., TABLE 11) and the PSFCH resource for conflict feedback of the second reserved resource (e.g., TABLE 12). The difference between the $m_0$ values are 6 cyclic shifts

TABLE 11

$m_0$ of the PSFCH resource of the conflict feedback of the first reserved resource

| | $m_0$ | | | | | |
|---|---|---|---|---|---|---|
| $N_{CS}^{PSFCH}$ | Cyclic Shift Index 0 | Cyclic Shift Index 1 | Cyclic Shift Index 2 | Cyclic Shift Index 3 | Cyclic Shift Index 4 | Cyclic Shift Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

TABLE 12

$m_0$ of the PSFCH resource of the conflict feedback of the second reserved resource

| | $m_0$ | | | | | |
|---|---|---|---|---|---|---|
| $N_{CS}^{PSFCH}$ | Cyclic Shift Index 0 | Cyclic Shift Index 1 | Cyclic Shift Index 2 | Cyclic Shift Index 3 | Cyclic Shift Index 4 | Cyclic Shift Index 5 |
| 1 | 6 | — | — | — | — | — |
| 2 | 6 | 9 | — | — | — | — |
| 3 | 6 | 8 | 10 | — | — | — |
| 6 | 6 | 7 | 8 | 9 | 10 | 11 |

In this example, only conflict is indicated. There is no cyclic shift for the no-conflict case. In this example $m_{cs}=0$ for the PSFCH resource for the conflict feedback of the first and the second reserved resource.

In one example, 2 different $m_0$ values are assigned to PSFCH resources for conflict feedback. A first PSFCH resource is used if only one resource is in conflict with $m_0$ e.g., as shown in TABLE 7; the m, value is determined as shown in TABLE 13 or TABLE 14. A second PSFCH resource with $m_0$ e.g., as shown in TABLE 8, is used when both resources are in conflict, for the second resource if both reserved resources are in conflict $m_{cs}=0$. In this example, only one PSFCH is transmitted in case of conflict on at least one reserved resource.

TABLE 13

One example of determination of $m_{cs}$ for the PSFCH resources used for conflict indication of first and second reserved resources.

| Conflict Condition | Expected/potential conflict present in first resource; no conflict in second resource | Expected/potential conflict present in second resource; no conflict in first resource |
|---|---|---|
| $m_{cs}$ | 0 | 6 |

TABLE 14

One example of determination of $m_{cs}$ for the PSFCH resources used for conflict indication of first and second reserved resources.

| Conflict Condition | Expected/potential conflict present in second resource; no conflict in first resource | Expected/potential conflict present in first resource; no conflict in second resource |
|---|---|---|
| $m_{cs}$ | 0 | 6 |

A variant of these examples is to have one $m_0$ (e.g., TABLE 15), with 3 different $m_{cs}$ for PSFCH resources to feedback conflict of first reserved resource only or second reserved resource only or both first and second reserved resources.

TABLE 15

$m_0$ and a triplet of $m_{cs}$ for the PSFCH resources used for conflict feedback.

| | $m_0$ and set of $m_{cs}$ values | | | | | |
|---|---|---|---|---|---|---|
| $N_{CS}^{PSFCH}$ | Cyclic Shift triplet Index 0 | Cyclic Shift triplet Index 1 | Cyclic Shift triplet Index 2 | Cyclic Shift triplet Index 3 | Cyclic Shift triplet Index 4 | Cyclic Shift triplet Index 5 |
| 1 | 0 {0, 6, 3} | — | — | — | — | — |
| 2 | 0 {0, 6, 1} | 3 {0, 6, 1} | — | — | — | — |
| 3 | 0 {0, 6, 1} | 2 {0, 6, 1} | 4 {0, 6, 1} | — | — | — |

Another variant of these example is to have three $m_0$ values with $m_{cs}=0$ for PSFCH resources to feedback conflict of first reserved resource only or second reserved resource only or both first and second reserved resources. For example, the $m_0$ can be as show in TABLE 16.

TABLE 16

$m_0$ of the PSFCH resource of the conflict feedback $m_0$ (first resource)

| $N_{CS}^{PSFCH}$ | Cyclic Shift Index 0 | Cyclic Shift Index 1 | Cyclic Shift Index 2 | Cyclic Shift Index 3 | Cyclic Shift Index 4 | Cyclic Shift Index 5 |
|---|---|---|---|---|---|---|
| 1 | 0 | — | — | — | — | — |
| 2 | 0 | 3 | — | — | — | — |
| 3 | 0 | 2 | 4 | — | — | — |

$m_0$ (second resource)

| $N_{CS}^{PSFCH}$ | Cyclic Shift Index 0 | Cyclic Shift Index 1 | Cyclic Shift Index 2 | Cyclic Shift Index 3 | Cyclic Shift Index 4 | Cyclic Shift Index 5 |
|---|---|---|---|---|---|---|
| 1 | 6 | — | — | — | — | — |
| 2 | 6 | 9 | — | — | — | — |
| 3 | 6 | 8 | 10 | — | — | — |

$m_0$ (third resource)

| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
|---|---|---|---|---|---|---|
| 1 | 1 or 2 or 3 or 4 or 5 | — | — | — | — | — |
| 2 | 1 or 2 | 4 or 5 | — | — | — | — |
| 3 | 1 | 3 | 5 | — | — | — |

In one sub-example, PSFCH resources for the HARQ-ACK feedback and conflict feedback for the first reserved resource and the conflict feedback for the second reserved resource are in the same PRB/slot. Different cyclic shifts are used to distinguish the PSFCH resources used for the HARQ-ACK feedback and the conflict feedback of the first reserved resource and the conflict feedback of the second reserved resource.

In one example E, $m_0$ of the PSFCH resource for HARQ-ACK feedback is assigned following the Rel-16 rule in 3GPP standard specification 38.213; different $m_0$ values are assigned to the PSFCH resources of the conflict feedback of the first reserved resource (e.g., TABLE 17) and the PSFCH resource of the conflict feedback of the second reserved resource (e.g., TABLE 18).

TABLE 17

$m_0$ of the PSFCH resource of the conflict feedback of the first reserved resource, $m_0$ can be for one cyclic shift or for a pair of cyclic shifts $m_0$

| $N_{CS}^{PSFCH}$ | Cyclic Shift Index 0 | Cyclic Shift Index 1 | Cyclic Shift Index 2 | Cyclic Shift Index 3 | Cyclic Shift Index 4 | Cyclic Shift Index 5 |
|---|---|---|---|---|---|---|
| 1 | 2 | — | — | — | — | — |
| 2 | 1 | 4 | — | — | — | — |

TABLE 18

$m_0$ of the PSFCH resource of the conflict feedback of the second reserved resource. $m_0$ can be for one cyclic shift or for a pair of cyclic shifts $m_0$

| $N_{CS}^{PSFCH}$ | Cyclic Shift Index 0 | Cyclic Shift Index 1 | Cyclic Shift Index 2 | Cyclic Shift Index 3 | Cyclic Shift Index 4 | Cyclic Shift Index 5 |
|---|---|---|---|---|---|---|
| 1 | 4 | — | — | — | — | — |
| 2 | 2 | 5 | — | — | — | — |

The $m_{cs}$ values are, e.g., as given by TABLE 4, TABLE 5, or TABLE 6.

In one example F, $m_0$ of the PSFCH resource for HARQ-ACK feedback is assigned following the Rel-16 rule in 3GPP standard specification 38.213; same $m_0$ values are assigned to the PSFCH resource of the conflict feedback of the first reserved resource and the PSFCH resource of the conflict feedback of the second reserved resource, e.g., as shown in TABLE 2A or TABLE 2B. Different $m_{cs}$ values are assigned for the PSFCH resource of the conflict feedback of the first reserved resource and the PSFCH resource of the conflict feedback of the second reserved resource, e.g., as illustrated in TABLE 19 or TABLE 20. In this example, there is no indication in case of no conflict.

TABLE 19

One example of determination of $m_{cs}$ for the PSFCH resources used for conflict indication of first and second reserved resources.

| Conflict Condition | Expected/potential conflict present in first resource | Expected/potential conflict present in second resource |
|---|---|---|
| $m_{cs}$ | 0 | 6 |

TABLE 20

One example of determination of $m_{cs}$ for the PSFCH resources used for conflict indication of first and second reserved resources.

| Conflict Condition | Expected/potential conflict present in second resource | Expected/potential conflict present in first resource |
|---|---|---|
| $m_{cs}$ | 0 | 6 |

In one example G, $m_0$ of the PSFCH resource for HARQ-ACK feedback is assigned following the Rel-16 rule in 3GPP standard specification 38.213; different $m_0$ values are assigned to the conflict feedback of the first reserved resource (e.g., TABLE 21) and the conflict feedback of the second reserved resource (e.g., TABLE 22). The difference between the $m_0$ values are 6 cyclic shifts

TABLE 21

$m_0$ of PSFCH resources of the conflict feedback of the first reserved resource $m_0$

| $N_{CS}^{PSFCH}$ | Cyclic Shift Index 0 | Cyclic Shift Index 1 | Cyclic Shift Index 2 | Cyclic Shift Index 3 | Cyclic Shift Index 4 | Cyclic Shift Index 5 |
|---|---|---|---|---|---|---|
| 1 | 1 or 2 or 3 or 4 or 5 | — | — | — | — | — |
| 2 | 1 or 2 | 4 or 5 | — | — | — | — |
| 3 | 1 | 3 | 5 | — | — | — |

TABLE 22

$m_0$ of the PSFCH resource of the conflict feedback of the second reserved resource

| $N_{CS}^{PSFCH}$ | $m_0$ | | | | | |
|---|---|---|---|---|---|---|
| | Cyclic Shift Index 0 | Cyclic Shift Index 1 | Cyclic Shift Index 2 | Cyclic Shift Index 3 | Cyclic Shift Index 4 | Cyclic Shift Index 5 |
| 1 | 7 or 8 or 9 or 10 or 11 | — | — | — | — | — |
| 2 | 7 or 8 | 10 or 11 | — | — | — | — |
| 3 | 7 | 9 | 11 | — | — | — |

In this example, only conflict is indicated. There is no cyclic shift for the no-conflict case. In this example $m_{cs}=0$ for the PSFCH resource used for the conflict feedback of the first and the second reserved resource.

In one example, $m_0$ of the PSFCH resource for HARQ-ACK feedback is assigned following the Rel-16 rule in 3GPP standard specification 38.213; 2 different $m_0$ values are assigned to PSFCH resources for conflict feedback. A first PSFCH resource is used if only one resource is in conflict with $m_0$ e.g., as shown in TABLE 17; the m, value is determined as shown in TABLE 23 or TABLE 24. A second PSFCH resource with $m_0$ e.g., as shown in TABLE 18, is used when both resources are in conflict, for the second resource if both resource are in conflict $m_{cs}=0$. In this example, only one PSFCH is transmitted in case of conflict on at least one reserved resource.

TABLE 23

One example of determination of $m_{cs}$ for the PSFCH resources used for conflict indication of first and second reserved resources if only one resource is in conflict.

| Conflict Condition | Expected/potential conflict present in first resource; no conflict in second resource | Expected/potential conflict present in second resource; no conflict in first resource |
|---|---|---|
| $m_{cs}$ | 0 | 6 |

TABLE 24

One example of determination of $m_{cs}$ for the PSFCH resources used for conflict indication of first and second reserved resources if only one resource is in conflict.

| Conflict Condition | Expected/potential conflict present in second resource; no conflict in first resource | Expected/potential conflict present in first resource; no conflict in second resource |
|---|---|---|
| $m_{cs}$ | 0 | 6 |

A variant of these example is to have one $m_0$ (e.g., TABLE 25), with 3 different $m_{cs}$ for PSFCH resources to feedback conflict of first reserved resource only or second reserved resource only or both first and second reserved resources.

TABLE 25

$m_0$ and a triplet of $m_{cs}$ for the PSFCH resources used for conflict feedback.

| $N_{CS}^{PSFCH}$ | $m_0$ and set of $m_{cs}$ values | | | | | |
|---|---|---|---|---|---|---|
| | Cyclic Shift triplet Index 0 | Cyclic Shift triplet Index 1 | Cyclic Shift triplet Index 2 | Cyclic Shift triplet Index 3 | Cyclic Shift triplet Index 4 | Cyclic Shift triplet Index 5 |
| 1 | 2 {0, 6, 2} | — | — | — | — | — |
| 2 | 1 {0, 6, 1} | 4 {0, 6, 1} | — | — | — | — |

Another variant of these examples is to have three $m_0$ values with $m_{cs}=0$ for PSFCH resources to feedback conflict of first reserved resource only or second reserved resource only or both first and second reserved resources. For example, the $m_0$ can be as show in TABLE 26.

TABLE 26

$m_0$ of the PSFCH resource of the conflict feedback

| $N_{CS}^{PSFCH}$ | $m_0$ (first resource) | | | | | |
|---|---|---|---|---|---|---|
| | Cyclic Shift Index 0 | Cyclic Shift Index 1 | Cyclic Shift Index 2 | Cyclic Shift Index 3 | Cyclic Shift Index 4 | Cyclic Shift Index 5 |
| 1 | 2 | — | — | — | — | — |
| 2 | 1 | 4 | — | — | — | — |

| $N_{CS}^{PSFCH}$ | $m_0$ (second resource) | | | | | |
|---|---|---|---|---|---|---|
| | Cyclic Shift Index 0 | Cyclic Shift Index 1 | Cyclic Shift Index 2 | Cyclic Shift Index 3 | Cyclic Shift Index 4 | Cyclic Shift Index 5 |
| 1 | 8 | — | — | — | — | — |
| 2 | 7 | 10 | — | — | — | — |

| $N_{CS}^{PSFCH}$ | $m_0$ (third resource) | | | | | |
|---|---|---|---|---|---|---|
| | Cyclic Shift Index 0 | Cyclic Shift Index 1 | Cyclic Shift Index 2 | Cyclic Shift Index 3 | Cyclic Shift Index 4 | Cyclic Shift Index 5 |
| 1 | 4 | — | — | — | — | — |
| 2 | 2 | 5 | — | — | — | — |

In one example, the PSFCH resource used for conflict indication is sent in a slot not related to the slot used by the PSFCH resource of HARQ-ACK feedback. The PSFCH resource used for conflict feedback is sent in the latest PSFCH slot that is at least $T_0$ slots before the slot of the reserved resource. In one example, $T_0$ is in units of logical slots. In another example $T_0$ is in units of physical slots or in units of milli-seconds (sub-frames).

In example, when the conflict indication is sent $T_0$ slots before the slot of the reserved resource, if more than one resource is reserved in the same SCI, different PSFCH resources—a PSFCH resource is determined by slot, PRB and cyclic shift index—are determined for conflict feedback based on the slot and PRB of the reserved resources.

In one example, with two reserved resource, the me, can be determined as follows: (1) a first $m_{cs}$ value in case of time-domain conflict (i.e., UE-B can transmit in the time resource of the reserved resource, e.g., due to half duplex issue) for first reserved resource; (2) a second me, value in case of time-domain conflict (i.e., UE-B can transmit in the time resource of the reserved resource, e.g., due to half duplex issue) for second reserved resource; (3) a third me, value in case of time/frequency-domain conflict (i.e., UE-B can transmit in the time/frequency resource of the reserved resource, e.g., expected collision of another UE partially or overlapping in the reserved resource) for first reserved resource; and (4) a fourth me, value in case of time/frequency-domain conflict (i.e., UE-B can transmit in the time/frequency resource of the reserved resource, e.g., expected collision of another UE partially or overlapping in the reserved resource) for second reserved resource.

In one example, up two cyclic shifts can be sent for the first and second resource: (1) for first reserved resource, either first $m_{cs}$, or third $m_{cs}$ or no transmission in case of no conflict; (2) for second reserved resource, either second $m_{cs}$, or fourth $m_{cs}$ or no transmission in case of no conflict; (3) in one example a PSFCH resource can be considered to have 4 cyclic shifts (e.g., separate by 3 cyclic shifts such as 10, 3, 6, 91); and (4) in another example a PSFCH resource has two cyclic shifts e.g., separated by 6 cyclic shifts such as 10, 61. In this case two PSFCH resources are allocated. For example, a first PSFCH resource for the first reserved resource, and a second PSFCH resource for the second reserved resource. Alternatively, a first PSFCH resource is for time-domain conflicts, while a second PSFCH resource is for time/frequency domain conflicts, with the two cyclic shifts of each PSFCH resource for the first and second reserved resources respectively.

In another example, the four aforementioned cyclic shifts are used to indicate a conflict on a single resource for time-domain and/or frequency domain. A fifth $m_{cs}$ value in case of time-domain conflict on both resources, a sixth $m_{cs}$ value in case of time/frequency conflict on both resources. In this example, up to two cyclic shifts can be transmitted if one resource has a time-domain conflict and a second resource has a time/frequency conflict. In this example, the time-domain conflict is as described herein.

A potential or expected conflict is determined by the UE-A for a reserved resource, when the UE-A determines that the reserved resource overlaps with another potential or expected SL or UL transmission.

In one example, the UE-A determines only conflict feedback when the UE-A receives reserved resource for a future transmission, wherein the future transmission that is targeted to the UE-A.

In one example, if the UE-A determines that there is no conflict for the reserved resource, the UE-A does one of: (1) no transmission on the PSFCH/PSFCH-like resource determined (e.g., as described herein regarding indication of potential or expected resource conflicts) for conflict feedback; and (2) "No conflict" transmission on the PSFCH/PSFCH-like resource determined (as described herein) for conflict feedback.

In another example, if the UE-A determines that there is a conflict for the reserved resource, the UE-A performs a transmission of conflict indication on the PSFCH/PSFCH-like resource determined (as described herein) for conflict feedback.

In another example, if the UE-A determines that there is a conflict for the reserved resource, the UE-A determines the priority and/or RSRP of the SL transmission or UL transmission causing a conflict. Based on rules, the UE-A determines if the transmission on the reserved resource has a conflict or not.

If the UE-A determines that there is no conflict for the reserved resource, the UE-A does one of: (1) no transmission on the PSFCH/PSFCH-like resource determined (as described herein) for conflict feedback; and (2) "No conflict" transmission on the PSFCH/PSFCH-like resource determined (as described herein) for conflict feedback.

If the UE-A determines that there is a conflict for the reserved resource, the UE-A does transmission of conflict indication on the PSFCH/PSFCH-like resource determined (as described herein) for conflict feedback.

Examples of the rules for determining a conflict or no conflict on the reserved resource can be one of examples as shown in following.

Example, if the value priority associated with the reserved resource is less (or less than or equal to), the priority value of any partially/fully overlapping resource (SL and/or UL), the reserved resource has no conflict, else the reserved resource has a conflict. A lower priority value indicates a higher priority. If the priority value of the two reserved resources that are partially or fully overlapping is equal, it can be up to UE implementation to select one of the reserved resources to be in conflict. UE implementation can be random selection of one of the overlapping reserved resources.

Example, if SL RSRP of a potential expected SL transmission that is partially/fully overlapping in time and frequency with the reserved resource is less than or less than or equal to a SL RSRP threshold, the reserved resource has no conflict, else the reserved resource has a conflict. The SL RSRP (based on PSSCH DMRS or PSCCH DMRS) is measured on the SL transmission that indicates a future reserved resource that can cause a conflict to the reserved resource. The SL RSRP threshold can be based on priority of the SL transmission that indicates a future reserved resource that can cause a conflict to the reserved resource and/or the priority of the reserved resource.

Various of these examples may be a combination of other examples, for example, a reserved resource is considered in conflict if both of various examples indicate that the reserved resource is in conflict.

Various others of these examples are a combination of other examples, for example, a reserved resource is considered in conflict if either of various indicate that the reserved resource is in conflict.

In various embodiments, for two partially or fully overlapping reserved resources in time and frequency from two UEs, with the UE-A as the destination UE, a conflict occurs if the SL RSRP of at least one of the UEs with reserved resources exceeds a SL RSRP threshold. The SL RSRP (based on PSSCH DMRS or PSCCH DMRS) is measured as described in 3GPP standard specification 38.214. The SL RSRP threshold can be based on priority of one of the reserved resources that can cause a conflict to the other reserved resource and/or the priority of the other reserved resource.

In various embodiments, for two partially or fully overlapping reserved resources in time and frequency from two UEs, with the UE-A as the destination UE, a conflict occurs based on a combination, wherein a reserved resource of one of the two UEs is considered in conflict if two examples described herein indicate that the corresponding reserved resource is in conflict.

In various embodiments, only one of the UEs with overlapping reserved resources has the UE-A as a destination UE of its reserved resource, the other UE does not have the UE-A as a destination UE of its reserved resource.

In various embodiments, for two partially or fully overlapping reserved resources in time and frequency from two UEs, with the UE-A as the destination UE, a conflict occurs if the absolute value of the difference in SL RSRP of two UEs is greater than a SL RSRP threshold. The SL RSRP (based on PSSCH DMRS or PSCCH DMRS) is measured as described in 3GPP standard specification 38.214. The SL RSRP threshold can be a zero or positive value. The SL RSRP threshold can be specified in the system specifications or configured by higher layers.

In one example, the SL RSRP threshold can be based on priority of one or both of the reserved resources that are partially or fully overlapping reserved resources in time and frequency.

For two partially or fully overlapping reserved resources in time and frequency from two UEs, with the UE-A as the destination UE, a conflict occurs based on a combination of two examples described herein, wherein a reserved resource of one of the two UEs is considered in conflict if both of two examples described herein indicate that the corresponding reserved resource is in conflict.

If more than two users have partially or fully overlapped reserved resources in time and frequency, the conflict feedback is determined pairwise for each pair of UEs with partially or fully overlapping reserved resources in time and frequency.

In one example, the UE-A determines conflict feedback when the UE-A receives reserved resource for a future transmission, wherein the future transmission that is targeted to the UE-A or the future transmission is not targeted for the UE-A but overlaps a reserved transmission targeted for the UE-A.

In one example, if the UE-A determines that there is no conflict for the reserved resource, the UE-A does one of: (1) no transmission on the PSFCH/PSFCH-like resource determined (e.g., as described herein regarding indication of potential or expected resource conflicts) for conflict feedback. This can be for any reserved resource whether or not reserved transmission is targeting the UE-A; or (2) "No conflict" transmission on the PSFCH/PSFCH-like resource determined (as described herein) for conflict feedback. This is for a reserved resource for a transmission targeting the UE-A.

In another example, if the UE-A determines that there is a conflict for the reserved resource, the UE-A determines the priority and/or RSRP of the SL transmission or UL transmission causing a conflict. Based on rules, the UE-A determines if the transmission on the reserved resource has a conflict to which UE.

If the UE-A determines that there is no conflict for the reserved resource with a transmission targeted for the UE-A, the UE-A does one of: (1) no transmission on the PSFCH/ PSFCH-like resource determined (as described herein) for conflict feedback; or (2) "No conflict" transmission on the PSFCH/PSFCH-like resource determined (as described herein) for conflict feedback.

If the UE-A determines that there is a conflict for the reserved resource for transmission targeted to the UE-A, the UE-A does transmission of conflict indication on the PSFCH/PSFCH-like resource determined (as described herein) for conflict feedback.

If the UE-A determines that there is no conflict for the reserved resource with a transmission not targeted for the UE-A, the UE-A does no transmission on the PSFCH/ PSFCH-like resource determined (as described herein) for conflict feedback.

If the UE-A determines that there is a conflict for the reserved resource for transmission not targeted to the UE-A, the UE-A does transmission of conflict indication on the PSFCH/PSFCH-like resource determined (as described herein) for conflict feedback.

Examples of the rules for determining a conflict or no conflict on the reserved resource can be one of following examples as shown below.

Example, if the value priority associated with a first reserved resource is less (or less than or equal to), the priority value of any partially/fully overlapping second reserved resource, the first reserved resource has no conflict and the second reserved resource as a conflict, else the first reserved resource has a no conflict and the second reserved resource has a conflict. A lower priority value indicates a higher priority. If the priority value of the two reserved resources that are partially or fully overlapping is equal, it can be up to UE implementation to select one of the reserved resources to be in conflict. UE implementation can be random selection of one of the overlapping reserved resources. The UE with a higher priority value (e.g., the UE with the conflict in its reserved resource(s)), can be the UE with the reserved resource that has the UE-A as a destination UE, or the UE with the reserved resource that does not have the UE-A as a destination UE.

For example, if SL RSRP of a potential expected SL transmission, e.g., not targeted to the UE-A, which is partially/fully overlapping in time and frequency with a first reserved resource, targeted to the UE-A, is less than or less than or equal to a SL RSRP threshold, the first reserved resource has no conflict, else the first reserved resource has a conflict. The SL RSRP (based on PSSCH DMRS or PSCCH DMRS) is measured on the SL transmission that indicates a future reserved resource that can cause a conflict to the first reserved resource. The SL RSRP threshold can be based on priority of the SL transmission that indicates a future reserved resource that can cause a conflict to the first reserved resource and/or the priority of the first reserved resource. In this example, if the first reserved resource is not in conflict, the other reserved resource that partially or fully overlaps in time and frequency the first reserved resource and is not targeted to the UE-A, can be considered to be in conflict. Alternatively, it can consider that the other reserved resource that partially or fully overlaps the first reserved resource and is not targeted to the UE-A is always not in conflict (i.e., no feedback from the UE-A for that resource).

In one example, if a first reserved resource for a first UE that has the UE-A as a destination (target) UE, and a second reserved resource for a second UE that, e.g., does not have the UE-A as a destination (target) UE, partially or fully overlap in time and frequency. The first reserved resource is associated with a priority value higher (lower priority) than the priority value associated with the second reserved resource, the first UE can be sent a conflict feedback to indicate a conflict for its reserved resource. The SL RSRP associated with the second UE is above a threshold, the second reserved resource of the second UE, with a higher priority (lower priority value), is to cause too much interference to the first reserved resource of the first UE, therefore, the first reserved resource of the first UE is in conflict. Therefore, in this case, the UE-A sends conflict feedback to the first UE indicating that its reserved resource (the first reserved resource) is in conflict.

In one example, a conflicted is detected by the UE-A if the SL RSRP of a potential expected SL transmission, e.g., not targeted to the UE-A, which is partially/fully overlapping in time and frequency with a reserved resource of a SL transmission, targeted to the UE-A, is larger than (or larger than or equal to) SL RSRP threshold. The SL RSRP threshold can be based on priority of one or both reserved resources of SL transmissions involved in the conflict (overlap). As described herein, the conflict indication is sent to the UE with a higher priority value (lower priority). Therefore, when a reserved resource of a SL transmission having the UE-A as a destination (target) overlaps, in time and frequency, with a reserved resource of a SL transmission, e.g., not having the UE-A as a destination (target), and the SL RSRP associated with the reserved resource of the SL transmission not having the UE-A as a destination (target) UE is larger than (or larger than or equal to) to a SL RSRP threshold (that can depend on the priorities of the conflicting reserved resources), the UE-A transmits a conflict indication (conflict feedback) to the UE associated with a higher priority value (lower priority) to indicate that the reserved resource of that UE has a conflict.

In one example, if a first reserved resource for a first UE does not have the UE-A as a destination (target) UE, and a second reserved resource for a second UE that has the UE-A as a destination (target) UE, partially or fully overlap in time and frequency. The first reserved resource is associated with a priority value higher (lower priority) than the priority value associated with the second reserved resource, the first UE can be sent a conflict feedback to indicate a conflict for its reserved resource. The SL RSRP associated with the first UE is above a threshold, the first reserved resource of the first UE, with a lower priority (higher priority value), is to cause too much interference to the second reserved resource of the second UE, therefore, the first reserved resource of the first UE is in conflict. Therefore, in this case, the UE-A sends conflict feedback to the first UE indicating that its reserved resource (the first reserved resource) is in conflict.

In one example, if more than two users have partially or fully overlapped reserved resources in time and frequency, the conflict feedback is determined pairwise for each pair of UEs with partially or fully overlapping reserved resources in time and frequency.

In one example, the UE-A determines the priority of a conflict feedback on PSFCH the UE-A transmits in response an SCI with reserved resources is determined as follows (at least for the purpose of prioritization of PSFCH transmissions and receptions carrying conflict indication with other transmissions and receptions).

In one example, the priority of the conflict feedback PSFCH is determined to be the same as the priority of HARQ-ACK feedback of the same SCI.

In one example, if the PSFCH resource for conflict indication is transmitted in the same slot as the PSFCH resource for HARQ-ACK feedback for the same UE, the same priority is used for both.

In one example, the priority of the conflict feedback PSFCH is determined to be the same as the priority of reserved resource that is in conflict, which feedback is being provided.

In one example, the priority of the conflict feedback PSFCH is determined to be the same as the priority of reserved resource that causing the conflict, e.g., the priority of the reserved resource conflicting the reserved resource for which a conflict is being indicated.

In one example, the priority is the highest priority (or lowest priority value) among the priorities of other examples. Note that, a lower priority value indicates traffic of higher priority.

In one example, for the UE transmitting the conflict feedback (e.g., UE-A) the priority value of the PSFCH transmission for conflict indication is lowest priority value (highest priority) among the conflicting resources as indicated by the corresponding SCI Format 1-A. In one example, for the UE receiving the conflict feedback (e.g., UE-B) the priority value of the PSFCH reception for conflict indication is the same as indicated for the corresponding reserved resource by the UE-B's SCI (as UE-B is not aware of the priority of the other UE's involved in the conflict).

In one example, for the UE transmitting the conflict feedback (e.g., UE-A) the priority value of the PSFCH transmission for conflict indication is lowest priority value (highest priority) among the conflicting resources. In one example, for the UE receiving the conflict feedback (e.g., UE-B) the priority value of the PSFCH reception for conflict indication is (pre-)configured for a resource pool and/or (pre-)configured for the UE. If not (pre-)configured the priority value of the PSFCH reception for conflict indication is the same as indicated for the corresponding reserved resource by the UE-B's SCI (as UE-B is not aware of the priority of the other UE's involved in the conflict).

In one example, for the UE transmitting the conflict feedback (e.g., UE-A) the priority value of the PSFCH transmission for conflict indication is lowest priority value (highest priority) among the conflicting resources. In one example, for the UE receiving the conflict feedback (e.g., UE-B) the priority value of the PSFCH reception for conflict indication is (pre-)configured for a resource pool and/or (pre-)configured for the UE.

In one example, the UE-A determines the transmission power of PSFCH for conflict feedback following the same procedure for determining the power of PSFCH for HARQ-ACK feedback as described in 3GPP standard specification TS 38.213. Wherein, $N_{sch,Tx,PSFCH}$ is the number of scheduled PSFCH transmissions (e.g., total number of cyclic shifts to be transmitted in all PRBs for PSFCH in a same slot) for HARQ-ACK feedback and for conflict feedback. A UE is capable of transmitting a maximum of $N_{max,PSFCH}$ PSFCHs (for HARQ-ACK feedback and for conflict feedback), determines a number $N_{TX,PSFCH}$ of simultaneous PSFCH transmissions (for HARQ-ACK feedback and for conflict feedback) and a power $P_{PSFCH,k}(i)$ for a PSFCH transmission (for HARQ-ACK feedback or for conflict feedback) k, $1 \le k \le N_{TX,PSFCH}$, on a resource pool in PSFCH transmission occasion i on active SL BWP b of carrier f as described in 3GPP standard specification TS 38.213.

In one example, if the UE-A detects an SCI format 1-A form each of two users (UE1 and UE2), and SCI format 1-A includes reserved resources for UE1 and UE2, and the reserved resources of UE1 and UE2 overlap in time and frequency, and at least one of UE1 or UE2 has the UE-A as a destination UE for the reserved sources and for that UE, the UE-A successful decodes the PSSCH transmission corresponding to (in the same slot as) the SCI Format 1-A of that user. In this case, there is no conflict due to the overlapping reserved resources.

In one example, if the UE-A detects an SCI format 1-A form each of two users (UE1 and UE2), and SCI format 1-A includes reserved resources for UE1 and UE2, and the reserved resources of UE 1 and UE2 overlap in time and frequency, and UE 1 and UE2 do not indicate in the respective SCI Format 1-A that each can receive a conflict indication the UE-A does not transmit a conflict indication to UE1 or UE2.

In one example, if the UE-A detects an SCI format 1-A form each of two users (UE1 and UE2), and SCI format 1-A includes reserved resources for UE1 and UE2, and the reserved resources of UE1 and UE2 overlap in time and frequency, and UE1 does not indicate in the SCI Format 1-A that the UE1 can receive a conflict indication, and UE2 indicates that the UE2 can receive a conflict indication. The UE-A does not transmit a conflict indication to UE1, the UE-A may transmit a conflict indication to UE2.

In one example, if the SL RSRP of UE1 is above a threshold, wherein: (1) the SL RSRP (based on PSSCH DMRS or PSCCH DMRS) is measured on the SL transmission that indicates a future reserved resource; and (2) the threshold can depend on the priority values indicated in SCI Format 1-A for each of UE1 and UE2.

The UE-A determines that the reserved resource of UE2 has a conflict and sends conflict feedback (conflict indication) to UE2.

In one example, if the SL RSRP of UE1 is higher than (or higher than or equal to) the SL RSRP of UE2 by a threshold, wherein: (1) the SL RSRP (based on PSSCH DMRS or PSCCH DMRS) is measured on the SL transmission that indicates a future reserved resource; (2) the threshold can depend on the priority values indicated in SCI Format 1-A for each of UE1 and UE2; and (3) the threshold can be zero, negative value or positive value.

The UE-A determines that the reserved resource of UE2 has a conflict and sends conflict feedback (conflict indication) to UE2.

In one example, if the priority value of the reserved resource of UE1 is lower than (or lower than or equal to) the priority value of the reserve resource of UE2 (a higher priority value indicates a lower priority), the UE-A determines that the reserved resource of UE2 has a conflict and sends conflict feedback (conflict indication) to UE2.

In one example, only if conditions in certain examples are satisfied, the UE-A determines that the reserved resource of UE2 has a conflict and sends conflict feedback (conflict indication) to UE2.

In one example, if either or both conditions in certain examples are satisfied, the UE-A determines that the reserved resource of UE2 has a conflict and sends conflict feedback (conflict indication) to UE2.

In one example, only if conditions in certain examples are satisfied, the UE-A determines that the reserved resource of UE2 has a conflict and sends conflict feedback (conflict indication) to UE2.

In one example, if either or both conditions in are satisfied, the UE-A determines that the reserved resource of UE2 has a conflict and sends conflict feedback (conflict indication) to UE2.

In one example, if the SCI Format 1-A associated with UE-1 has the UE-A as its destination and the UE-A successfully receives the PSSCH transmission associated with the SCI Format 1-A of UE-1, the UE-A does not transmit a conflict indication to UE2 due to a conflict with the reserved resources of UE1.

In one example, if the UE-A detects an SCI format 1-A form a user UE1, and SCI format 1-A includes reserved resource(s) for UE1, and the reserved resource(s) of UE1 overlap in time (e.g., same slot) as SL transmission from the UE-A, and the UE-A is the destination (target) UE of the reserved resource(s).

In one example, if the priority value associated with reserved resource of a SL transmission from UE1 (determined from SCI Format 1-A) is higher than (i.e., lower priority), or higher than or equal to, that of the SL transmission from the UE-A overlapping in time, the UE-A sends conflict information to UE1 on a PSFCH indicating the presence of a conflict.

In one example, if the priority value associated with reserved resource of a SL transmission from UE1 (determined from SCI Format 1-A) is lower than (i.e., higher priority), or lower than or equal to, that of the SL transmission from the UE-A overlapping in time, the UE-A does not send conflict information to UE1. The UE-A re-selects the resource with the conflict in a slot that does not have a conflict.

In one example, if the priority value associated with reserved resource of a SL transmission from UE1 (determined from SCI Format 1-A) is equal to that of the SL transmission from the UE-A overlapping in time, it can be up to the implementation of the UE-A to one of: (1) the UE-A does not send conflict information to UE1. The UE-A re-selects the resource with the conflict in a slot that does not have a conflict or (2) the UE-A sends conflict information to UE1 on PSFCH indicating the presence of a conflict.

In one example, if the SL RSRP of the SL transmission from UE1 is less than or less than or equal to a SL threshold, the UE-A send conflict information to UE1 on PSFCH indicating the presence of a conflict. In one example, the SL threshold can depend on the priority of SL transmission from UE1 and/or the priority of SL transmission from the UE-A.

In one example, if the SL RSRP of the SL transmission from UE1 is greater than or greater than or equal to a SL threshold, the UE-A does not send conflict information to UE1. The UE-A re-selects the resource with the conflict in a slot that does not have a conflict. In one example, the SL threshold can depend on the priority of SL transmission from UE1 and/or the priority of SL transmission from the UE-A.

In one example, if the UE-A successfully decodes the SL transmission of UE1 associated with SCI Format 1-A, there is no conflict due to the overlapping resources.

In one example, if UE1 does not indicate in the SCI Format 1-A that the UE1 can receive conflict feedback, the UE-A does not send conflict information to UE1. The UE-A re-selects the resource with the conflict in a slot that does not have a conflict.

In one example, if UE1 does not indicate in the SCI Format 1-A that the UE1 can receive conflict feedback, the UE-A does not send conflict information to UE1.

In example, one or more of the examples herein can be supported to determine the conflict feedback. In one example, the overall decision to determine a conflict is based on "and" of one or more of the examples herein. In another example, the overall decision to determine a conflict is based on "or" of one or more of the examples herein. In another example, the overall decision to determine a conflict is based on a combination of "and" and "or" of one or more of the examples herein.

In one example, the resource pool is configured such that the number of reserved bits in the first stage SCI (in SL-PSCCH-Config) is greater than 0, e.g., sl-NumReservedBits can be set to 2 or 3 or 4. A release 16 SL UE sets the reserved bits to 0. One of the bits (e.g., the first bit or the last bit or the least significant bit or the most significant bit) is used by Rel-17 SL UEs that support the conflict feedback (also known as scheme 2, e.g., reception of conflict indication).

For example: (1) a Rel-17 SL UE that supports conflict feedback (e.g., reception of conflict indication) sets the corresponding bit to "1" when transmitting a first stage SCI (e.g., SCI Format 1-A); and (2) a Rel-17 SL UE that does not support conflict feedback (e.g., reception of conflict indication) keeps the corresponding bit to "0" when transmitting a first stage SCI (e.g., SCI Format 1-A). This is the same as Rel-16 SL UEs.

When the UE-A receives SL transmission with reserved resources, the UE-A checks the bit corresponding to the indication of support of reception of conflict feedback in the corresponding PSCCH and first stage SCI.

If that bit is "1" the UE reserving the resources supports the reception of conflict indication, the UE-A can transmit conflict feedback to that UE indicating that a reserved resource has conflict if the reserved resource has a conflict, e.g., as described by one of the conditions in the earlier examples of determining conflict feedback described herein.

Otherwise, if that bit is "0" the UE reserving the resources does not support the reception of conflict indication (this can be a Rel-17 SL UE not supporting or not configured for conflict indication or a Rel-16 SL UE, the UE-A does not transmit conflict feedback to that UE. If a resource reserved by that UE conflicts with a resource reserved by a third UE that supports the reception of conflict indication, the UE-A can transmit the conflict indication to the third UE that supports the reception of conflict indication. There can be additional conditions to transmit the conflict indication to the third UE.

In another example, a UE (e.g., UE-A) is configured with the source IDs of the UEs that support and/or are configured for the reception of conflict indication. In one example, the configuration is by higher layer configuration (e.g., RRC configuration and/or MAC CE signaling) from the network (e.g., gNB). In another example, the configuration is by higher layer configuration (e.g., PC5 RRC configuration and/or PC5 MAC CE signaling) from the UE that supports (or that does not support) reception of conflict indication. In another example, the configuration is by higher layer configuration (e.g., PC5 RRC configuration and/or PC5 MAC CE signaling) from a third UE that indicates the UEs that support or the UEs that do not support reception of conflict indication, for example, the third UE can a roadside unit (RSU) UE or a group leader UE or a platoon leader UE, etc.

When the UE-A receives SL transmission with reserved resources, the UE-A checks the source ID of the corresponding SL reception (e.g., in the corresponding second stage SCI).

If the source ID is that of a UE that supports the reception of conflict indication, the UE-A can transmit conflict feedback to that UE indicating that a reserved resource has conflict if the reserved resource has a conflict, e.g., as described by one of the conditions in the earlier examples of determining conflict feedback described herein.

Otherwise, if the source ID is that of a UE that does not support the reception of conflict indication, the UE-A does not transmit conflict feedback to that UE. If a resource reserved by that UE conflicts with a resource reserved by a third UE that supports the reception of conflict indication, the UE-A can transmit the conflict indication to the third UE that supports the reception of conflict indication. There can be additional conditions to transmit the conflict indication to the third UE.

The present disclosure can be applicable to Rel-17 NR specifications for sidelink enhancements.

The benefit of this DOI provided signaling mechanism that conflict feedback (conflict information) from the UE-A to the UE-B.

Embodiments of the disclosure are directed to the NR standard. Sidelink is one of the promising features of NR, targeting verticals such the automotive industry, public safety and other commercial application. Sidelink has been first introduced to NR in release 16, with emphasis on V2X and public safety where the requirements are met. To expand sidelink support to other types of UEs such a vulnerable road users (VRUs), pedestrian UEs (PUEs) and other types of handheld devices, enhancing reliability and latency of SL transmissions is of paramount importance. One of the main motivation of the release 17 work item on enhanced sidelink is to enhance reliability and latency.

The present disclosure provides methods for supporting SL inter-UE co-ordination signaling for the PSFCH design of conflict feedback (conflict information) channel.

The above flowcharts and signaling flow diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A first user equipment (UE) in a wireless communication system, the first UE comprising:
 a transceiver configured to:
  receive first sidelink (SL) control information (SCI), from a second UE, on a physical SL control channel (PSCCH), wherein the first SCI includes first information related to a first SL resource which is a reserved resource, and
  receive second SCI, from a third UE, on the PSCCH, wherein the second SCI includes second information related to a second SL resource which is a reserved resource; and
 a processor operably coupled to the transceiver, the processor configured to:
  identify a conflict on the first SL resource when;
   the first UE is an intended recipient of the first SL resource, and $RSRP_2 > RSRP_1 +$ a reference signal received power (RSRP) threshold, where $RSRP_1$ is a RSRP of the second UE and $RSRP_2$ is a RSRP of the third UE
 wherein the transceiver is further configured to transmit, to the second UE, a physical SL feedback channel (PSFCH) including conflict information when the conflict is identified on the first SL resource, and
 wherein first physical resource blocks (PRBs) for the PSFCH including the conflict information are different from second PRBs for another PSFCH including hybrid automatic repeat request acknowledgement (HARQ-ACK) feedback information for a physical SL shared channel (PSSCH).

2. The first UE of claim 1, wherein wherein the RSRP threshold is based on a priority value of the second UE included in the first SCI and a priority value of the third UE included in the second SCI.

3. The first UE of claim 1, wherein the conflict information is transmitted in a first slot on the PSFCH, after a slot in which the first SCI is received.

4. The first UE of claim 1, wherein:
 the processor is further configured to identify a value associated with a cyclic shift for the PSFCH,
 the value is 0 when the conflict information is transmitted on the PSFCH.

5. The first UE of claim 1, wherein the conflict is identified when:
the first UE is an intended recipient of the second SL resource, and
$RSRP_1 > RSRP_2 +$ the RSRP threshold.

6. The first UE of claim 1, wherein:
the first and second SCI each include a flag indicating whether the second and third UEs, respectively, are able to receive the conflict information,
when a value of the flag is '0', the respective second or third UE is not able to receive the conflict information, and
when a value of the flag is '1', the respective second or third UE is able to receive the conflict information.

7. The first UE of claim 1, wherein the transceiver is further configured to transmit the PSFCH including the conflict information after at least a time gap, sl-MinTimeGapPSFCH, from reception of the first SCI or the second SCI.

8. The first UE of claim 1, wherein the transceiver is further configured to transmit the PSFCH including the conflict information with a priority value set to a smallest priority value among a priority value of the second UE included in the first SCI and a priority value of the third UE included in the second SCI.

9. A method of operating a first user equipment (UE), the method comprising:
receiving first sidelink (SL) control information (SCI), from a second UE, on a physical SL control channel (PSCCH), wherein the first SCI includes first information related to a first SL resource which is a reserved resource;
receiving second SCI, from a third UE, on the PSCCH, wherein the second SCI includes second information related to a second SL resource which is a reserved resource;
identifying a conflict on the first SL resource when:
the first UE is an intended recipient of the first SL resource, and
$RSRP_2 > RSRP_1 +$ a reference signal received power (RSRP) threshold, where $RSRP_1$ is a RSRP of the second UE and $RSRP_2$ is a RSRP of the third UE; and
transmitting, to the second UE, a physical SL feedback channel (PSFCH) including conflict information when the conflict is identified on the first SL resource, and
wherein first physical resource blocks (PRBs) for the PSFCH including the conflict information are different from second PRBs for another PSFCH including hybrid automatic repeat request acknowledgement (HARQ-ACK) feedback information for a physical SL shared channel (PSSCH).

10. The method of claim 9, wherein the RSRP threshold is based on a priority value of the second UE included in the first SCI and a priority value of the third UE included in the second SCI.

11. The method of claim 9, wherein the conflict information is transmitted in a first slot on the PSFCH, after a slot in which the first SCI is received.

12. The method of claim 9, further comprising:
identifying a value associated with a cyclic shift for the PSFCH,
wherein the value is 0 when the conflict information is transmitted on the PSFCH.

13. The method of claim 9, wherein identifying the conflict further comprises identifying the conflict when:
the first UE is an intended recipient of the second SL resource, and
$RSRP_1 > RSRP_2 +$ the RSRP threshold.

14. The method of claim 9, wherein:
the first and second SCI each include a flag indicating whether the first and second UEs, respectively, are able to receive the conflict information,
when a value of the flag is '0', the respective second or third UE is not able to receive the conflict information, and
when a value of the flag is '1', the respective second or third UE is able to receive the conflict information.

15. The method of claim 9, wherein transmitting the PSFCH further comprises transmitting the PSFCH including the conflict information after at least a time gap, sl-MinTimeGapPSFCH, from reception of the first SCI or the second SCI.

16. The method of claim 9, wherein transmitting the PSFCH further comprises transmitting the PSFCH including the conflict information with a priority value set to a smallest priority value among a priority value of the second UE included in the first SCI and a priority value of the third UE included in the second SCI.

17. A second user equipment (UE) in a wireless communication system, the second UE comprising:
a processor; and
a transceiver operably coupled with the processor, the transceiver configured to:
transmit, to a first UE, first sidelink (SL) control information (SCI) on a physical SL control channel (PSCCH), wherein the SCI includes first information related to a first SL resource which is a reserved resource, and
receive, from the first UE, conflict information on a physical SL feedback channel (PSFCH) when a conflict is identified on the first SL resource,
wherein the conflict is identified on the first SL resource when:
the first UE is an intended recipient of the first SL resource, and
$RSRP_2 > RSRP_1 +$ a reference signal received power (RSRP) threshold, where $RSRP_1$ is a RSRP of the second UE and $RSRP_2$ is a RSRP of a third UE.

18. The second UE of claim 17, wherein the processor is further configured to identify whether to transmit a data on the first SL resource based on the conflict information.

19. The second UE of claim 17, wherein the conflict information is received in a first slot on the PSFCH, after a slot in which the first SCI is transmitted.

20. The second UE of claim 17, wherein a value associated with a cyclic shift for the PSFCH is 0 in cast that the conflict information is received on the PSFCH.

* * * * *